US008576858B2

(12) United States Patent
Kimmich et al.

(10) Patent No.: US 8,576,858 B2
(45) Date of Patent: *Nov. 5, 2013

(54) MULTIPLE TRANSMISSION PATHS FOR HIERARCHICAL LAYERS

(75) Inventors: Kevin Kimmich, Chardon, OH (US); Fan Mo, Stow, OH (US); Mark Vanderaar, Medina, OH (US); Richard Harel, Shaker Heights, OH (US); Russell Fuerst, Mentor, OH (US)

(73) Assignee: ViaSat, Inc., Carlsbad, CA (US)

( * ) Notice: Subject to any disclaimer, the term of this patent is extended or adjusted under 35 U.S.C. 154(b) by 430 days.

This patent is subject to a terminal disclaimer.

(21) Appl. No.: 12/762,277

(22) Filed: Apr. 16, 2010

(65) Prior Publication Data

US 2010/0260254 A1    Oct. 14, 2010

Related U.S. Application Data

(63) Continuation-in-part of application No. 12/250,394, filed on Oct. 13, 2008, now Pat. No. 7,961,665, which is a continuation-in-part of application No. 11/956,200, filed on Dec. 13, 2007.

(60) Provisional application No. 60/869,809, filed on Dec. 13, 2006.

(51) Int. Cl.
*H04N 7/26*    (2006.01)

(52) U.S. Cl.
USPC ..................................... 370/401; 375/240.01

(58) Field of Classification Search
None
See application file for complete search history.

(56) References Cited

U.S. PATENT DOCUMENTS

| 6,215,776 B1 | 4/2001 | Chao |
| 6,292,512 B1 * | 9/2001 | Radha et al. ............... 375/240.1 |
| 6,339,450 B1 | 1/2002 | Chang et al. |
| 6,374,112 B1 | 4/2002 | Widegren et al. |

(Continued)

FOREIGN PATENT DOCUMENTS

| WO | WO 2008/064270 A2 | 5/2008 |
| WO | WO 2008/074020 A2 | 6/2008 |

(Continued)

OTHER PUBLICATIONS

European Broadcasting Union: "Digital Video Broadcasting (DVB) User guidelines for the second generation system for Broadcasting, Interactive Services, News Gathering and other broadband satellite applications (DVB-S2)", Feb. 2005; ETSI TR 102 376, V1.1.1, pp. 1-104.

(Continued)

*Primary Examiner* — Gregory Sefcheck
*Assistant Examiner* — Steve Young
(74) *Attorney, Agent, or Firm* — Kilpatrick Townsend & Stockton LLP

(57) ABSTRACT

A method for hierarchical communication of a set of source data includes: receiving source data representing content to be communicated to a data terminal; pre-coding at least some of the source data using pre-coding schemes to generate sets of representation data; associating the sets of representation data with coding and modulation schemes; generating transmissions by applying the coding and modulation schemes to the sets of representation data; transmitting a first transmission to the data terminal on a first communication link; and transmitting a second transmission to the data terminal on a second communication link, wherein the second communication link differs from the first communication link.

21 Claims, 22 Drawing Sheets

(56) References Cited

U.S. PATENT DOCUMENTS

| | | | |
|---|---|---|---|
| 6,381,242 B1 | 4/2002 | Maher et al. |
| 6,392,705 B1 | 5/2002 | Chaddha |
| 6,404,755 B1 | 6/2002 | Schafer |
| 6,556,546 B1 | 4/2003 | Maeda et al. |
| 6,574,794 B1 | 6/2003 | Sarraf |
| 6,700,882 B1 | 3/2004 | Lindoff et al. |
| 6,798,838 B1 | 9/2004 | Ngo |
| 6,829,221 B1 | 12/2004 | Winckles et al. |
| 6,845,246 B1 | 1/2005 | Steer |
| 6,925,120 B2 | 8/2005 | Zhang et al. |
| 6,934,679 B2 | 8/2005 | Zhou et al. |
| 6,943,702 B2 | 9/2005 | Kato |
| 6,961,388 B2 | 11/2005 | Ling et al. |
| 6,973,128 B2 * | 12/2005 | Zhou et al. ............... 375/240.11 |
| 6,993,689 B2 | 1/2006 | Nagai et al. |
| 6,999,432 B2 | 2/2006 | Zhang et al. |
| 7,093,028 B1 | 8/2006 | Shao et al. |
| 7,136,066 B2 | 11/2006 | Li et al. |
| 7,146,185 B2 | 12/2006 | Lane |
| 7,349,906 B2 | 3/2008 | Cherkasova |
| 7,376,418 B2 | 5/2008 | Wells |
| 7,382,729 B2 | 6/2008 | Honda et al. |
| 7,406,176 B2 | 7/2008 | Zhu et al. |
| 7,450,901 B2 | 11/2008 | Parkman |
| 7,477,597 B2 | 1/2009 | Segel |
| 7,477,688 B1 | 1/2009 | Zhang et al. |
| 7,483,487 B2 | 1/2009 | Liu et al. |
| 7,505,480 B1 | 3/2009 | Zhang et al. |
| 7,515,566 B2 | 4/2009 | Dale et al. |
| 7,535,863 B2 | 5/2009 | Gin et al. |
| 7,593,697 B2 | 9/2009 | Zhu et al. |
| 7,603,075 B2 | 10/2009 | Barda |
| 7,643,441 B2 | 1/2010 | De La Chappelle et al. |
| 7,667,707 B1 | 2/2010 | Margulis |
| 7,690,021 B2 | 3/2010 | Ng |
| 7,720,136 B2 | 5/2010 | Friedman et al. |
| 7,860,161 B2 | 12/2010 | Xu et al. |
| 2001/0052130 A1 * | 12/2001 | Yap et al. .................. 725/90 |
| 2002/0058478 A1 | 5/2002 | de La Chapelle et al. |
| 2003/0112878 A1 | 6/2003 | Kloper |
| 2003/0204630 A1 | 10/2003 | Ng |
| 2003/0204850 A1 | 10/2003 | Ng et al. |
| 2003/0217362 A1 | 11/2003 | Summers et al. |
| 2004/0071216 A1 | 4/2004 | Richardson et al. |
| 2004/0093396 A1 | 5/2004 | Akune |
| 2004/0208121 A1 | 10/2004 | Gin et al. |
| 2004/0252725 A1 | 12/2004 | Sun et al. |
| 2004/0253980 A1 | 12/2004 | Lane |
| 2005/0152372 A1 | 7/2005 | Kim et al. |
| 2005/0251838 A1 | 11/2005 | Chandhok et al. |
| 2006/0050660 A1 | 3/2006 | Wells |
| 2006/0126576 A1 | 6/2006 | Dale et al. |
| 2006/0182026 A1 | 8/2006 | Zhu et al. |
| 2007/0091881 A1 | 4/2007 | Kallio et al. |
| 2007/0159521 A1 | 7/2007 | Lane |
| 2008/0049597 A1 | 2/2008 | Walker et al. |
| 2008/0049659 A1 | 2/2008 | Ram et al. |
| 2008/0056145 A1 | 3/2008 | Woodworth |
| 2008/0064323 A1 | 3/2008 | Barda |
| 2008/0101466 A1 | 5/2008 | Swenson et al. |
| 2008/0144713 A1 | 6/2008 | Kimmich et al. |
| 2008/0144723 A1 | 6/2008 | Chen et al. |
| 2008/0155373 A1 | 6/2008 | Friedman et al. |
| 2008/0219266 A1 | 9/2008 | Agarwal et al. |
| 2008/0225964 A1 | 9/2008 | Han et al. |
| 2008/0259901 A1 | 10/2008 | Friedman et al. |
| 2008/0268838 A1 | 10/2008 | Zufall et al. |
| 2009/0003452 A1 | 1/2009 | Au et al. |
| 2009/0028182 A1 | 1/2009 | Brooks et al. |
| 2009/0034609 A1 | 2/2009 | Peng et al. |
| 2009/0041100 A1 | 2/2009 | Kimmich et al. |
| 2009/0060033 A1 | 3/2009 | Kimmich et al. |
| 2009/0060086 A1 | 3/2009 | Kimmich et al. |
| 2009/0073876 A1 | 3/2009 | Kimmich et al. |
| 2009/0080510 A1 | 3/2009 | Wiegand et al. |
| 2009/0135789 A1 | 5/2009 | Snapir et al. |
| 2009/0219990 A1 | 9/2009 | Han et al. |
| 2009/0252134 A1 | 10/2009 | Schlicht et al. |
| 2010/0008416 A1 | 1/2010 | Ben-Zedeff et al. |
| 2010/0260043 A1 | 10/2010 | Kimmich et al. |
| 2010/0260045 A1 | 10/2010 | Kimmich et al. |
| 2010/0260050 A1 | 10/2010 | Kimmich et al. |
| 2010/0260259 A1 | 10/2010 | Kimmich et al. |
| 2012/0076201 A1 | 3/2012 | Kimmich et al. |

FOREIGN PATENT DOCUMENTS

| | | |
|---|---|---|
| WO | WO 2009/058118 A1 | 5/2009 |
| WO | WO 2009/154704 A1 | 12/2009 |
| WO | 2010/019157 A1 | 2/2010 |
| WO | 2011/130685 A2 | 10/2011 |

OTHER PUBLICATIONS

International Search Report and Written Opinion mailed on Aug. 1, 2008 for Patent Application No. PCT/US2007/087483, 16 pages.

International Search Report and Written Opinion mailed Feb. 20, 2009 for Patent Application No. PCT/US2008/076038, 13 pages.

Notice of Allowance for U.S. Appl. No. 12/250,394 mailed Mar. 5, 2010, 9 pages.

Han, L. et al., "Cross Layer Optimization for Scalable Video Multicast over 802.11 WLANs", IEEE 2006 Proceedings Consumer Communications and Networking Conference (ICCNC), Las Vegas, NV, USA, Jan. 8, 2006, pp. 838-843.

Horn, Uwe, et. al., "Scalable Video Coding for Multimedia Application and Robust Transmission over Wireless Channels", 7th International Workshop on Packet Video, 1996, 6 pages.

McCanne, S., et al., "Receiver-driven Layered Multicast", SIGCOMM '96, Conference Proceedings on Applications, Technologies, Architectures, and Protocols for Computer Applications, Aug. 1996, Stanford, CA, pp. 1-14.

Radha, H., et. al., "The MPEG-4—Fine-Grained Scalable Video Coding Method for Multimedia Streaming Over IP", IEEE Transactions on Multimedia, vol. 3, No. 1, Mar. 2001, pp. 53-68.

Schierl, T. et al., "Using H.264/AVC-Based Scalable Video Coding (SVC) for Real Time Streaming in Wireless IP Networks", IEEE International Symposium on Circuits and Systems, 2007, 4 pages.

Schierl, T., et al., "Mobile Video Transmission Using Scalable Video Coding", IEEE Transactions on Circuits and Systems for Video Technology, Sep. 2007, vol. 17, Issue 9, pp. 1204-1217.

Van Der Schaar, M. et al. "Robust Transmission of MPEG-4 Scalable Video over 4G Wireless Networks", Proceedings of IEEE / ICIP International Conference on Image Processing, 2002, Rochester, NY, USA, Sep. 22-25, 2002, pp. III-757-III-760.

Final Office Action for U.S. Appl. No. 11/956,200 mailed on Jan. 25, 2012; 31 pages.

Notice of Allowance for U.S. Appl. No. 12/250,384 mailed on Feb. 6, 2012; 8 pages.

International Search Report and Written Opinion mailed on Feb. 2, 2012 for Patent Application No. PCT/US2011/032758, 16 pages.

Non-Final Office Action for U.S. Appl. No. 12/250,384 mailed on May 11, 2011, 10 pages.

Non-Final Office Action for U.S. Appl. No. 12/192,544 mailed on May 25, 2011; 23 pages.

Restriction Requirement for U.S. Appl. No. 11/956,200 mailed on Jun. 3, 2011; 7 pages.

Non-Final Office Action for U.S. Appl. No. 11/956,200 mailed on Aug. 3, 2011; 22 pages.

Final Office Action for U.S. Appl. No. 12/192,544 mailed on Sep. 13, 2011; 11 pages.

Final Office Action for U.S. Appl. No. 12/250,384 mailed on Sep. 28, 2011; 7 pages.

Horn, Uwe, et. al., "Scalable Video Coding for Multimedia Applications and Robust Transmission over Wireless Channels", 7th International Workshop on Packet Video, Mar. 1996, pp. 43-48.

Schierl, T. et al., "Using H.264/AVC-Based Scalable Video Coding (SVC) for Real Time Streaming in Wireless IP Networks", IEEE International Symposium on Circuits and Systems (ISCAS), May 27-30, 2007, pp. 3455-3458.

(56) References Cited

OTHER PUBLICATIONS

Restriction Requirement for U.S. Appl. No. 12/192,544 mailed on Mar. 31, 2011; 6 pages.
Notice of Allowance for U.S. Appl. No. 12/250,392 mailed on Mar. 18, 2011; 9 pages.
Decision on Petition to Make Special 37 CFR 1.102 for U.S. Appl. No. 12/250,384 mailed on Feb. 14, 2011; 2 pages.
Decision on Petition to Make Special 37 CFR 1.102 for U.S. Appl. No. 12/192,544 mailed on Feb. 14, 2011; 2 pages.
Decision on Petition to Make Special 37 CFR 1.102 for U.S. Appl. No. 11/956,200 mailed on Feb. 9, 2011; 2 pages.
Notice of Allowance for U.S. Appl. No. 12/250,394 mailed on Feb. 8, 2011; 9 pages.
Notice of Allowance for U.S. Appl. No. 12/250,392 mailed on Dec. 8, 2010; 9 pages.
Non-Final Office Action for U.S. Patent Application No. 12/250,394 mailed on Sep. 14, 2010; 12 pages.
Notice of Allowance for U.S. Appl. No. 12/250,394 mailed on Aug. 4, 2010, 9 pages.
Non-Final Office Action for U.S. Appl. No. 12/250,392, mailed on May 27, 2010; 17 pages.
First Examination Report for Australian Patent Application No. 2007333037 of Jun. 18, 2010; 2 pages.
Notice of Allowance for U.S. Appl. No. 12/762,283, mailed on Dec. 3, 2012, 10 pages.
Notice of Allowance for U.S. Appl. No. 12/762,285, mailed on Dec. 20, 2012, 18 pages.
Notice of Allowance for U.S. Appl. No. 12/762,293, mailed on Dec. 21, 2012, 15 pages.
Notice of Allowability for U.S. Appl. No. 12/762,285, mailed on Jan. 3, 2013, 15 pages.
Notice of Allowability for U.S. Appl. No. 12/762,293, mailed on Jan. 3, 2013, 12 pages.
Non-Final Office Action for U.S. Appl. No. 12/762,285, mailed on Aug. 28, 2012, 13 pages.
Non-Final Office Action for U.S. Appl. No. 12/762,293, mailed on Aug. 29, 2012, 13 pages.
Non-Final Office Action for U.S. Appl. No. 12/762,283, mailed on Aug. 29, 2012, 13 pages.
Notice of Allowance for U.S. Appl. No. 12/250,384 mailed on Jul. 30, 2012; 9 pages.
Non-Final Office Action for U.S. Appl. No. 12/762,280, mailed on Sep. 20, 2012, 39 pages.
Office Action for EP Patent Application No. 07865659.2, mailed on Aug. 22, 2013, 5 pages.

\* cited by examiner

| Modulation and Coding Scheme | Identifier |
|---|---|
| QPSK 1/4 | 1 |
| QPSK 1/3 | 2 |
| QPSK 2/5 | 3 |
| QPSK 1/2 | 4 |
| QPSK 3/5 | 5 |
| QPSK 2/3 | 6 |
| QPSK 3/4 | 7 |
| QPSK 4/5 | 8 |
| QPSK 5/6 | 9 |
| QPSK 8/9 | 10 |
| QPSK 9/10 | 11 |
| 8PSK 3/5 | 12 |
| 8PSK 2/3 | 13 |
| 8PSK 3/4 | 14 |
| 8PSK 5/6 | 15 |
| 8PSK 8/9 | 16 |
| 8PSK 9/10 | 17 |
| 16APSK 2/3 | 18 |
| 16APSK 3/4 | 19 |
| 16APSK 4/5 | 20 |
| 16APSK 5/6 | 21 |
| 16APSK 8/9 | 22 |
| 16APSK 9/10 | 23 |
| 32APSK 3/4 | 24 |
| 32APSK 4/5 | 25 |
| 32APSK 5/6 | 26 |
| 32APSK 8/9 | 27 |
| 32APSK 9/10 | 28 |

FIG. 7

Interpolated Base Layer at 90 kbps
(15% of 600 kbps source video bit rate)

Base Layer and Enhancement Layer at 600 kbps
(15% + 85% of 600 kbps source video bit rate)

MULTIPLE TRANSMISSION PATHS FOR HIERARCHICAL LAYERS

CROSS REFERENCES TO RELATED APPLICATIONS

The present application is a continuation-in-part of co-pending, commonly assigned U.S. patent application Ser. No. 12/250,394, filed on Oct. 13, 2008, and entitled "TERMINAL AWARE MULTICASTING," which is a continuation-in-part of co-pending, commonly assigned U.S. patent application Ser. No. 11/956,200, filed on Dec. 13, 2007, and entitled "ACM AWARE ENCODING SYSTEMS AND METHODS," which claims the benefit of U.S. Provisional Application No. 60/869,809, filed on Dec. 13, 2006, entitled "ADAPTIVE CODING & MODULATION (ACM) AWARE ENCODER SYSTEM," the entirety of each of which is herein incorporated by reference for all purposes.

The present application is also related to U.S. patent application Ser. No. 12/762,280, filed on Apr. 16, 2010, and entitled "VIDEO AND DATA NETWORK LOAD BALANCING"; U.S. patent application Ser. No. 12/762,283, filed on Apr. 16, 2010, and entitled "VIDEO AND DATA NETWORK LOAD BALANCING WITH VIDEO DROP"; U.S. patent application Ser. No. 12/762,285, filed on Apr. 16, 2010, and entitled "VIDEO AND DATA NETWORK LOAD BALANCING WITH VIDEO PLACEHOLDER"; and U.S. patent application Ser. No. 12/762,293, filed on Apr. 16, 2010, and entitled "ACM AND FIXED CODING AND MODULATION OF HIERARCHICAL LAYERS," the entirety of each of which is herein incorporated by reference for all purposes.

BACKGROUND

The present invention relates to data communications in general and, in particular, to adaptive coding and modulation.

Service providers may desire to use communication systems to provide high availability to high-quality services for their subscribers. Where the network desires to communicate the same or similar information to multiple terminals, however, communications with each terminal may have different characteristics. In certain cases, each terminal may have different and/or changing link conditions (e.g., due to geographic differences in weather, proximity to sources of interference, etc.) In other cases, each terminal may have different capabilities for handling (e.g., receiving, processing, displaying, etc.) information from the network.

These different terminal characteristics may result in differences in apparent availability or quality of services to subscribers. Techniques like adaptive coding and modulation (ACM) may dynamically adjust coding and modulation schemes to adapt to these changing link conditions. For example, as link conditions change, the availability of services may be increased or maintained by using more reliable (lower order) coding and modulation schemes. However, the network may typically send the information at the most reliable modcode to ensure that the terminal with the worst link conditions may still receive the information.

Lower order modulation and coding schemes may use more bandwidth to send error correction data, making them less bandwidth efficient. Because communication systems have limited bandwidth, decreasing bandwidth efficiency may decrease the amount of service-related information that may be transmitted per unit time. This trade-off may mean that service providers will have to choose between providing services with high availability or with high quality.

Thus, there may be a need in the art for new ways to dynamically adjust transmission parameters with an awareness of terminal capabilities to improve both the availability and the quality of network services in differing link conditions.

SUMMARY

An example of a method for hierarchical communication of a set of source data according to the disclosure includes: receiving source data representing content to be communicated to a data terminal; pre-coding at least some of the source data using a first pre-coding scheme to generate a first set of representation data, decodable independently to provide a set of first-level playback data representing the source data; pre-coding at least some of the source data using a second pre-coding scheme to generate a second set of representation data, decodable in combination with the first set of representation data to provide a set of second-level playback data representing the source data; associating the first set of representation data with a first coding and modulation scheme; associating the second set of representation data with a second coding and modulation scheme, wherein the second coding and modulation scheme is of a higher order than the first coding and modulation scheme; generating a first transmission by applying the first coding and modulation scheme to the first set of representation data; generating a second transmission by applying the second coding and modulation scheme to the second set of representation data; transmitting the first transmission to the data terminal on a first communication link; and transmitting the second transmission to the data terminal on a second communication link, wherein the second communication link differs from the first communication link.

Embodiments of such a method may include one or more of the following features. Each of the first pre-coding scheme and the second pre-coding scheme includes a data partitioning scheme using scalable video coding. The method further includes determining each of the first communication link and the second communication link to be one of a satellite link, a broadband Internet link, and a cellular data network link. The first communication link and the second communication link are determined to be satellite links on two separate frequency bands. The first communication link is determined to be a satellite link on a Ku band; and the second communication link is determined to be a satellite link on a Ka band. The first communication link is determined to be a broadband Internet link; and the second communication link is determined to be a satellite link.

An example of a method for hierarchical communication of a set of source data includes: receiving source data representing content to be communicated to a data terminal, the source data having a given bit rate; receiving bit rate data indicating a first bit rate and a second bit rate, a sum of the first bit rate and the second bit rate equaling the given bit rate of the source data; pre-coding at least some of the source data using a first pre-coding scheme to generate a first set of representation data, decodable independently to provide a set of first-level playback data representing the source data, the first set of representation data generated in part based on the first bit rate; pre-coding at least some of the source data using a second pre-coding scheme to generate a second set of representation data, decodable in combination with the first set of representation data to provide a set of second-level playback data representing the source data, the second set of representation data generated in part based on the second bit rate; associating the first set of representation data with a first coding and modulation scheme; associating the second set of representation data with a second coding and modulation scheme, wherein the second coding and modulation scheme is of a higher order than the first coding and modulation scheme; generating a first transmission by applying the first coding and modulation scheme to the first set of representation data; generating a second transmission by applying the second coding and modulation scheme to the second set of representation data; and transmitting the first transmission and the second transmission to the data terminal.

An example of a communications network configured for hierarchical communication of a set of source data includes: a data terminal adapted to receive transmissions over a first communication link and a second communication link, wherein the second communication link differs from the first communication link; a gateway in communication with the data terminal and including: a source data receiver module adapted to receive source data representing content to be communicated to the data terminal; a pre-coder module adapted to pre-code at least some of the source data using a first pre-coding scheme to generate a first set of representation data decodable independently to provide a set of first-level playback data representing the source data, and pre-code at least some of the source data using a second pre-coding scheme to generate a second set of representation data decodable in combination with the first set of representation data to provide a set of second-level playback data representing the source data; and an ACM module adapted to associate the first set of representation data with a first coding and modulation scheme, and associate the second set of representation data with a second coding and modulation scheme, wherein the second coding and modulation scheme is of a higher order than the first coding and modulation scheme; and a transceiver module adapted to generate a first transmission by applying the first coding and modulation scheme to the first set of representation data, generate a second transmission by applying the second coding and modulation scheme to the second set of representation data, transmitting the first transmission to the data terminal on the first communication link, and transmitting the second transmission to the data terminal on the second communication link.

Embodiments of such a network may include one or more of the following features. Each of the first pre-coding scheme and the second pre-coding scheme includes a data partitioning scheme using scalable video coding. The gateway further includes a network control module adapted to determine each of the first communication link and the second communication link to be one of a satellite link, a broadband Internet link, and a cellular data network link. The first communication link and the second communication link are determined to be satellite links on two separate frequency bands. The first communication link is determined to be a satellite link on a Ku band; and the second communication link is determined to be a satellite link on a Ka band. The first communication link is determined to be a broadband Internet link; and the second communication link is determined to be a satellite link.

An example of a communications network configured for hierarchical communication of a set of source data includes: a data terminal adapted to receive transmissions over a communication link; a gateway in communication with the data terminal and including: a source data receiver module adapted to receive source data representing content to be communicated to the data terminal, the source data having a given bit rate; a pre-coder module adapted to receive bit rate data indicating a first bit rate and a second bit rate, a sum of the first bit rate and the second bit rate equaling the given bit rate of the source data, pre-code at least some of the source data using a first pre-coding scheme to generate a first set of representation data decodable independently to provide a set of first-level playback data representing the source data, the first set of representation data generated in part based on the first bit rate, and pre-code at least some of the source data using a second pre-coding scheme to generate a second set of representation data decodable in combination with the first set of representation data to provide a set of second-level playback data representing the source data, the second set of representation data generated in part based on the second bit rate; and an ACM module adapted to associate the first set of representation data with a first coding and modulation scheme, and associate the second set of representation data with a second coding and modulation scheme, wherein the second coding and modulation scheme is of a higher order than the first coding and modulation scheme; and a transceiver module adapted to generate a first transmission by applying the first coding and modulation scheme to the first set of representation data, generate a second transmission by applying the second coding and modulation scheme to the second set of representation data, and transmitting the first transmission and the second transmission to the data terminal.

An example of a network access unit of a communications network configured to communicate with a data terminal adapted to receive transmissions over a first communication link and a second communication link, wherein the second communication link differs from the first communication link, includes: a source data receiver module adapted to receive source data representing content to be communicated to the data terminal; a pre-coder module adapted to pre-code at least some of the source data using a first pre-coding scheme to generate a first set of representation data decodable independently to provide a set of first-level playback data representing the source data, and pre-code at least some of the source data using a second pre-coding scheme to generate a second set of representation data decodable in combination with the first set of representation data to provide a set of second-level playback data representing the source data; and an ACM module adapted to associate the first set of representation data with a first coding and modulation scheme, and associate the second set of representation data with a second coding and modulation scheme, wherein the second coding and modulation scheme is of a higher order than the first coding and modulation scheme; and a transceiver module adapted to generate a first transmission by applying the first coding and modulation scheme to the first set of representation data, generate a second transmission by applying the second coding and modulation scheme to the second set of representation data, transmitting the first transmission to the data terminal on the first communication link, and transmitting the second transmission to the data terminal on the second communication link.

Embodiments of such a network access unit may include one or more of the following features. Each of the first pre-coding scheme and the second pre-coding scheme includes a data partitioning scheme using scalable video coding. The network access unit further includes a network control module adapted to determine each of the first communication link and the second communication link to be one of a satellite link, a broadband Internet link, and a cellular data network link. The first communication link and the second communication link are determined to be satellite links on two separate frequency bands. The first communication link is determined to be a satellite link on a Ku band; and the second communication link is determined to be a satellite link on a Ka band. The first communication link is determined to be a broadband Internet link; and the second communication link is determined to be a satellite link.

An example of a network access unit of a communications network configured to communicate with a data terminal adapted to receive transmissions over a communication link includes: a source data receiver module adapted to receive source data representing content to be communicated to the data terminal, the source data having a given bit rate; a pre-coder module adapted to receive bit rate data indicating a first bit rate and a second bit rate, a sum of the first bit rate and the second bit rate equaling the given bit rate of the source data, pre-code at least some of the source data using a first pre-coding scheme to generate a first set of representation data decodable independently to provide a set of first-level playback data representing the source data, the first set of representation data generated in part based on the first bit rate, and pre-code at least some of the source data using a second pre-coding scheme to generate a second set of representation data decodable in combination with the first set of representation data to provide a set of second-level playback data representing the source data, the second set of representation data generated in part based on the second bit rate; and an ACM module adapted to associate the first set of representation data with a first coding and modulation scheme, and associate the second set of representation data with a second coding and modulation scheme, wherein the second coding and modulation scheme is of a higher order than the first coding and modulation scheme; and a transceiver module adapted to generate a first transmission by applying the first coding and modulation scheme to the first set of representation data, generate a second transmission by applying the second coding and modulation scheme to the second set of representation data, and transmitting the first transmission and the second transmission to the data terminal.

Items and/or techniques described herein may provide one or more of the following capabilities. A communication system provides multiple transmission paths (e.g., one or more satellite links, a broadband Internet link, and/or or a cellular data network link) for transmitting hierarchical layers of video programs. The transmissions can be via broadcast, multicast, or unicast. Alternatively or additionally, the communication system can vary the allocation of bit rate percentages of a program to the hierarchical layers of the program. The communication system can determine a combination of transmission paths and/or the bit rate allocation of programs based on configurable objectives, such as increasing the availability of a program, reducing the cost to deliver the program, or network congestion. The combination of transmission paths and/or the bit rate allocation can be determined automatically per program, per subscriber, per group of subscribers, or as a policy configurable by a network operator. The hierarchical layers of a program can correspond to devices with different display capabilities, such as a smart phone, a video screen in a car, and a high-definition television in a home. While item/technique-effect pairs have been described, it may be possible for a noted effect to be achieved by means other than those noted, and a noted item/technique may not necessarily yield the noted effect.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a lower-case character or a dash and a second label that distinguishes among the similar components. If only the first reference label is used in the specification, the description is applicable to any one of the similar components having the same first reference label irrespective of the second reference label.

FIG. 7 provides an illustration of an exemplary identifier table for use with various embodiments of the invention.

DETAILED DESCRIPTION

This description provides exemplary embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Among other things, the description provides methods, systems, and devices for dynamically adjusting transmission parameters with an awareness of terminal capabilities to improve both the availability and the quality of network services in differing link conditions.

Figure 1:
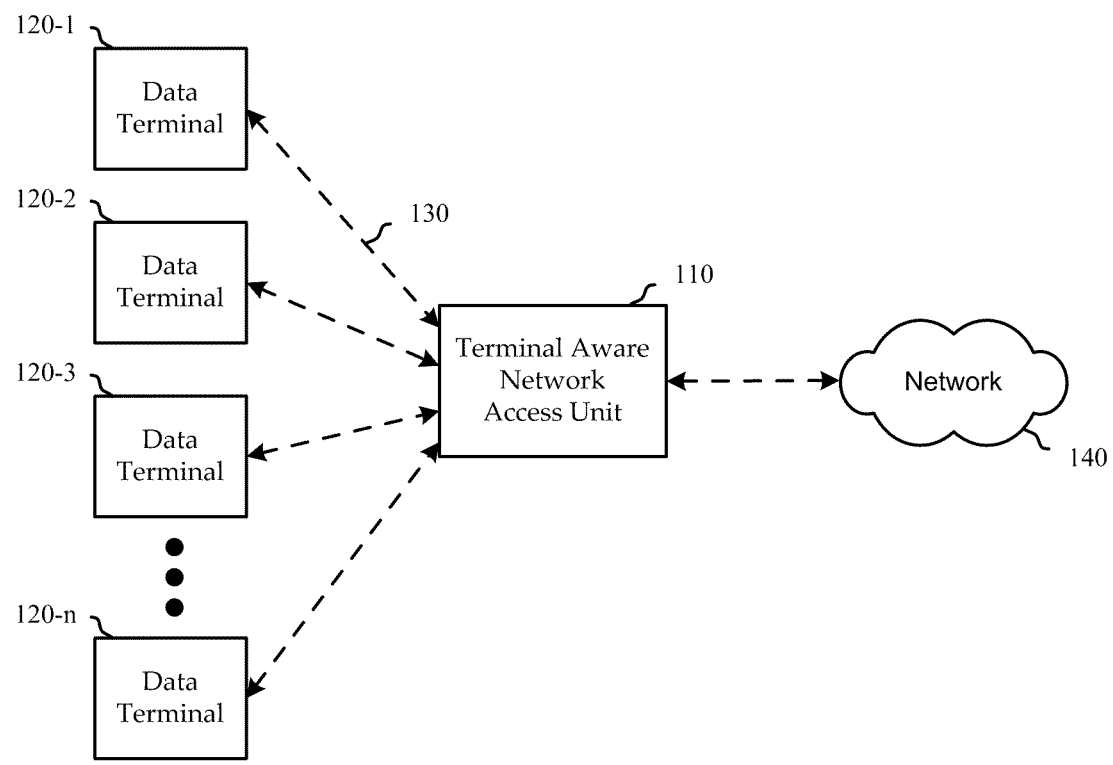
FIG. 1 shows a simplified block diagram of a portion of a communication network, according to various embodiments of the invention.

Turning first to FIG. 1, a simplified block diagram of a portion of a communication network is shown, according to various embodiments of the invention. The communication network 100 includes a network access unit 110 and a number of network data terminals 120. The network access unit 110 may receive information from other portions of the network 140 and communicate the information with the network data terminals 120 over one or more communication links 130.

In some embodiments, the communication network 100 includes a satellite communication network in which the network access unit 110 is a gateway, adapted to transmit information to network data terminals 120. The network data terminals 120 may include subscriber terminals, including devices having satellite receivers. For example, the network data terminals 120 may include satellite telephones, global positioning satellite ("GPS") units, satellite radios, etc.

In other embodiments, the communication network 100 includes a cellular communication network in which the network access unit 110 is a cell (or multiple cells), adapted to transmit information to network data terminals 120, including devices having cellular receivers (e.g., cell phones). In yet other embodiments, the communication network 100 includes other types of networks, including local area networks, wide area networks, secure networks, the Internet, etc. The communication network 100 uses one or more other types of communication links 130, including short-range wireless links, long-range wireless links, cellular links, optical links, wired links, parallel links, etc.

In these and other communication networks 100, service providers may desire to provide high availability to high-quality services for their subscribers. Where the communication network 100 desires to communicate the same or similar information to multiple data terminals 120, however, communications with each data terminal 120 may have different characteristics. These different data terminal 120 characteristics may result in differences in apparent availability or quality of services to subscribers.

In one embodiment, various data terminals 120 in a network have different and/or changing link conditions for their respective communication links 130. For example, in a satellite network, one data terminal 120 may be a satellite receiver mounted on a house located in an adverse weather area, another data terminal 120 may be a global positioning satellite ("GPS") receiver located in a car in an underground parking garage, and a third data terminal 120 may be a satellite radio receiver located in a vehicle moving through a city. Each of these data terminals 120 may see different link conditions with the network access unit 110, and some of these data terminals 120 may see dynamically changing link conditions.

In another embodiment, various data terminals 120 in a network have different capabilities for handling information from the communication network 100. For example, a network subscriber may be able to access video on both a cellular telephone and a home high-definition television ("HDTV"). The cellular telephone may have lower resolution, a smaller screen, a less reliable communication link, etc. Still, the subscriber may wish to experience the media on both devices (e.g., by previewing the video on the cellular phone during a commute and watching the full, HDTV version after arriving at home).

It will be appreciated that different data terminal 120 characteristics may result in differences in apparent availability or quality of services to subscribers. Various techniques may dynamically adjust coding and modulation schemes to adapt to these changing link conditions. For example, techniques like adaptive coding and modulation ("ACM") may increase or maintain the integrity of services as link conditions change by using more reliable (e.g., lower order) coding and modulation schemes.

Lower order modulation and coding schemes may use more bandwidth to send error correction data, making them less bandwidth efficient. Because the communication network 100 may have limited bandwidth, decreasing bandwidth efficiency may decrease the amount of service-related information that may be transmitted per unit time over each communication link 130. This trade-off may mean that service providers will have to choose between providing services with high availability or with high quality. Further, because the communication network 100 may determine how to send information according to the data terminal 120 with the worst link conditions (i.e., so that terminal may still receive the information), local changes in link condition may adversely impact the performance (e.g., integrity, throughput, etc.) of the entire communication network 100.

For these and other reasons, it may be desirable for the communication network to adapt its transmissions based on characteristics of individual data terminals 120, rather than based on the network as a whole. For example, transmissions may be dynamically optimized to provide higher quality services and/or higher service availability to individual data terminals 120, regions, etc. that are able to support it. As such, regional changes in link conditions may only affect services to those regions, without affecting the network as a whole.

It will be further appreciated that, in some embodiments, multiple data terminals 120 may be associated with each other in one or more ways. In some embodiments, multiple data terminals 120 are associated, so that content received by one data terminal 120 is also received by others. Making the communication network 100 aware of this association may allow the communication network 100 to provide additional adaptive functionality. For example, the communication network 100 may be able to adapt to the combined capabilities of the data terminals 120 or in some other way.

In one embodiment, a first data terminal 120-1 is a cellular telephone with low-definition video display capability, and a second data terminal 120-2 is a networked high-definition television, located at a subscriber's premises and associated with the first data terminal 120-1. While commuting, the subscriber uses the first data terminal 120-1 to request download of a favorite television show available online. Low definition content is distributed to the subscriber's cellular telephone (e.g., because that may be all the cellular telephone can display) at a relatively low order modcode (e.g., to provide a more reliable transmission while the subscriber commutes through various regions of the network). At the same time, a high definition version of the same content may begin to download to the subscriber's high definition television (the second data terminal 120-2) at a higher order modcode (e.g., the higher definition data may be able to be transmitted with less overhead because of the relatively stable link condition of the television).

In another embodiment, a first data terminal 120-1 is a cellular telephone with low-definition video display capability, and a second data terminal 120-2 is a networked high-definition television, located at a subscriber's premises and associated with the first data terminal 120-1. Again, while commuting, the subscriber uses the first data terminal 120-1 to request download of a favorite television show available online. Low definition content is distributed to the subscriber's cellular telephone (e.g., because that may be all the cellular telephone can display) at a relatively low order modcode (e.g., to provide a more reliable transmission while the subscriber commutes through various regions of the network). At the same time, content optimized for use by the second data terminal 120-2 may begin to download to cache memory in the first data terminal 120-1 (e.g., higher definition data may be transmitted at the same or a different modcode as the lower definition data). When the subscriber reaches the subscriber's premises, the first data terminal 120-1 and the second data terminal 120-2 may be communicatively coupled (e.g., synched through a wired or wireless connection), by which the higher definition data (or at least the portion of data that has been cached) may be directly transferred to the second data terminal 120-2.

In still another embodiment, a first data terminal 120-1 and a second data terminal 120-2 both subscribe to the same massively multiplayer online game. It may be desirable to adapt transmission of game content as a function of the capabilities of both data terminals (i.e., 120-1 and 120-2). For example, this may help ensure that no one player has an advantage due to a better communication link, or that certain important game data is lost or out of synchronization due to differences in capabilities.

Figure 2:
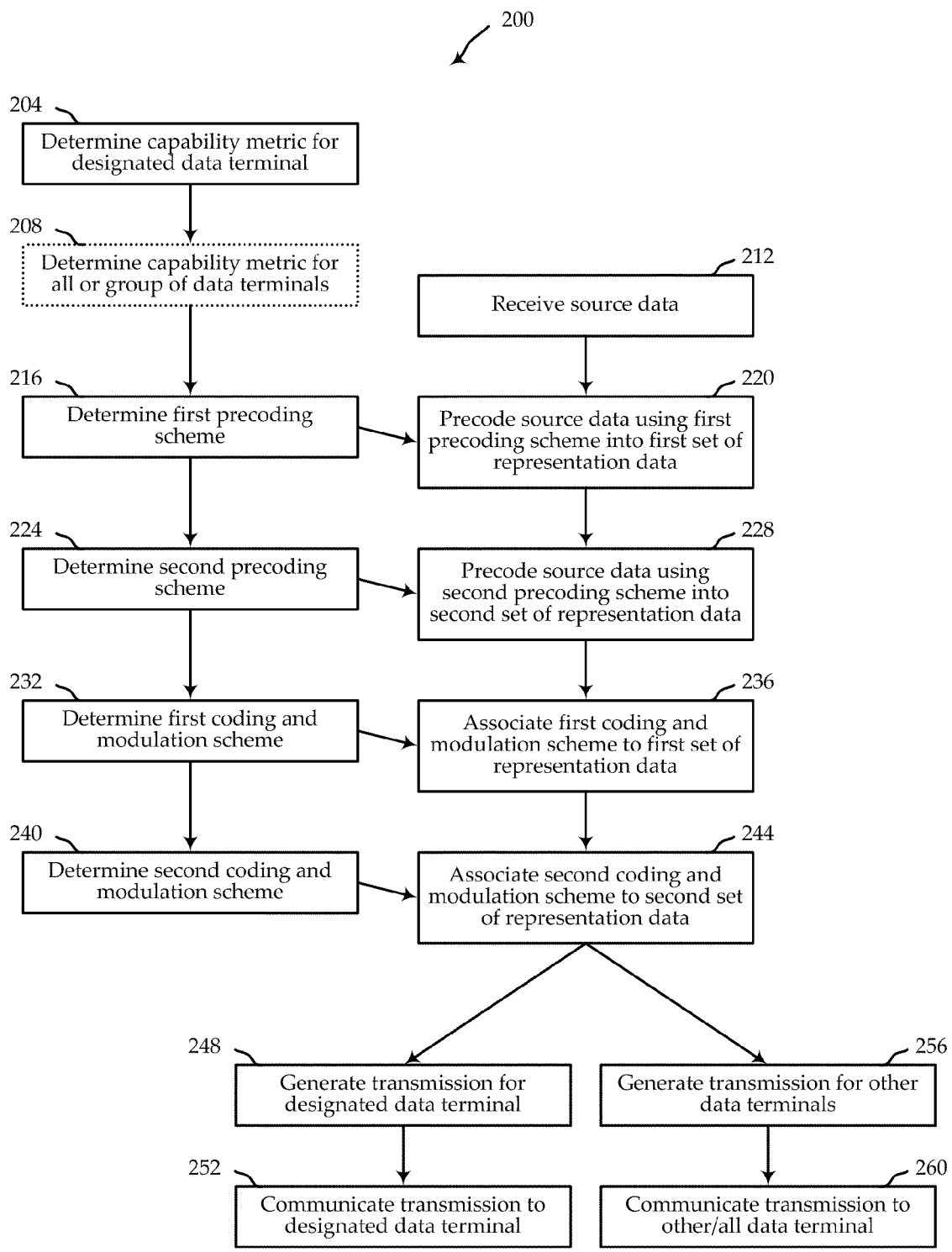
FIG. 2 shows an illustrative flow diagram of methods for providing terminal aware communications, according to various embodiments of the invention.

Of course, there are many ways of implementing and exploiting terminal aware adaptive communications. FIG. 2 shows an illustrative flow diagram of methods for providing terminal aware communications, according to various embodiments of the invention. The illustrative method 200 is described with reference to a generic communication network, like the one shown in FIG. 1, in which a network access unit communicates with multiple data terminals. Embodiments of the network intend to communicate a communication to at least a designated one of the data terminals.

The method 200 begins at block 204 by determining a capability metric of a designated data terminal. The capability metric may define any useful capability of the terminal that may affect the terminal's ability to handle (e.g., receive, use, etc.) content over the network. In one embodiment, the capability metric relates to a capability of the communication link between the network access unit and the designated data terminal. For example, the capability metric may relate to communication link characteristics, including bandwidth, throughput, bit error rates, etc. In another embodiment, the capability metric relates to a receiving capability of the designated data terminal. For example, the capability metric may relate to the designated data terminal's antenna, protocol compatibility, buffering capability, etc. In still another embodiment, the capability metric relates to a playback capability of the designated data terminal. For example, the capability metric may relate to the designated data terminal's screen resolution or fidelity, audio playback fidelity, etc.

Further, the capability metric may be determined at block 204 in many different ways. In some embodiments, the network access unit or other network element is adapted to test certain capability metrics either directly or indirectly. For example, a network tester module in the network access unit may be adapted to send test data through the network and track the communication to approximate bandwidth measurements. In other embodiments, the data terminals may be adapted to communicate certain capability metrics (e.g., or information useful in generating the capability metrics) to the network access unit. It will be appreciated that many other ways of generating capability metrics are possible, according to embodiments of the invention.

In some embodiments, the same or other techniques may be used to generate the same or other capability metrics from other data terminals in block 208. In some embodiments, all or a portion of the data terminals in the network are evaluated to generate macro-metrics of the capabilities of all or part of the network. For example, capability metrics may be generated for multiple data terminals to generate a minimum, maximum, average, median, or other statistically useful result. In one embodiment, the network access unit keeps track of a minimum capability metric, for example, to be able to transmit at least for a worst-case capability.

It will be appreciated that the capability metrics generated in blocks 204 and 208 may be used in a number of ways. In some embodiments, a capability map may be generated. In one embodiment, the map is used to understand capabilities of the network by either data terminal, geographic region, data terminal type, account holder, etc. In another embodiment, content may be offered at least partially as a function of the capability map.

At block 212, content is received as source data. For example, the source data may include an audiovisual data file. Embodiments of the method 200 generate communication data for communicating the source data to one or more data terminals in the network, at least including the designated terminal. Some of these embodiments use ACM aware encoding schemes, as described more fully below.

In some embodiments, a first pre-coding scheme is determined at block 216 and a second pre-coding scheme is determined at block 224. In certain embodiments, the first and/or second pre-coding schemes are determined at least partially as a function of the capability metrics generated in blocks 204 and/or 208. The pre-coding schemes may further be determined as a function of characteristics of the source data (e.g., the type, priority, file size, etc.).

The pre-coding schemes determined in blocks 216 and 224 may then be applied to the source data to generate first and second sets of representation data in blocks 220 and 228, respectively. As discussed more fully below, embodiments of the invention use hierarchical pre-coding schemes, resulting in hierarchical representation sets of the source data. For example, the first pre-coding scheme may generate a base layer of the source data (e.g., the most basic information needed to be able to recreate the source data at some resolution or fidelity), and the second pre-coding scheme may generate an enhancement layer of the source data (e.g., additional information useful for enhancing the recreation of the source data, like data for increasing resolution or color depth). It will be appreciated that any number of pre-coding schemes may be used, according to embodiments of the invention. For example, additional enhancement layers may be generated for additional hierarchical representations of the source data.

In some embodiments, a first coding and modulation scheme is determined at block 232 and a second coding and modulation scheme is determined at block 240. In certain embodiments, the first and/or second coding and modulation schemes are determined at least partially as a function of the capability metrics generated in blocks 204 and/or 208. The coding and modulation schemes may further be determined as a function of characteristics of the source data (e.g., the type, priority, file size, etc.).

At blocks 236 and 244, the coding and modulation schemes determined in blocks 232 and 240 may be associated with the representation data sets generated in blocks 220 and 228. In some embodiments, the first coding and modulation scheme is applied to the first representation data set in block 236 and the second coding and modulation scheme is applied to the second representation data set in block 244. In other embodiments, a signal coding and modulation is applied to multiple representation data sets. In still other embodiments, multiple coding and modulation schemes are applied to single representation data sets.

It will be appreciated that these and other techniques may be used to generate a hierarchical encoding of the source data. At block 248, the method 200 generates a transmission for the designated data terminal. It is worth noting that, because the source data was encoded at least partially as a function of the capabilities of the designated data terminal, the transmission may be optimized for communication with the designated data terminal. The transmission may be communicated to the designated data terminal at block 252.

In some embodiments, at block 256, the method 200 generates a transmission for other data terminals, including or in addition to the designated data terminal. It is worth noting that, because the source data was encoded at least partially as a function of the capabilities of other data terminals in certain embodiments, the transmission may be optimized for communication with a portion of the network (or the entire network). The transmission may be communicated to the other data terminals at block 260.

In one embodiment, the communication is generated in block 256 by applying the first, high-reliability, coding and modulation scheme to the first representation data set, to generate a high-reliability transmission of a base layer of the source data. This high-reliability base layer representation may then be broadcast to the entire network at block 260. A second communication is generated in block 248 by applying the second, lower-reliability, coding and modulation scheme to the second representation data set, to generate a lower-reliability transmission of an enhancement layer of the source data. The lower-reliability enhancement layer data may then be unicast to the designated data terminal at block 252. Alternately, the lower-reliability enhancement layer data may be combined (e.g., multiplexed) with the first communication (e.g., high-reliability base layer) data to generate the second communication. The multiplexed data may then be unicast to the designated data terminal at block 252.

It will be appreciated that many types of communication network 100 are possible for providing terminal aware communications. Systems and methods for providing terminal aware communications, including providing ACM-aware hierarchical encoding for handling different terminal conditions, are shown in FIGS. 3-12. These systems and methods are provided for illustrative purposes only and should not be construed as limiting the scope of the invention.

Figure 3:
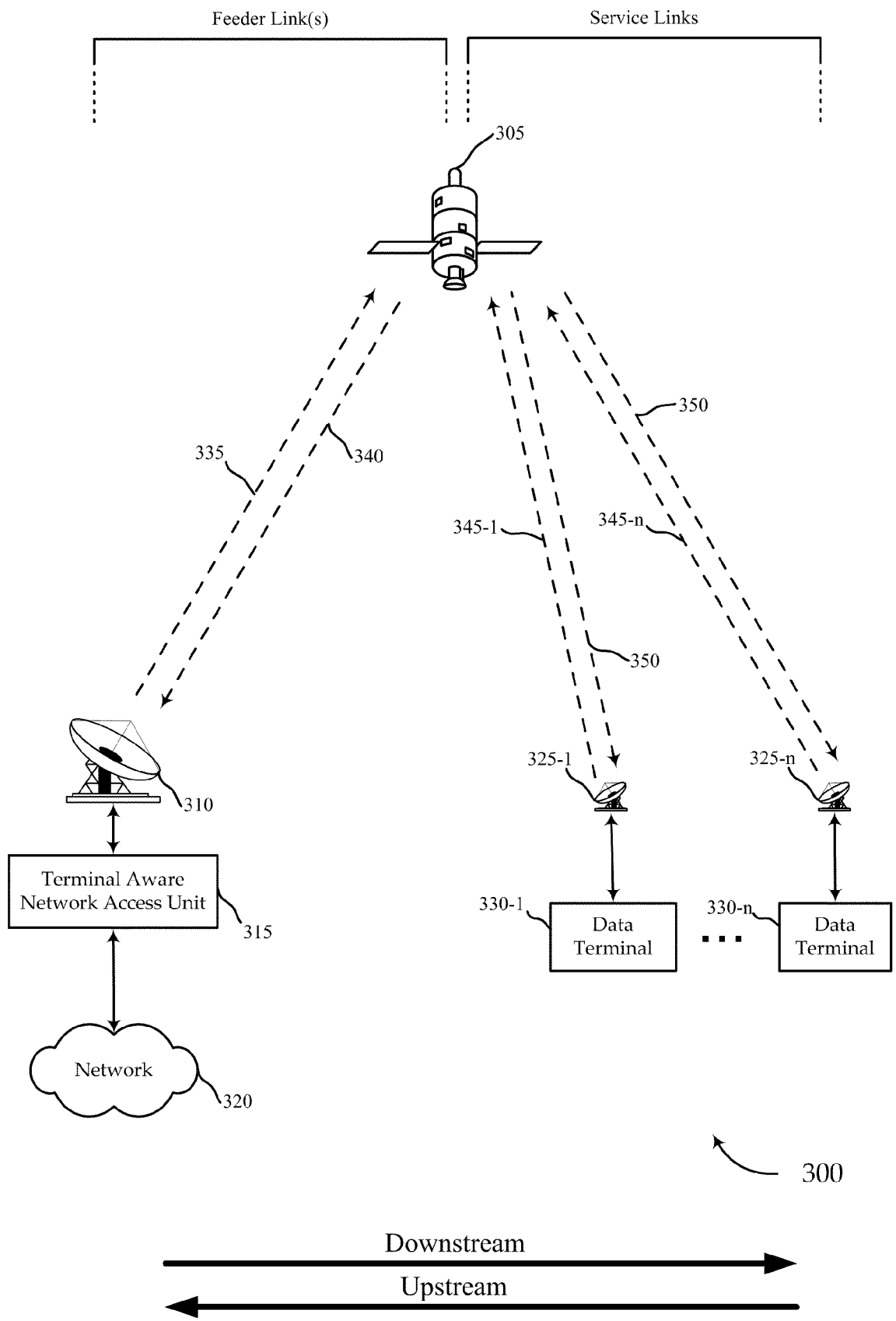
FIG. 3 provides a simplified block diagram of a satellite communication system for use with various embodiments of the invention.

FIG. 3 shows a simplified block diagram of a satellite communication system for use with various embodiments of the invention. While a satellite communication system is used to illustrate various aspects of the invention, it is worth noting that certain principles set forth herein are applicable to a variety of other wireless systems, as well. The satellite communications system 300 includes a network 320 (e.g., like network 140 of FIG. 1), such as the Internet, interfaced with a terminal aware network access unit 315 (e.g., like terminal aware network access unit 110 of FIG. 1) that is configured to communicate with one or more data terminals 330 (e.g., like data terminals 120 of FIG. 1), via a satellite 305.

The network 320 may be any type of network and can include, for example, the Internet, an IP network, an intranet, a local- or wide-area network, a virtual private network, the Public Switched Telephone Network ("PSTN"), or any other type of network supporting data communication between devices described herein, in different embodiments. A network 320 may include both wired and wireless connections, including optical links. The network 320 may also transmit information about link conditions for one or more data terminals 330 to the gateway 315. The network 320 may connect the terminal aware network access unit 315 with other gateways (not pictured), which are also in communication with the satellite 305, and which may share information on link conditions and other network metrics.

The terminal aware network access unit 315 provides an interface between the network 320 and the data terminal 330. The terminal aware network access unit 315 may be configured to receive data and information directed to one or more data terminals 330, and can format the data and information for delivery to the respective destination data terminal 330 via the satellite 305. Similarly, the terminal aware network access unit 315 may be configured to receive upstream signals from the satellite 305 (e.g., from one or more data terminals 330) directed to a destination in the network 320, and can format the received signals for transmission along the network 320.

For example, the terminal aware network access unit 315 may use ACM to generate a layered transmission of the information. ACM may allow the satellite communication system 300 to dynamically adjust the coding and modulation schemes applied to transmissions to adapt to changing link conditions. Lower order coding and modulation schemes may use lower order modulation and lower information densities to provide more reliable transmission of information over the communication link. Thus, while lower order coding and modulation schemes may be more reliable, they may also be less bandwidth efficient (e.g., less information may be transmitted per unit bandwidth per unit time). This may mean that, in order to maintain the availability of communications over the satellite communication network 300 in changing link conditions, service providers may have to change the amount of information transmitted to their subscribers per unit time.

Table 1 (below) provides a purely exemplary set of data to further clarify the trade-off between availability and bandwidth efficiency. As such, the data in Table 1 should not be construed as limiting the scope of the invention. Referring to Table 1, the leftmost column shows the availability of an exemplary communication system ranging from 99% to 99.99%. The remaining columns, from left to right, show metrics relating to the link margin, signal-to-noise ratio, coding and modulation scheme, and bandwidth efficiency of the exemplary communication system, respectively. As illustrated by Table 1, lower order coding and modulation schemes are used to increase availability of the network (i.e., the coding and modulation scheme is changed from 16APSK ¾ to QPSK ¾ to increase availability from 99% to 99.99%).

The illustrative result shows a decrease in bandwidth efficiency from 2.97 to 1.32, almost a 60% decrease in bandwidth efficiency.

TABLE 1

Availability vs. Bandwidth Efficiency

| Availability | Link Margin (dB) | Operating Es/N0 (dB) | Selected Coding and Modulation Scheme | Bandwidth Efficiency |
|---|---|---|---|---|
| 99% | 0.53 | 10.67 | 16APSK ¾ | 2.97 |
| 99.9% | 2.33 | 8.87 | 8PSK ¾ | 2.23 |
| 99.99% | 7.19 | 4.01 | QPSK ¾ | 1.32 |

In some embodiments, the terminal aware network access unit 315 may further use hierarchical pre-coding schemes at least in part to mitigate the trade-off between availability and bandwidth efficiency. In certain embodiments, hierarchical pre-coding schemes may include simulcasting (simultaneously broadcasting) multiple versions of a set of source data (e.g., standard- and high-definition versions of a video stream). In other embodiments, hierarchical pre-coding schemes may include scalable pre-coding schemes, data partitioning schemes, and other pre-coding schemes, as described below. In certain embodiments, the hierarchically pre-coded data may be adaptively coded and/or modulated for transmission over the communication link in a layered fashion. In this way, it may be possible to affect either or both of availability and bandwidth efficiency per each hierarchical data layer, adding flexibility to the satellite communication system 300.

In certain embodiments, the terminal aware network access unit 315 may use either or both of ACM and hierarchical pre-coding schemes. In one example, multiple hierarchical layers are created, but a single coding and modulation scheme is used for all the layers. In another example, a single layer may be sent using multiple coding and modulation schemes. In other embodiments, the terminal aware network access unit 315 may pre-code, code, and/or modulate only a portion of the data. For example, the terminal aware network access unit 315 may detect that only enough bandwidth is available to transmit a single layer over the communication link. In this case, it may be efficient for the terminal aware network access unit 315 to generate only a single layer for some or all of the incoming source data.

A device connected to the network 320 may communicate with one or more data terminals 330 through the gateway 315. Data and information, for example IP datagrams, may be sent from a device in the network 320 to the gateway 315. A variety of physical layer transmission modulation and coding techniques may be used with certain embodiments of the invention, including those defined with the DVB-S2 and WiMAX standards. In a number of embodiments, the terminal aware network access unit 315 utilizes ACM in conjunction with one or more hierarchical data pre-coding schemes described herein to direct traffic to the individual terminals. The terminal aware network access unit 315 may use a broadcast signal, with a modulation and coding format adapted for each packet to the link conditions of the data terminal 330 or set of data terminals 330 to which the packet is directed (e.g., to account for the variable service link 350 conditions from the satellite 305 to each respective data terminal 330).

The terminal aware network access unit 315 may use an antenna 310 to transmit the signal or signals to the satellite 305. In one embodiment, the antenna 310 comprises a parabolic reflector with high directivity in the direction of the satellite and low directivity in other directions. The antenna 310 may be implemented in a variety of alternative configurations. The downstream signals may include, for example, a number of single carrier signals. Each signal carrier signal may be divided (e.g., using Time Division Multiple Access, or "TDMA") into a number of virtual channels. The virtual channels may be the same size, or different sizes. In other embodiments, other channelization schemes may be used, such as Frequency Division Multiple Access ("FDMA"), Orthogonal Frequency Division Multiple Access ("OFDMA"), Code Division Multiple Access ("CDMA"), or any number of hybrid or other schemes known in the art.

In one embodiment, a geostationary satellite 305 is configured to receive the signals from the location of antenna 310 and within the frequency band and specific polarization transmitted. The satellite 305 may process the signals received from the terminal aware network access unit 315 and forward the signal from the terminal aware network access unit 315 to one or more data terminals 330. In some embodiments, only a portion of the data terminals 330 may be able to receive some or all of the signals due to certain link conditions.

In another embodiment, the satellite 305 operates in a multi-beam mode, transmitting a number of narrow beams each directed at a different region of the earth, allowing for frequency re-use. This satellite 305 may be configured as a "bent pipe" satellite, wherein the satellite may frequency convert the received carrier signals before retransmitting these signals to their destination, but otherwise perform little or no other processing on the contents of the signals. A variety of physical layer transmission modulation and coding techniques may be used by the satellite 305 in accordance with certain embodiments of the invention, including those defined with the DVB-S2 and WiMAX standards. For other embodiments, a number of configurations are possible (e.g., using LEO satellites, or using mesh networks instead of star networks), as known in the art.

The service signals 350 transmitted from the satellite 305 may be received by one or more data terminals 330, via the respective subscriber antenna 325. The data terminals 330 may receive the signals from the satellite 305 under very diverse link conditions. In certain embodiments, the data terminals 330 may decode the received signals differently based on how they are received in different link conditions.

In one embodiment, the antenna 325 and terminal 330 together comprise a very small aperture terminal ("VSAT"). In other embodiments, a variety of other types of antennas 325 may be used at the data terminal 330 to receive a signal. Each of the data terminals 330 may comprise a single user terminal or, alternatively, a hub or router (not pictured) that is coupled to multiple user terminals. In some embodiments, each data terminal is connected to additional systems, devices, components, etc. (e.g., consumer premises equipment ("CPE"), computers, local area networks, Internet appliances, wireless networks, etc.).

In one embodiment, a Multi-Frequency Time-Division Multiple Access ("MF-TDMA") scheme is used for upstream links 340, 345, allowing efficient streaming of traffic while maintaining flexibility in allocating capacity among each of the data terminals 330. In this embodiment, a number of frequency channels are allocated which may be fixed, or which may be allocated in a more dynamic fashion. A TDMA scheme is also employed in each frequency channel. In this scheme, each frequency channel may be divided into several timeslots that can be assigned to a connection (i.e., a data terminal 330). In other embodiments, one or more of the upstream links 340, 345 may be configured with other schemes, such as FDMA, OFDMA, CDMA, or any number of hybrid or other schemes known in the art.

A data terminal 330 may transmit information related to signal quality to the terminal aware network access unit 315 via the satellite 305. The signal quality may be a measured signal to noise ratio, an estimated signal to noise ratio, a bit error rate, a received power level, or any other communication link quality indicator. The data terminal 330 itself may measure or estimate the signal quality, or it may pass information measured or estimated by other devices. This signal quality information may be used by the terminal aware network access unit 315 in some embodiments to adapt pre-coding schemes or coding and modulation schemes to match link conditions.

A data terminal 330 may also transmit data and information to a network 320 destination via the satellite 305 and terminal aware network access unit 315. The data terminal 330 transmits the signals via the upstream uplink 345 to the satellite 305 using the antenna 325. A data terminal 330 may transmit the signals according to a variety of physical layer transmission modulation and coding techniques, including those defined with the DVB-S2 and WiMAX standards. In various embodiments, the physical layer techniques may be the same for each of the links 335, 340, 345, 350, or may be different.

The functions of the components of the satellite communication system 300 may be implemented in a number of different ways. For example, some or all of the functionality of the terminal aware network access unit 315 or the data terminals 330 may be implemented in other components of the system, for example in the satellite 305. Further, many embodiments of terminal aware network access units 315 and data terminals 330 are possible according to the invention.

Figure 4:
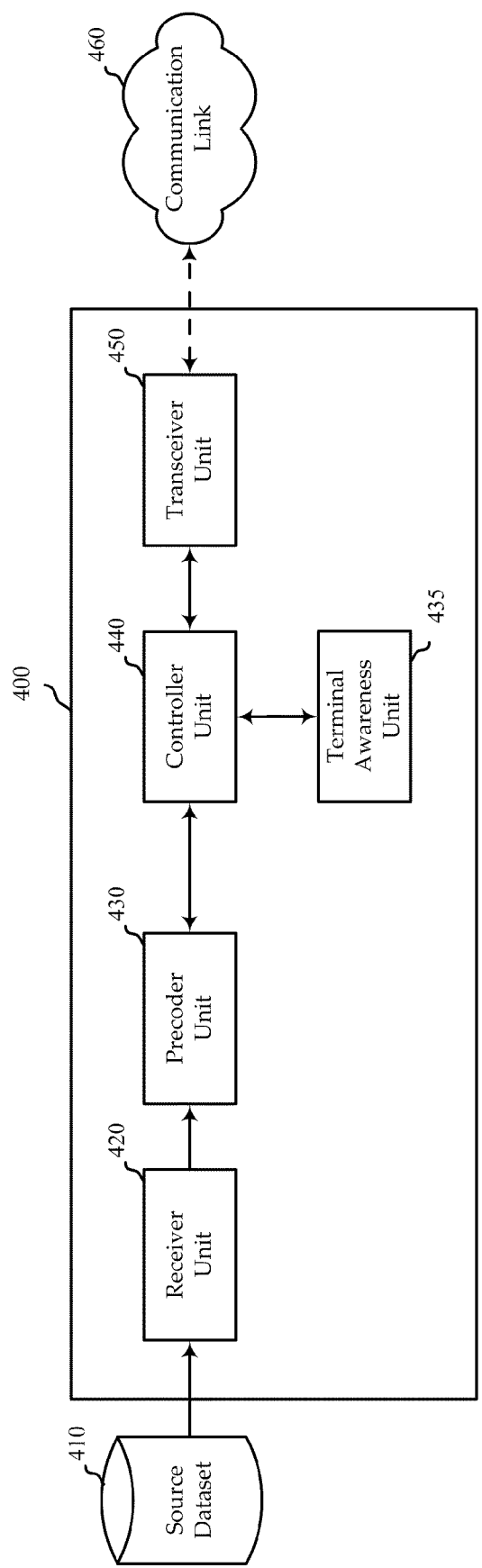
FIG. 4 provides a simplified block diagram of a device configured according to various embodiments of the invention.

FIG. 4 provides a simplified block diagram of an embodiment of a terminal aware network access unit 400 configured according to various embodiments of the invention. In some embodiments, the terminal aware network access unit 400 transmits packets downstream to data terminals 330 (e.g., as in satellite communication system 300 of FIG. 3). It is worth noting that the functionality of the terminal aware network access unit 400 may be implemented in any number of different ways.

In some embodiments, the terminal aware network access unit 400 includes a receiver unit 420, a pre-coder unit 430, a controller unit 440, and a transceiver unit 450. The terminal aware network access unit 400 may receive a set of source data 410, process the data using various components, and transmit the data over a communication link 460.

In some embodiments, the terminal aware network access unit 400 includes the receiver unit 420, which receives the set of source data 410. The set of source data 410 may include, for example, audio data, video data, voice data, or any other type of data. The receiver unit 420 may include any hardware, software, or other components necessary to receive the set of source data 410. For example, the receiver unit 420 may include amplifiers, buffers, ports, codecs, etc. In one embodiment, the set of source data 410 includes an audio-visual data stream, which is received by the receiver unit 420 from a data network through a data port.

The receiver unit 420 may pass all or a portion of the set of source data 410 to the pre-coder unit 430. The pre-coder unit 430 may pre-code the portion of the set of source data 410 to generate sets of representation data. The sets of representation data may contain any type of information, including information extracted or adapted from the set of source data 410, which is useful for generating a representation of the set of source data 410. For example, a set of representation data may contain enough information extracted from a source video stream to allow the generation of a lower-resolution version of the video stream. In another example, the set of representation data may include color or texture information, which may be added to other sets of representation data to generate an enhanced version of the source video stream.

In certain embodiments, the pre-coder unit 430 applies certain pre-coding schemes, including scalable pre-coding schemes, data partitioning schemes, etc. In one embodiment, where the set of source data 410 includes an audio-visual data stream, the pre-coder unit 430 may pre-code the audio-visual data stream into various hierarchical sets of representation data by using the scalable capabilities of the Moving Picture Experts Group-4 (MPEG-4) standard. In another embodiment, where the set of source data 410 includes an audio-visual data stream, the pre-coder unit 430 may pre-code the audio-visual data stream into various hierarchical sets of representation data by using the data partitioning capabilities of the H.264 adaptive video coding (H.264/AVC) standard. Embodiments of pre-coding schemes are described more fully below.

In some embodiments, multiple pre-coding schemes may, in reality, be implemented as multiple functions of a single pre-coding scheme. In one embodiment, multiple scalable pre-coding schemes are implemented by using a single MPEG-4 pre-coding algorithm to generate multiple layers of output (i.e., the generation of a base layer and enhancement layers using MPEG-4 may be inextricably linked). In another embodiment, multiple data partitioning pre-coding schemes are implemented by using one data partitioning algorithm to slice the set of source data 410 into multiple data partitions. As such, it will be appreciated that phrases like "multiple pre-coding schemes" and "a first pre-coding scheme" should be broadly construed to encompass at least single pre-coding schemes capable of producing multiple different outputs.

The sets of representation data may be passed from the pre-coder unit 430 to the controller unit 440, which may associate each set of representation data with a coding and modulation scheme. For example, a first set of representation data may correspond to first-level (e.g., low resolution) playback of the set of source data 410, and a second set of representation data may correspond to second-level (e.g., higher resolution, enhanced) playback of the same set of source data 410. The controller unit 440 may associate the first set of representation data with a lower order coding and modulation scheme (e.g., quadrature phase-shift keying with 1-to-4 forward error correction (QPSK ¼)) to better ensure the transmission of data for at least first-level playback. The controller unit 440 may associate the second set of representation data with a higher order coding and modulation scheme (e.g., 8PSK ⅞), reducing the transmission reliability of less critical enhancements for savings in power and bandwidth. Embodiments of coding and modulation schemes are described more fully below.

In some embodiments, the controller unit 440 may be configured to control all or some of the operations of the pre-coder unit 430. For example, the controller unit 440 may determine certain parameters, which the pre-coder unit 430 may use to pre-code the set of source data 410. In one embodiment, the controller unit 440 determines a set of scaling parameters for the pre-coder unit 430 to use with a scalable pre-coding scheme to generate sets of representation data. It will be appreciated that the controller unit 440 may determine how to control the pre-coder unit 430 based on different types of information. For example, the controller unit 440 may receive information relating to link conditions, as described more fully below.

In certain embodiments, the controller unit 440 may receive terminal-related capability metrics, as described above, from a terminal awareness unit 435. The capability metrics may then be used to determine one or more precoding schemes, coding and modulation schemes, etc. The terminal awareness unit 435 may receive and/or generate capability metrics in any effective way, for example as described with reference to the method 200 of FIG. 2.

The controller unit 440 may pass the coded and/or modulated data to a transceiver unit 450. The transceiver unit 450 may process the data into one or more signals for transmission (e.g., by buffering or amplifying the data), and may pass the signal to a communication link 460. The transceiver unit 450 may include any hardware, software, or other components necessary to transmit the signals or to interface with the communication link 460.

Figure 5:
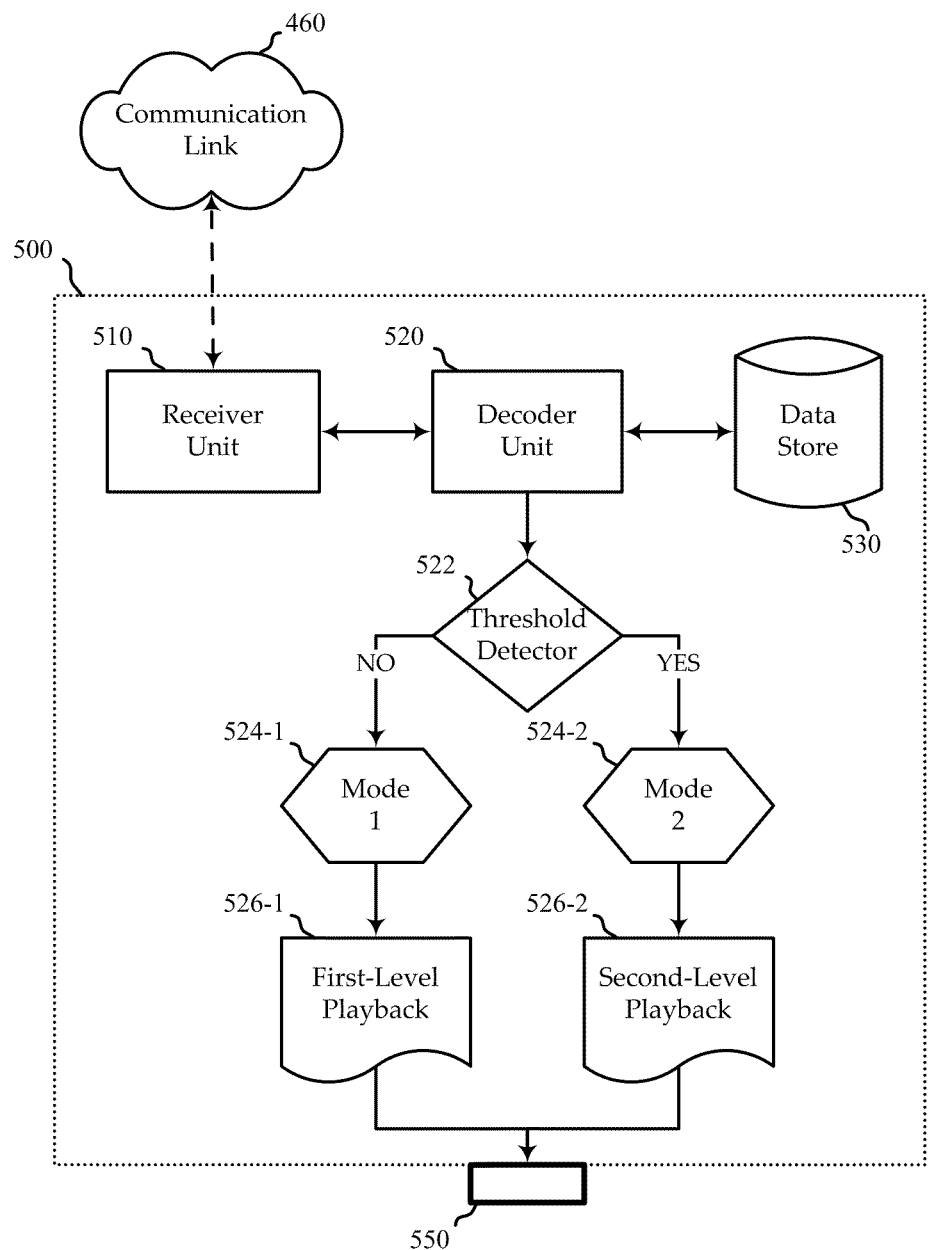
FIG. 5 provides a simplified block diagram of a subscriber terminal according to various embodiments of the invention.

In some embodiments, signals are transmitted by the terminal aware network access unit 400 over the communication link 460 to one or more data terminals. FIG. 5 provides a simplified block diagram of an embodiment of a data terminal 500 according to various embodiments of the invention. The data terminal 500 may receive signals from the communications link 460 and decode the signals, for example for playback.

In some embodiments, signals are received by the data terminal 500 at a receiver unit 510. The receiver unit 510 may include any hardware, software, or other components necessary to receive the signals. The received signals may include the sets of representation data generated by a terminal aware network access unit (e.g., terminal aware network access unit 110 of FIG. 1) and transmitted by the transceiver unit 450 in FIG. 4. Depending on various link conditions, some sets of representation data may not be reliably received.

In poor link conditions (e.g., heavy rain), higher order coding and modulation schemes may fail to provide reliable signal transmission over the communication link 460. For example, signals may be corrupted in transmission, arriving at the data terminal 500 with low power, high bit error rates, low signal-to-noise ratios, etc. As such, in certain link conditions, sets of representation data transmitted using lower order coding and modulation schemes may be reliably transmitted to the data terminal 500, while other sets of representation data may fail to be reliably transmitted.

Received signals may be passed to a decoder unit 520 for decoding. It will be appreciated that certain amounts and types of data may need to be extracted from the signals to permit decoding. Thus, signals, which fail to be reliably received by the receiver unit 510, may also fail to be decoded reliably by the decoder unit 520. Of course, the decoder unit 520 may include any hardware, software, or other components helpful for decoding data in various conditions. For example, the decoder unit 520 may have access to various error correction, de-multiplexing, formatting, and other routines.

In some embodiments, the data terminal 500 may be capable of decoding received signals in multiple modes 524. The modes 524 may relate, for example, to decoding for different levels of playback. In certain embodiments, modes 524 may be determined based in part on which sets of representation data are received, and whether enough data from those sets is reliably received, so the data may be decoded by the decoder unit 520. When sufficient data is received from a particular set of representation data, the mode 524 may switch to utilize that data. The data terminal 500 may use one or more of the modes 524 as a default, and be able to switch to other modes 524 either manually or automatically.

In some embodiments, the decoder unit 520 includes a threshold detector 522, which detects whether enough data is being reliably received to allow the decoder unit 520 to provide higher level playback. Because different sets of representation data may be transmitted using different coding and modulation schemes, some sets of representation data (e.g., those transmitted with higher order coding and modulation schemes) may fail to be reliably received by the data terminal 500 under certain link conditions. Depending on whether the threshold is being met, the decoder unit 520 may be configured to provide different levels of playback by decoding signals in different modes 524.

In one embodiment, a first set of representation data (representing low level playback of a set of source data) is transmitted with a very low order coding and modulation scheme. In this way, the first set of representation data may almost always be reliably received by the data terminal 500. The reliable receipt of the first set of representation data also means that the decoder unit 520 may almost always be able to decode sufficient information to generate a set of low level playback data. As such, the decoder unit 520 may be configured to operate by default in a first mode 524-1. In this first mode 524-1, the decoder unit 520 may decode only those signals which provide the first set of representation data, providing a subscriber with the ability for low level playback 526-1 at almost all times.

In this embodiment, at times, signals are received by the data terminal 500 which contain a second set of representation data. This second set of representation data (representing high level playback of a set of source data) may be transmitted with a higher order coding and modulation scheme, making its receipt less reliable in some link conditions. The threshold detector 522 may monitor the received signals to determine whether some threshold amount of the second set of representation data is being reliably received. When the threshold amount of the second set of representation data is not being reliably received, the data terminal 500 may remain in mode 1 524-1. When the threshold detector 522 detects that the threshold amount of the second set of representation data is being reliably received, the data terminal 500 may enter mode 2 524-2. In mode 2 524-2, the decoder unit 520 may generate a set of second-level playback data 526-2.

It will be appreciated that other numbers and types of modes 524 are possible, and the modes 524 may be implemented in different ways. In some embodiments, different levels of playback data include base and enhancement layers of a single data type (e.g., layers of an image). In other embodiments, different levels of playback data include different types of data to be combined for playback (e.g., text versus images versus videos on a webpage). It will be further appreciated that modes 524 may be selected manually, or as a result of other conditions, and may be implemented in hardware or software.

The decoder unit 520 may generate a set of playback data 526 to allow different levels of playback of the source data. The generated set of playback data 526 may be output to playback or other equipment or components (e.g., a display, sound card, etc.), for example, through a port 550. It will be appreciated that the set of playback data 526 may be further processed or other hardware, software, etc. may be provided to interface with different types of ports 550, devices, systems, and/or components.

In other embodiments, the data terminal 500 may include a data store 530, which may be communicatively coupled with the decoder unit 520. The data terminal 500 may be configured to save data decoded by the decoder unit 520 in the data store 530 either all the time or on certain conditions. In one embodiment, a subscriber manually selects times when data should be stored in the data store 530 for later playback.

In certain embodiments, data is automatically stored in the data store 530 based on the signal quality of the received signals. At certain times (e.g., in certain weather, because of bandwidth constraints, or due to other link conditions), only a portion of the sets of representation data relating to a particular set of source data may be reliably received by the data terminal 500. At these times, it may be desirable to accumulate related data in the data store 530 as it is received. It will be appreciated that many ways to accumulate related data in the data store 530 are known in the art. For example, a relational database may be used, which stores each decoded dataset in relation to the set of source data to which it relates. In these embodiments, it may be possible to store the first set of representation data while link conditions are poor, and wait to receive additional sets of representation data when link conditions improve.

In some embodiments, the data terminal 500 may generate notifications relating to which sets of representation have been received, decoded, and/or stored. In one embodiment, a subscriber may set the data terminal 500 to automatically generate a notification when at least two sets of representation data have been stored in the data store 530 relating to a particular set of source data. In another embodiment, the data terminal 500 may periodically send notifications to a service provider requesting transmission (or re-transmission) of certain sets of representation data. For example, if a set of representation data fails to be reliably received, the data terminal 500 may notify the sender to retransmit the set of representation data, possibly using a lower order coding and modulation scheme.

It will now be appreciated that many embodiments and configurations of the terminal aware network access unit 315 and the data terminals 500 are possible according to the invention. These various embodiments may be further understood with regard to various block diagrams, like those shown in FIGS. 6-10. It will be appreciated that while components and functions are described with relation to specific devices or functional blocks, the various functions may be implemented in many ways according to the invention. As such, the block diagrams are purely illustrative and should not be construed as limiting the scope of the invention.

Figure 6A:
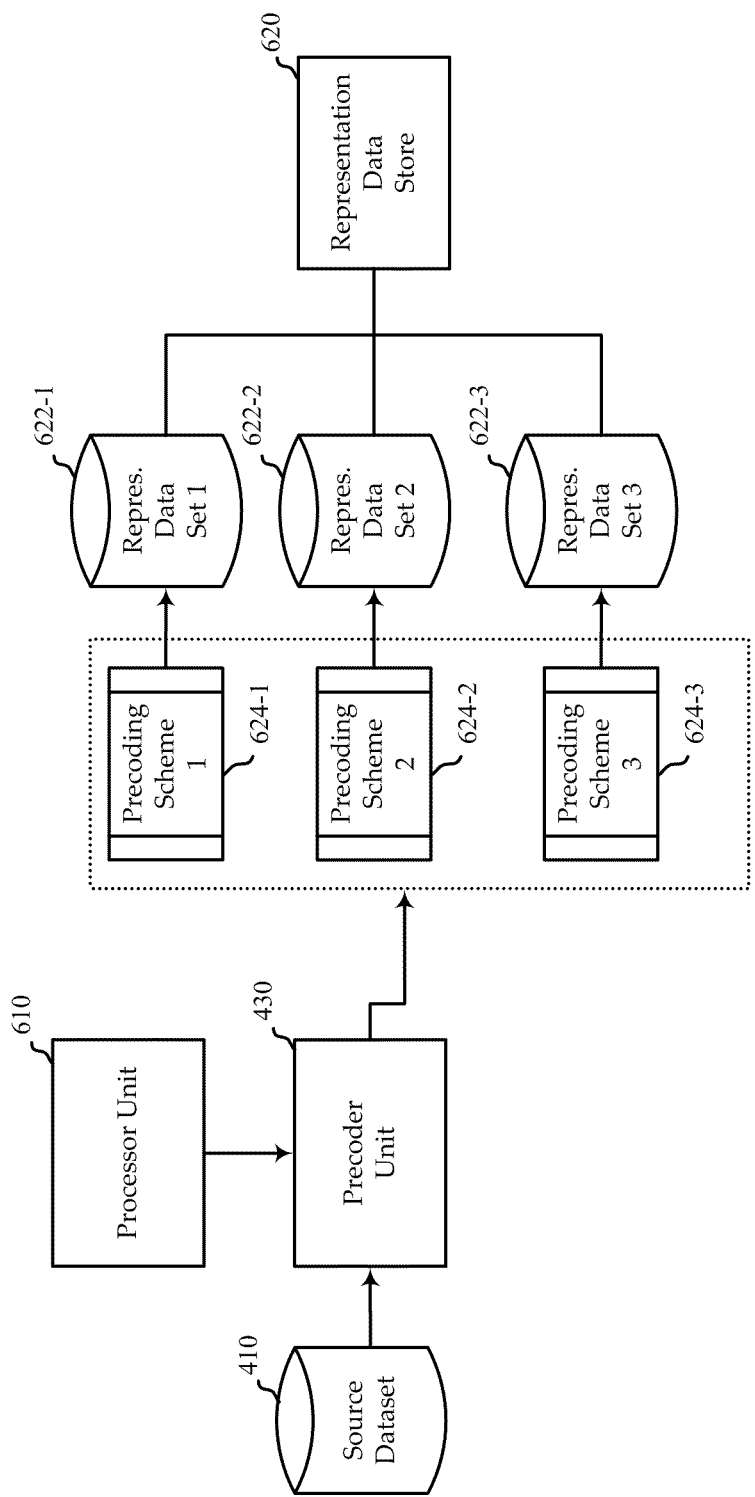
FIG. 6A provides a functional block diagram incorporating a pre-coder unit according to various embodiments of the invention.

Turning to FIG. 6A, a functional block diagram incorporating a pre-coder unit 430 according to various embodiments of the invention is provided. In some embodiments, a set of source data 410 passes to the pre-coder unit 430. The pre-coder unit 430 may pre-code the set of source data 410 using any number and/or type of pre-coding scheme 624.

Preferably, each pre-coding scheme 624 is different from each other pre-coding scheme 624 in some way, generating hierarchal (or layered or partitioned) output. Purely by way of example, some or all of the different pre-coding schemes 624 may use different codecs, parameters, transformations, transcoding, algorithms, and other techniques to affect resolution, quantization, bit rate, temporality, quality, spatiality, complexity, or any other useful characteristic of the data.

In some embodiments, the pre-coder unit 430 is communicatively coupled with a processor unit 610. In some embodiments, the processor unit 610 may be part of the controller unit 440 of FIG. 4. In other embodiments, the processor unit 610 may be incorporated into the pre-coder unit 430. In still other embodiments, the processor unit 610 may be implemented as a separate component or in any other useful way. In certain embodiments, the processor unit 610 may control all or part of the functionality of the pre-coder unit 430. For example, where the pre-coder unit 430 pre-codes the set of source data 410 based on certain parameters, the processor unit 610 may perform functions, including generating or selecting the parameters, instructing the pre-coder unit 430 to use the parameters, etc.

In one embodiment, three pre-coding schemes (624-1, 624-2, and 624-3) are used to generate three sets of representation data (622-1, 622-2, and 622-3), respectively. The three sets of representation data (622-1, 622-2, and 622-3) may correspond to three hierarchical layers of representation of the set of source data 410. Each of these sets of representation data 622 may be stored in a representation data store 620.

Figure 6B:
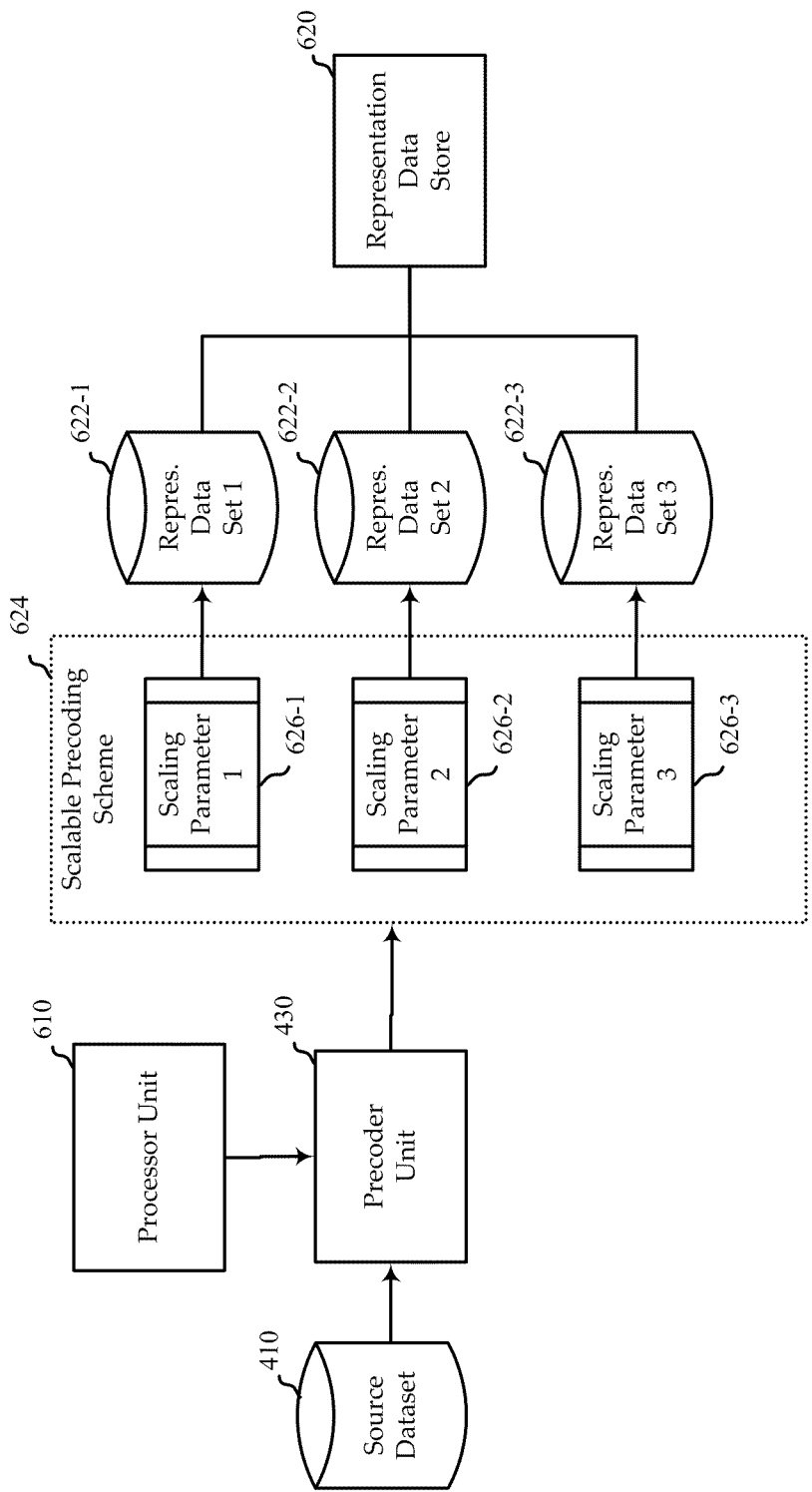
FIG. 6B provides another functional block diagram incorporating a pre-coder unit according to various embodiments of the invention.
Figure 6C:
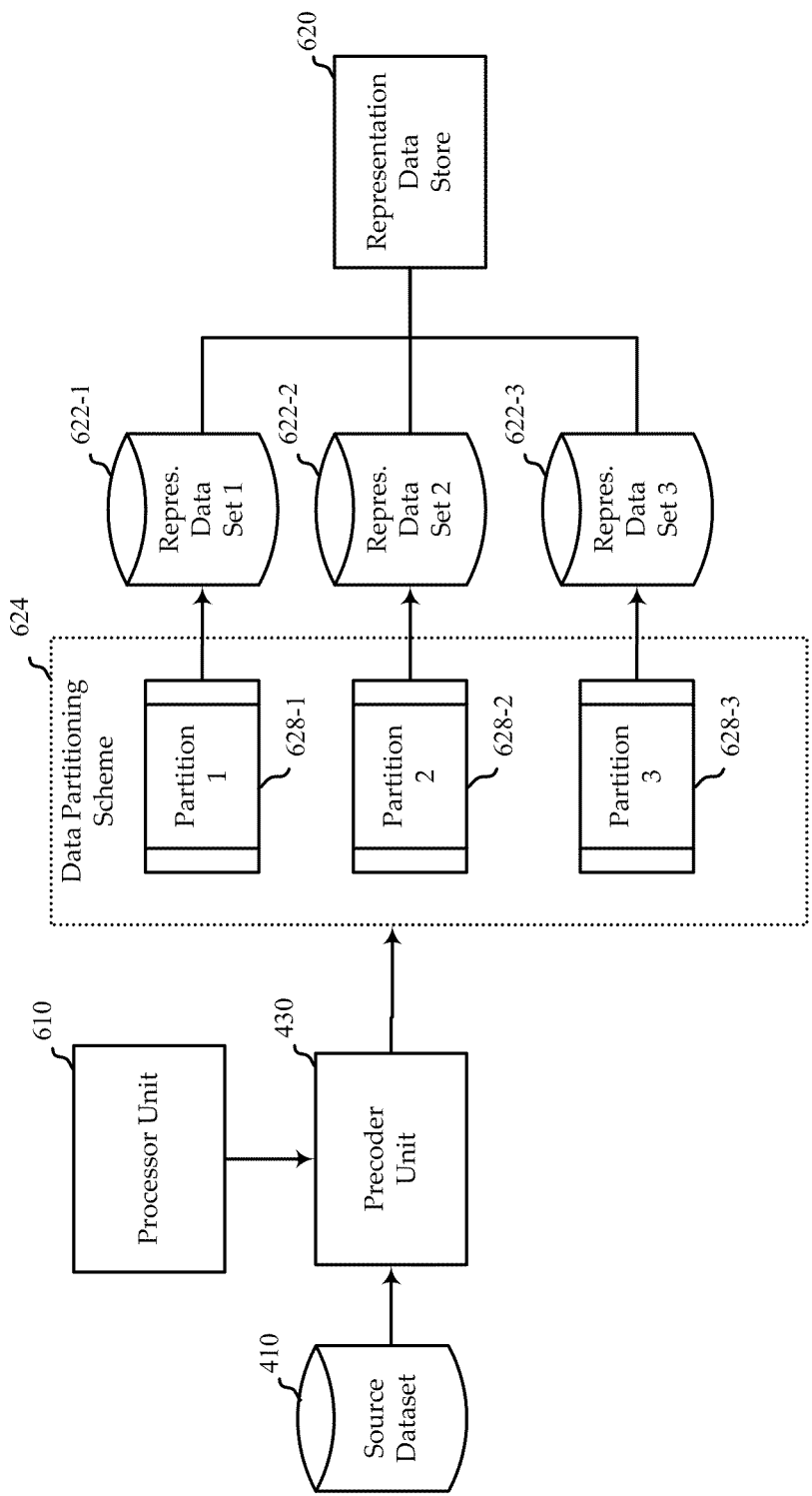
FIG. 6C provides yet another functional block diagram incorporating a pre-coder unit according to various embodiments of the invention.
Figure 6D:
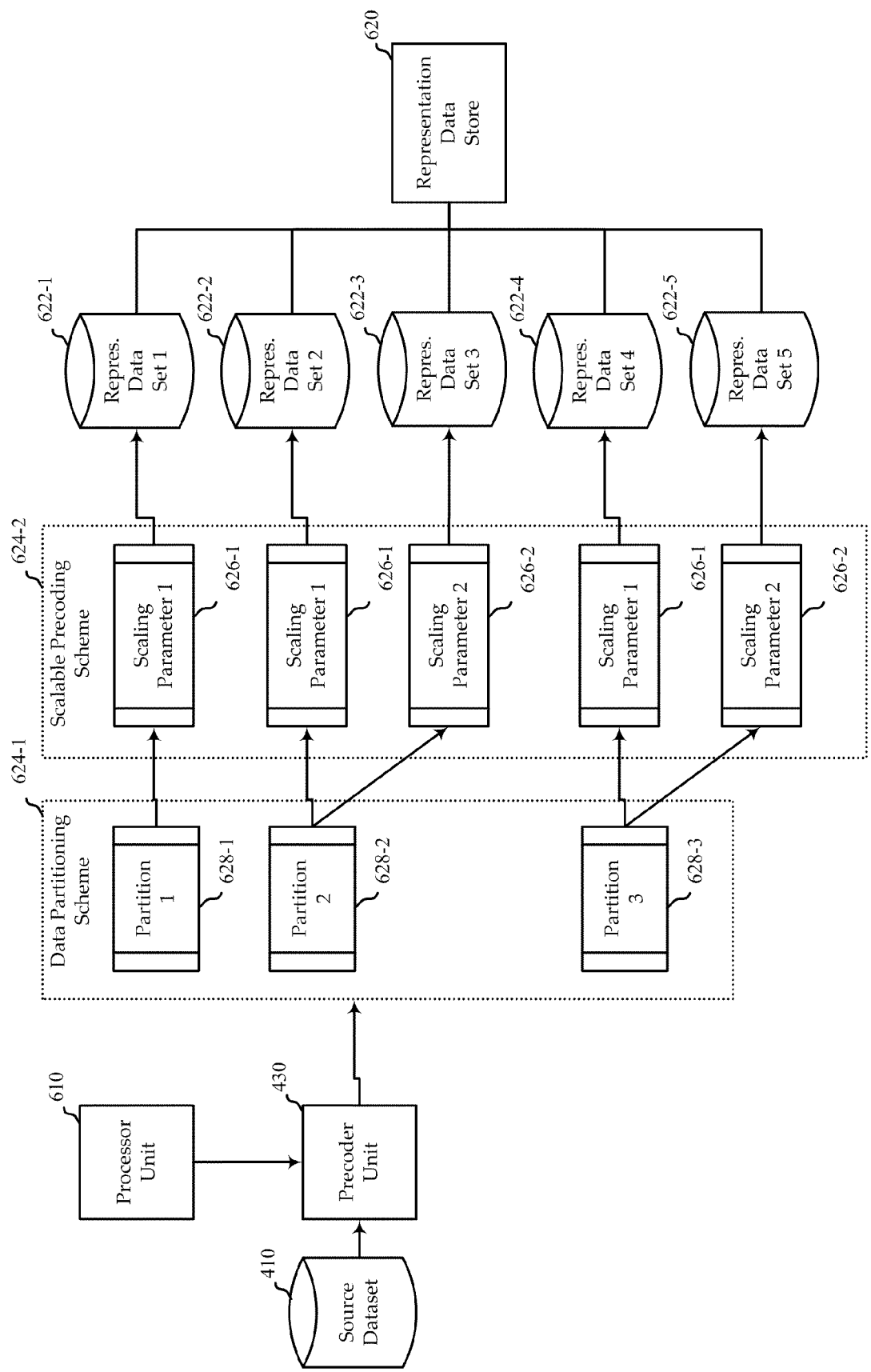
FIG. 6D provides still another functional block diagram incorporating a pre-coder unit according to various embodiments of the invention.

Further embodiments of the functionality in FIG. 6A are illustrated in the exemplary functional block diagrams of FIGS. 6B-6D. FIG. 6B provides a functional block diagram of a set of embodiments incorporating a pre-coder unit 430 using scalable pre-coding schemes 624 according to various embodiments of the invention.

In this set of embodiments, a set of source data 410 passes to the pre-coder unit 430. The pre-coder unit 430 pre-codes the set of source data 410 using a scalable pre-coding scheme 624. Scalable pre-coding schemes 624 may divide the set of source data 410 into different hierarchical layers. In some embodiments, a first (lowest-level) layer is called the base layer and higher layers are called enhancement layers. A scalable pre-coding scheme 624 may intend to achieve graceful degradation of the picture quality. For example, by providing the capability to playback data at a number of different levels, the pre-coding scheme 624 may avoid suffering from the "all or nothing" effect observed in some non-scalable coding systems.

In some embodiments, the scalable pre-coding scheme 624 may exploit different compression techniques to produce bit streams that are decodable at different bit rates. In one embodiment, a base layer contains the most critical information for playback that is determined to be "good enough" for a consumer. In this embodiment, enhancement layers may contain less critical information, like higher color depths, texturing, or resolution. Using this pre-coding scheme 624, it may be possible to provide a consumer with more reliable access to the base layer, such that a "good enough" level of playback is almost always available.

It will be appreciated that various types of scalability may be used. Purely by way of example, scalabilities may include quality, temporal, spatial and complexity scalability, in order to accommodate heterogeneous networks, different devices, various link conditions, or other communication environments. Among these scalabilities, various spatial and temporal scalable pre-coding schemes 624 may be known in the art, such as MPEG-2, MPEG-4, and H.263++. In addition, certain fine-granularity scalable ("FGS") pre-coding schemes 624 may be known in the art. For example, MPEG-4 standard (Part-2) may incorporate a FGS technique with the pre-coder unit 430 using the motion-compensated discrete cosine transform ("DCT") to generate a base layer as the lowest-level layer. Residual information between the original image and the reconstructed base layer image may be used to form one or more enhancement layers. An enhancement layer may be generated with a bit plane coding technique, which may provide fine granularity quality and temporal scalabilities.

Further, in certain embodiments, scalable pre-coding schemes 624 may provide error correction capabilities. For example, the MPEG-4 standard (Part-2) may be used to predict base layers and enhancement layers of future frames by using data from present frames. Using predicted data in the context of received data may allow correction of any bit stream truncation or lost packets, and may allow future frames to be more reliably recreated.

Regardless of the type or types of scalable pre-coding schemes 624 used, it may be preferable for each pre-coding scheme 624 to provide different scaling results for generating hierarchal output. Further, in some embodiments, the pre-coder unit 430 may be communicatively coupled with a processor unit 610, such that the processor unit 610 may control all or part of the functionality of the pre-coder unit 430. For example, the processor unit 610 may be configured to generate or select scaling parameters.

In one embodiment, one pre-coding scheme 624 is used with three scaling parameters (626-1, 626-2, and 626-3) to generate three sets of representation data (622-1, 622-2, and 622-3), respectively. The three sets of representation data (622-1, 622-2, and 622-3) may correspond to three hierarchical layers of representation of the set of source data 410. For example, the first set of representation data 622-1 may include base layer information, while the other two sets of representation data (622-2 and 622-3) may include enhancement layer information. Each of these sets of representation data 622 may be stored in a representation data store 620.

FIG. 6C provides a functional block diagram illustrating a set of embodiments of a pre-coder unit 430 using data partitioning pre-coding schemes 624 according to various embodiments of the invention. In this set of embodiments, a set of source data 410 passes to the pre-coder unit 430. The pre-coder unit 430 pre-codes the set of source data 410 using data partitioning pre-coding schemes 624. Data partitioning pre-coding schemes 624 may divide the set of source data 410 into different partitions.

Various data partitioning pre-coding schemes 624 may be known in the art. For example, data partitioning capabilities may be included in the H.264/AVC standard. According to this standard, the pre-coder unit 430 may divide the set of source data 410 into three separate data partitions 628.

In one embodiment, three data partitions 628 may be defined to provide different levels of information representing the set of source data 410. A first partition 628-1 may contain syntax elements from header information within the set of source data 410, including macroblock types, quantization parameters, and motion vectors. A second partition 628-2 may contain intra-coded block patterns and transform coefficients. The second partition 628-2 may, for example, use various spatial prediction modes to exploit spatial statistical dependencies in the set of source data 410 for a single video frame. A third partition 628-3 may contain inter-coded block patterns and transform coefficients. The third partition 628-3 may, for example, use motion vectors for block based inter prediction to exploit block-shaped regions of each video frame in the set of source data 410.

The information contained in the first partition 628-1 (e.g., the header information of the set of source data 410) may represent a small portion of the set of source data 410, but it may be very critical to the recreation of the set of source data 410. For example, a "good enough" (or even a relatively high-quality) representation of the set of source data 410 may be recreated from only the information contained in the first partition 628-1, like macroblock types and motion vectors. On the contrary, information contained in the second partition 628-2 and the third partition 628-3 may be less critical while representing larger portions of the set of source data 410. Further information contained in the second partition 628-2 and the third partition 628-3 may be useful only in conjunction with information from the first partition 628-1.

It will be appreciated that other numbers and types of partitions are possible. Further, other steps may be required or desired as part of data partitioning pre-coding schemes 624. Regardless of the type or types of data partitions 628 used, it may be preferable for each pre-coding scheme 624 to use those data partitions 628 to provide hierarchal output. Further, in some embodiments, the pre-coder unit 430 may be communicatively coupled with a processor unit 610, such that the processor unit 610 may control all or part of the functionality of the pre-coder unit 430. For example, the processor unit 610 may be configured to generate or select data partitions 628.

In one embodiment, one data partitioning pre-coding schemes 624 is used with three data partitions 628 (628-1, 628-2, and 628-3) to generate three sets of representation data (622-1, 622-2, and 622-3), respectively. The three sets of representation data (622-1, 622-2, and 622-3) may correspond to three hierarchical partitions of the set of source data 410. For example, the first set of representation data 622-1 may include critical header information, while the other two sets of representation data (622-2 and 622-3) may include less critical intra- and inter-coded block patterns and transform coefficients. For example, using the H.264/AVC standard, the data partitions 628 may be encapsulated into separate network abstraction layer (NAL) packets, which may be collated into the sets of representation data 622. Each of these sets of representation data 622 may be stored in a representation data store 620.

FIG. 6D provides functional block diagram of a set of embodiments incorporating a pre-coder unit 430 using hybrid scalable and data partitioning pre-coding schemes 624 according to various embodiments of the invention. In this set of embodiments, the pre-coder unit 430 pre-codes the set of source data 410 using a combination of scalable and data partitioning pre-coding schemes 624.

In various embodiments, the scalable pre-coding schemes 624-2 and the data partitioning pre-coding schemes 624-1 may be used in different orders to provide the same or different results. In one embodiment, the scalable pre-coding schemes 624-2 may create base and enhancement layers of the set of source data 410, and the data partitioning pre-coding schemes 624-1 may divide some or all of those layers into different partitions. In another embodiment, the data partitioning pre-coding schemes 624-1 may divide the set of source data 410 into a number of partitions, which may then be layered using the scalable pre-coding schemes 624-2.

It will be appreciated that various scalable and data partitioning pre-coding schemes 624 may be known in the art. Further, it will be appreciated that different types of pre-coding schemes 624 may manifest various drawbacks. For example, many data partitioning pre-coding schemes 624-1 (e.g., H.264/AVC) may lack flexibility in the creation of data partitions 628. Additionally, many scalable pre-coding schemes 624-2 (e.g., FGS) may degrade compression efficiencies. Some combinations of pre-coding schemes 624 may be able to minimize some of these drawbacks.

In the embodiment shown in FIG. 6D, a set of source data 410 passes to the pre-coder unit 430. The pre-coder unit 430 may use data partitioning pre-coding schemes 624-1 to divide the set of source data 410 into three data partitions (628-1, 628-2, and 628-3). The pre-coder unit 430 may then apply scalable pre-coding schemes 624-1 to each of the three data partitions (628-1, 628-2, and 628-3).

In one embodiment, H.264/AVC data partitioning pre-coding schemes 624-1 are used to generate the three data partitions (628-1, 628-2, and 628-3). For example, as described above with respect to FIG. 6C, the first partition 628-1 may contain critical header and other information, while the second partition 628-2 and the third partition 628-3 may contain less critical DCT information. Each of the three data partitions (628-1, 628-2, and 628-3) may then be passed to MPEG-4 scalable pre-coding schemes 624-2, configured with a first scaling parameter 626-1 and a second scaling parameter 626-2.

In this embodiment, the first partition 628-1 may be further pre-coded, using the first scaling parameter 626-1, thereby generating a first set of representation data 622-1. The second partition 628-2 may be further pre-coded into two layers, using both scaling parameters (626-1 and 626-2), thereby generating second and third sets of representation data (622-2 and 622-3). The third partition 628-3 may also be further pre-coded into two layers, using both scaling parameters (626-1 and 626-2), thereby generating fourth and fifth sets of representation data (622-4 and 622-5). It will be appreciated that further pre-coding the second and third data partitions (628-2 and 628-3) may create layers based on any useful characteristic of the partitioned data. For example, the base layers of the data partitions (e.g., what generated the second and fourth sets of representation data (622-2 and 622-4)), may contain coarsely quantized DCT coefficients, while the enhancement layers of the data partitions (e.g., what generated the third and fifth sets of representation data (622-3 and 622-5)), may contain refinement information from which a finer quantization can be obtained.

In some embodiments, the pre-coder unit 430 may be communicatively coupled with a processor unit 610, such that the processor unit 610 may control all or part of the functionality of the pre-coder unit 430. In certain embodiments, the processor unit 610 may be configured to generate or select data partitions 628. In other embodiments, the processor unit 610 may be configured to generate or select scaling parameters 626. In still other embodiments, the processor unit 610 may be configured to generate or select both data partitions 628 and scaling parameters 626. It will be appreciated that the processor unit 610 may be utilized in many ways to add capabilities and flexibility to the functionality of the pre-coder unit 430. For example, the data partitioning and layering may be adjusted flexibly according to system throughput requirements and link conditions. To achieve greater flexibility, the pre-coding schemes 624 may be configured to dynamically change numbers and types of data partitions 628, numbers and types of scaling parameters 626, etc.

In addition to the many functions and capabilities of the pre-coder unit 430, various embodiments may provide many different coding and modulation capabilities. FIG. 7 provides an illustration of an exemplary table of identifier data 722 for use with various embodiments of the invention. The entries in the table of identifier data 722 show some possible coding and modulation schemes 705 and their associated identifiers 710. It will be appreciated that many types of coding and modulation are possible according to the invention. As such, the coding and modulation schemes 705 listed in the table of identifier data 722 are for illustrative purposes only and should not be construed as limiting the scope of the invention.

Each identifier 710 is associated with a coding and modulation scheme 705. For example, identifier "1" 710-1 is associated with a first coding and modulation scheme 705-1, representing quadrature phase shift keying with a one-to-four forward error correction ("FEC") rate (QPSK ¼). In some embodiments, each identifier 710 may be a pointer to a set of information (e.g., an algorithm or a set of parameters) needed to implement its associated coding and modulation scheme 705.

According to the table of identifier data 722, a shift from identifier "1" 710-1 to identifier "4" 710-2 maintains the same modulation order (QPSK) while increasing the information density of the FEC (from ¼ to ½). The coding and modulation scheme 705-2 associated with identifier "4" 710-2 generates half as many error correction bits for each information bit as does the coding and modulation scheme 705-1 associated with identifier "1" 710-1.

It will be appreciated that different implementations may use different types of coding and modulation schemes 705. It will further be appreciated that different tables of identifier data 722 may be configured to have different margins between the coding and modulation schemes 705 or to associate the identifiers 710 differently. For example, a table of identifier data 722 may include only every third entry shown on the table of identifier data 722 in FIG. 7. It will further be appreciated that the table of identifier data 722 may include other types of data for various reasons, like signal quality indicators (e.g., measured signal to noise ratio, estimated signal to noise ratio, bit error rate, received power level, etc.).

When link conditions are poor (e.g., low signal-to-noise ratio), lower order modulation schemes and low information densities may be required for reliable delivery of data. This may result in fewer data bits being sent per unit time as well as inefficient uses of power and bandwidth. When link conditions are good, higher order modulation schemes may be used with higher information density. This may allow more data bits to be sent per unit time with more efficient usage of power and bandwidth.

In many communication systems, the situation may be complicated by the fact that data is being sent to multiple subscribers with different characteristics (e.g., in different geographic locations, having different receiving capabilities, having different entitlement levels, etc.). When data packets are addressed to a single terminal (unicast), the packets may be sent using the most efficient coding and modulation scheme 705 that the communication link will support. However, when data packets are addressed to many receivers (multicast or broadcast), the packets may have to be sent using the coding and modulation scheme 705 that the receiver with the worst link in the group can support. When link conditions affect only a portion of the subscribers (e.g., a localized rain fade), this may result in inefficient network usage. Thus, link conditions may change dynamically per unit time, per subscriber, or based on other parameters.

By using certain ACM techniques, coding and modulation schemes 705 may be dynamically selected to match changing link conditions. In one embodiment, coding and modulation schemes 705 are selected by using the identifiers 710 and the table of identifier data 722. The coding and modulation schemes 705 are then encapsulated, coded, mapped, and transmitted in any of a variety of ways, as known in the art. ACM is then implemented using the DVB-S2 standard, which specifically provides for its use. It will be appreciated that other implementations are possible, for example, including systems using DOCSIS or WiMAX.

In some embodiments, the table of identifier data 722 and any other related information may be stored in an identifier store 720. The identifier store 720 may store the table of identifier data 722 in any useful way. For example, the table of identifier data 722 may be hard-wired into a microchip or stored as a flat file or a relational database.

Figure 8:
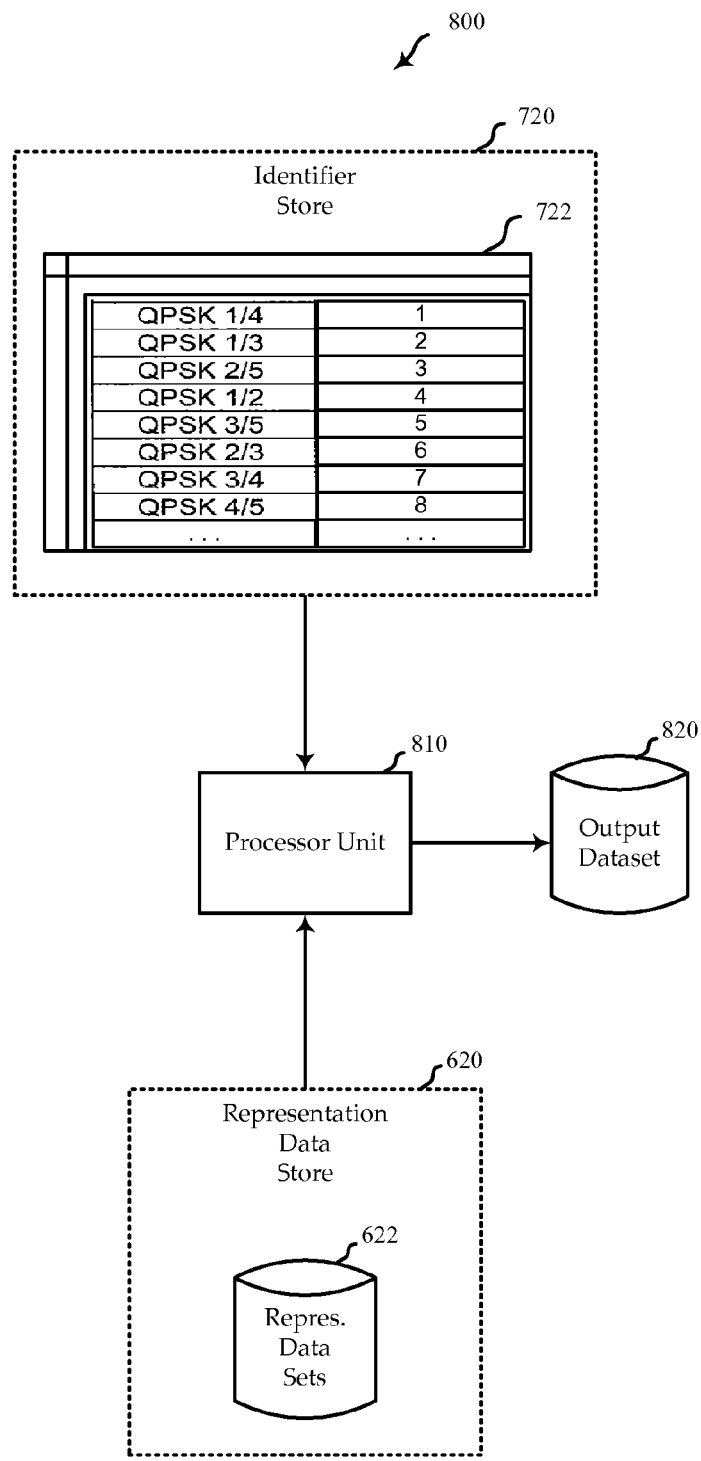
FIG. 8 provides a simplified block diagram of a controller unit according to various embodiments of the invention.

FIG. 8 provides a functional block diagram of a device 800 incorporating a processor unit 810, a representation data store 620, and an identifier data store 720 according to various embodiments of the invention. In some embodiments, the device may be or may include the controller unit 440 of FIG. 4.

In some embodiments, the processor unit 810 is communicatively coupled with the representation data store 620 and the identifier data store 720. The representation data store 620 may be configured to store sets of representation data 622 and the identifier data store 720 may be configured to store a table of identifier data 722. In certain embodiments, the processor unit 810 may be configured to process data from both the representation data store 620 and the identifier data store 720 to generate a set of output data 820. In other embodiments, the processor unit 810 may be configured to control at least a portion of the generation or processing of the data stored in either or both of the representation data store 620 and the identifier data store 720.

Figure 9A:
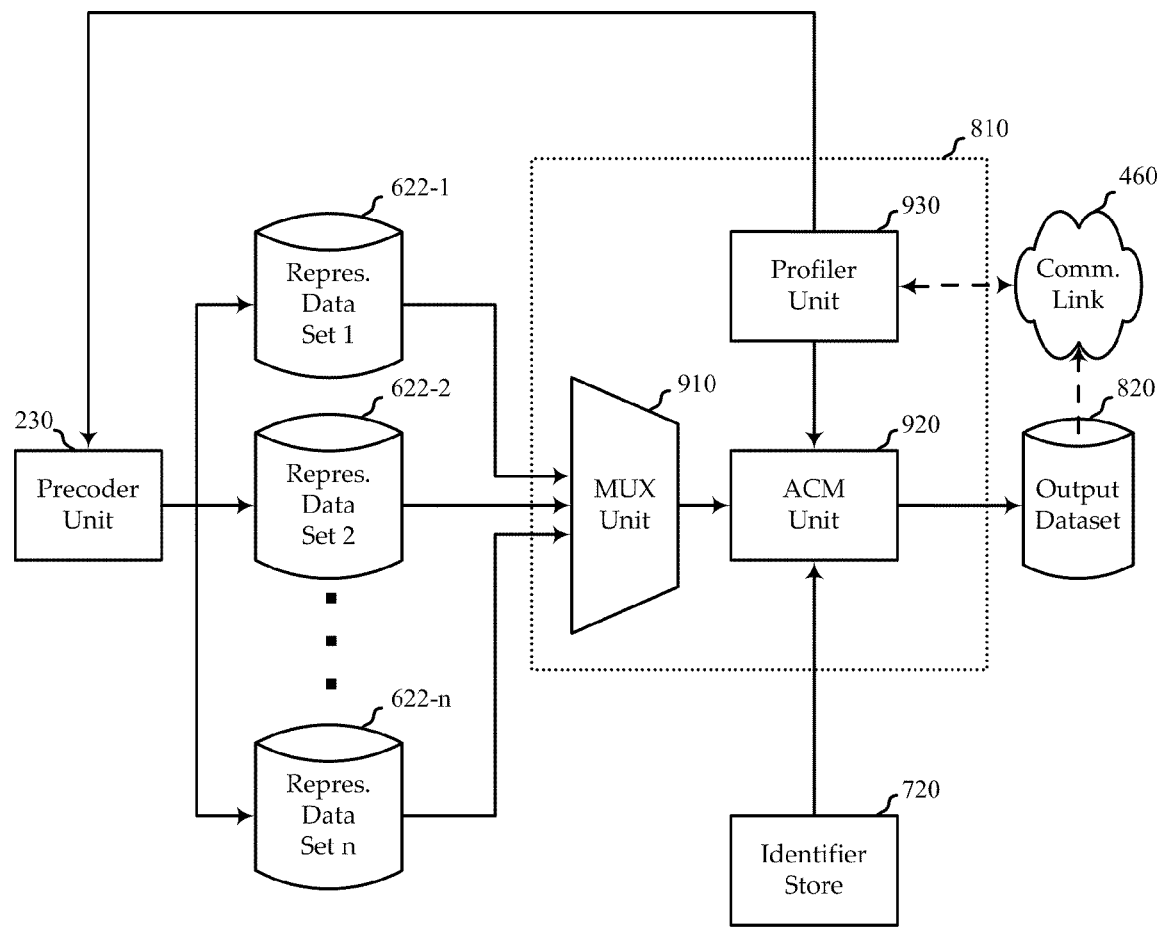
FIG. 9A provides a functional block diagram incorporating a processor unit according to various embodiments of the invention.
Figure 9B:
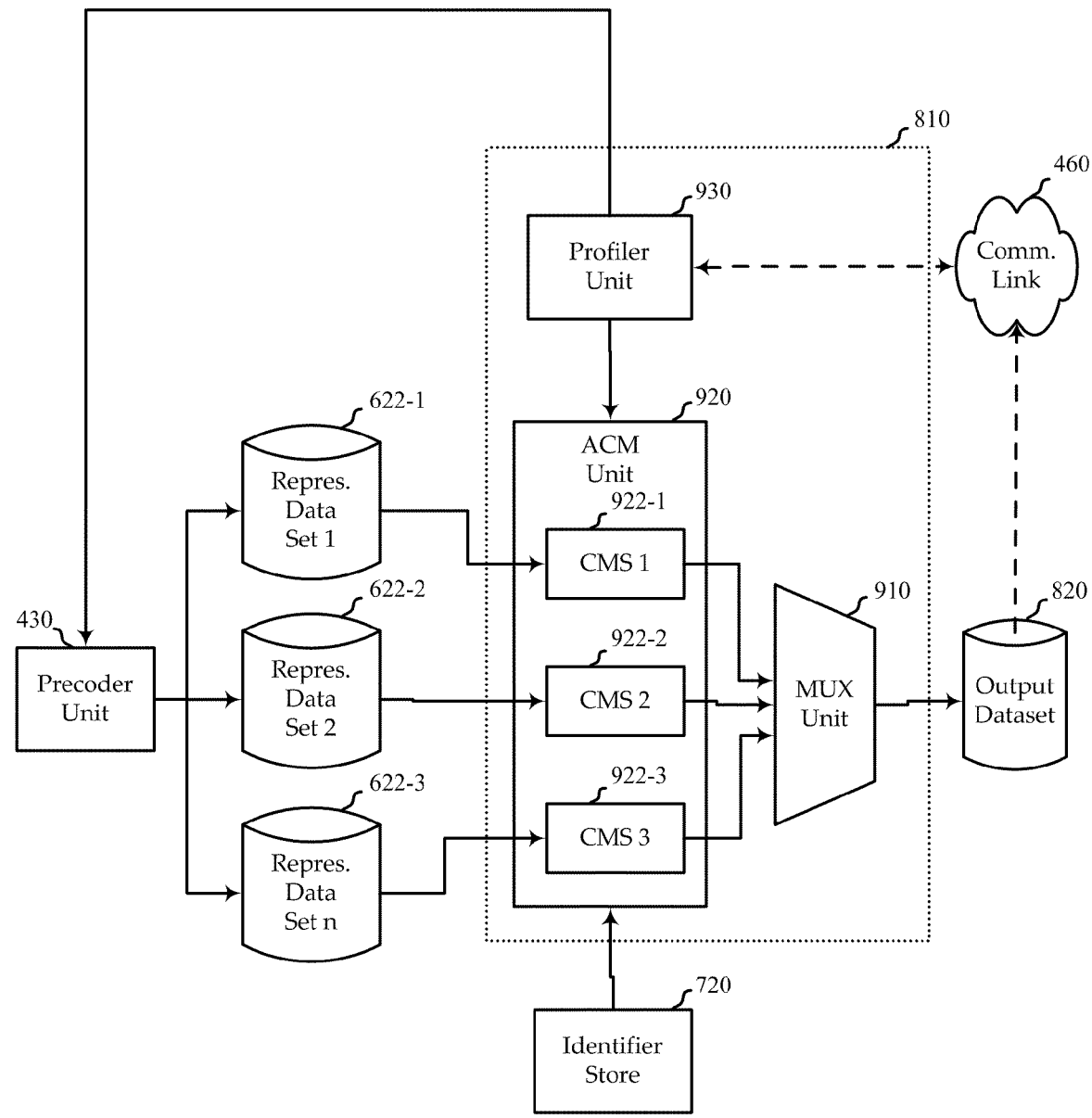
FIG. 9B provides another functional block diagram incorporating a processor unit according to various embodiments of the invention.

The capabilities and functionality of the processor unit 810 are discussed further in FIGS. 9A and 9B. FIG. 9A provides a functional block diagram incorporating a processor unit 810 according to various embodiments of the invention. In some embodiments, the processor unit 810 is the same as or is part of the controller unit 440 of FIG. 4. The processor unit 810 may receive sets of representation data 622 from the pre-coder unit 430 and identifier data from the identifier data store 720.

In some embodiments, the processor unit 810 may receive sets of representation data 622 from the pre-coder unit 430. The sets of representation data 622 may pass through a multiplexer unit 910. The multiplexer unit 910 may multiplex the data in any useful way, for example, by time division multiplexing ("TDM"), frequency division multiplexing ("FDM"), wavelength division multiplexing ("WDM"), code division multiplexing ("CDM"), polarization, or any other effective technique.

The multiplexer unit 910 may be communicatively coupled with an ACM unit 920. The ACM unit 920 may be further communicatively coupled with an identifier data store 720 and configured to receive identifier data stored at the identifier data store 720. Using the identifier data, the ACM unit 920 may implement ACM on the multiplexed data coming from the multiplexer unit 910 to generate a set of output data 820.

In one embodiment, the ACM unit 920 is implemented as a single module, which is configured to accept only a single stream of data. In this embodiment, the purpose of the multiplexer unit 910 may be to produce serial data for use by the single-stream ACM unit 920. Packets of information belonging to sets of representation data 622 coming from the pre-coder unit 430 may be tagged with information that represents to which of the sets of representation data 622 each packet belongs. For example, packets of data may be appended with header information that includes a designator number representing a particular set of representation data 622. Using the tags, the multiplexer unit 910 may multiplex the data from the multiple sets of representation data 622 to produce a single stream of data for the ACM unit 920.

In another embodiment, the set of source data (not shown) received by the pre-coder unit 430 includes data for multiple source programs (e.g., multiple video streams). At times (e.g., when link conditions are substantially static), the pre-coder unit 430 may be configured to pre-code each of the multiple source programs into the same sets of representation data 622, using the same pre-coding schemes. For example, a set of source data for a first program and a set of source data for a second program may each be pre-coded into a base layer and an enhancement layer. The multiplexer unit 910 may multiplex the two base layers (i.e., one from each program) into one data stream and multiplex the two enhancement layers into a second data stream. The two data streams each may then pass to the ACM unit 920.

In some embodiments, the ACM unit 920 generates a set of output data 820. The set of output data 820 may include one or more signals configured to be transmitted over a communication link 460. The signal or signals may be coded and/or modulated as dictated by the ACM unit 920. Further, the signal or signals may be coded and/or modulated in any additional way or combination of ways for transmission over the communication link 460. It will be appreciated that one or more signals may not be included in the set of output data. For example, at times when insufficient bandwidth is available for sending multiple signals, the output data may include only one signal or only one set of representation data 622.

It will be appreciated that the processor unit 810 may be configured in different ways according to the invention. For example, turning to FIG. 9B, another functional block diagram incorporating a processor unit according to various embodiments of the invention is provided. In the embodiments of FIG. 9B sets of representation data 622 coming from the pre-coder unit 430 pass through the ACM unit 920 before they are multiplexed by the multiplexer unit 910. Three sets of representation data (622-1, 622-2, and 622-3) may pass to the ACM unit 920. The ACM unit 920 may then use three coding and modulation schemes (922-1, 922-2, and 922-3), one on each of the three sets of representation data (622-1, 622-2, and 622-3). The three coding and modulation schemes (922-1, 922-2, and 922-3) may generate three output signals, which are multiplexed by the multiplexer unit 910 to generate a set of output data 820 containing a single multiplexed signal. This signal may then be transmitted over the communication link 460.

Other configurations may also be possible according to the invention. In some embodiments, the ACM unit 920 may include a channel coding unit and a modulation unit. In one embodiment, each of the channel coding unit and the modulation unit may be independently controllable or may be configured to work in conjunction with one another. In another embodiment, the multiplexer unit 910 may multiplex multiple streams of data coming from the channel coding unit with different coding schemes and pass them as a single stream of data to the modulation unit.

Returning to FIG. 9A, in one embodiment, sets of representation data 622 are generated by the processor unit 810 using scalable pre-coding schemes. The sets of representation data 622 may then include a base layer and one or more enhancement layers. The layers may be multiplexed in the multiplexer unit 910 before being passed to the ACM unit 920. The ACM unit 920 may then use DVB-S2 to apply a QPSK ½ coding and modulation scheme to the multiplexed data, thereby generating a QPSK ½ signal for transmission over the communication link 460.

In some embodiments, the ACM unit 920 is further communicatively coupled to a profiler unit 930. The profiler unit 930 may be communicatively coupled with the communication link 460 and the pre-coder unit 430. The profiler unit 930 may also be configured to determine certain communication link profiles relating to the communication link 460. It will be appreciated that the profiler unit 930 may generate communication link profiles by detecting or receiving data intrinsic to and/or extrinsic to the communication link 460, by receiving information from other systems or components, or in any other useful way.

In one embodiment, the profiler unit 930 periodically or continuously determines signal-to-noise ratios ("SNRs") relating to the communication link 460 for use as communication link profiles. For example, the profiler unit 930 may sample signals received at one end of the communication link 460 to determine the SNRs of the signals. Further, the SNRs may be recorded for statistical processing (e.g., to determine average SNRs or to determine SNR by signal type), for logging (e.g., to keep a record of SNRs at different times of day or in different link conditions), or for other reasons. It will be appreciated that the SNRs may be detected at either end of the communication link 460 (e.g., at either the network access unit end or the data terminal end) and by any effective method.

In another embodiment, the profiler unit 930 determines the bandwidth of the communication link 460 to generate a communication link profile. Similarly, the bandwidth of the communication link 460 may be provided to the profiler unit 930 manually or by another component, either before or when the communication link profile is generated. It will be appreciated that many other useful characteristics may be detected from the communication link 460 to generate communication link profiles, including, for example, throughput, hop count, path length, physical latency, bit error rate, power consumption, power availability, excess bandwidth, traffic congestion, etc.

In yet another embodiment, the profiler unit 930 determines an audience metric, which may be used as a communication link profile. There may be many ways to determine an audience metric. For example, the audience metric may be determined by detecting the number of subscribers receiving a signal, the number of subscribers playing back the signal (e.g., watching the video data), polling subscribers to determine the number of subscribers planning to playback the signal. In some embodiments, the signal may include multicast information (information transmitted to subscribers who have joined the multicast stream). In those embodiments, the audience metric may relate to the number or type of subscribers who have joined the multicast stream.

In still another embodiment, the profiler unit 930 may determine or receive a receiver capability, which may be used as a communication link profile. In some embodiments, a data terminal may include a receiver for receiving signals from the communication link 460. The receiver may have limited capabilities, due to limitations, for example, in a port or antenna, in a playback mechanism, in a decoding mechanism, etc. For example, a subscriber may be receiving video signals on a mobile phone. The phone may have a small screen with limited resolution, a small antenna with limited range, a small battery with limited power, etc.

In even another embodiment, the profiler unit 930 may determine or receive authorization to transmit signals over the communication link 460 in certain ways, which may be used as a communication link profile. In some embodiments, subscribers may have accounts with a service provider, which are associated with certain entitlement information. For example, a subscriber may be able to purchase a base package, which entitles the subscriber to receive and/or playback only base layer information generated by a scalable pre-coding scheme (e.g., a low-resolution video). Other subscribers may be able to purchase the additional entitlement to receive and/or playback enhanced layers (e.g., a high-definition video). In other embodiments, other parties may be at least partially responsible for the generation of the communication link profiles. For example, a backbone provider may allocate certain bandwidths to certain applications at certain times of the day.

It will be appreciated that the profiler unit 930 may provide and/or include some or all of the functionality of the terminal awareness unit 435 of FIG. 4. Using the profiler unit 930 may allow the receipt, generation, and/or use of capability metrics. These capability metrics may then be used to affect the hierarchical encoding of data for terminal-aware communications.

In some embodiments, the profiler unit 930 is communicatively coupled with either or both of the ACM unit 920 and the pre-coder unit 430. Thus, in certain embodiments, the profiler unit 930 may use communication link profiles to determine certain parameters of pre-coding schemes used by the pre-coder unit 430 (e.g., scaling parameters, data partitions, etc.), or to assign identifiers to appropriate coding and modulation schemes. In other embodiments, the profiler unit 930 may generate, modify, or otherwise influence the functionality of both the ACM unit 920 and the pre-coder unit 430 in other ways to best suit data to various communication link profiles.

In an embodiment where the profiler unit 930 generates communication link profiles using an audience metric, different audience metrics may be used in different ways. For example, the bandwidth required for a popular program may be permitted to increase at the expense of less popular programs. To this effect, the popular program may be encoded at a high bit rate, and sent using a very low order (reliable) modulation and coding scheme. Alternately, the least popular programs may be encoded at a low bit rate, and sent using a high order modulation and coding scheme. In a satellite communication system according to this embodiment, one result may include an improved balance between the overall fixed bandwidth of the satellite transponder and service quality and availability.

In another embodiment, the profiler unit 930 generates communication link profiles at least in part based on weather patterns. As the weather worsens, link conditions may also worsen, decreasing the reliability of data transfers over the communication link 460. To compensate for worsening conditions, the profiler unit 930 may direct the ACM unit 920 to increase transmission reliability by using lower order coding and modulation schemes (e.g., lower order modulation schemes, lower information density, etc.). The change in coding and modulation schemes may be implemented, for example, by assigning identifiers to lower order coding and modulation schemes in a table like the identifier data table 722 of FIG. 7. The new assignments in the table may then be used by the ACM unit 920 to generate the set of output data 820 for transmission.

In yet another embodiment, the profiler unit 930 generates communication link profiles at least in part based on notifications generated by a data terminal 330. As discussed above with reference to FIG. 5, embodiments of data terminals may be configured to provide notices on certain conditions. For example, a data terminal may be configured to store received and decoded sets of representation data 622 for later playback by a subscriber. The data terminal may provide notifications, for example, when certain sets of representation data 622 failed to be reliably received (e.g., and must be resent), when subscribers request or subscribe to certain sets of representation data 622, etc. In these and other cases, the profiler unit 930 may receive a notification and generate communication link profiles to respond to those notifications. For example, if a set of representation data 622 failed to be received, the set of representation data 622 may be retransmitted using a more reliable coding and modulation scheme.

In still another embodiment, the profiler unit 930 may generate communication link profiles based on a variety of different types of data. For example, the profiler unit 930 may receive a notification from a data terminal requesting retransmission of a set of representation data 622. The profiler unit 930 may poll the communication link 460 to determine its bandwidth, waiting to detect that excess bandwidth is available. When excess bandwidth is available on the communication link 460, the profiler unit 930 may direct the ACM unit 920 to retransmit the requested set of representation data 622 using a very reliable (but bandwidth inefficient) coding and modulation scheme.

Figure 10A:
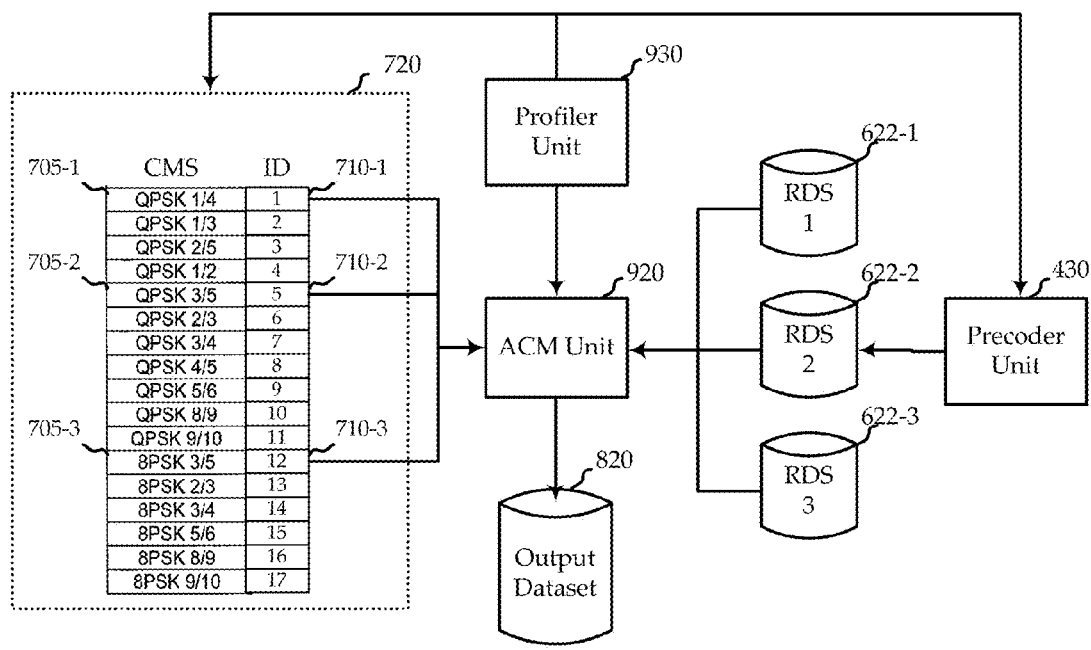
FIGS. 10A and 10B provide an exemplary embodiment illustrating adapting certain coding and modulation schemes to link conditions according to various embodiments of the invention.
Figure 10B:
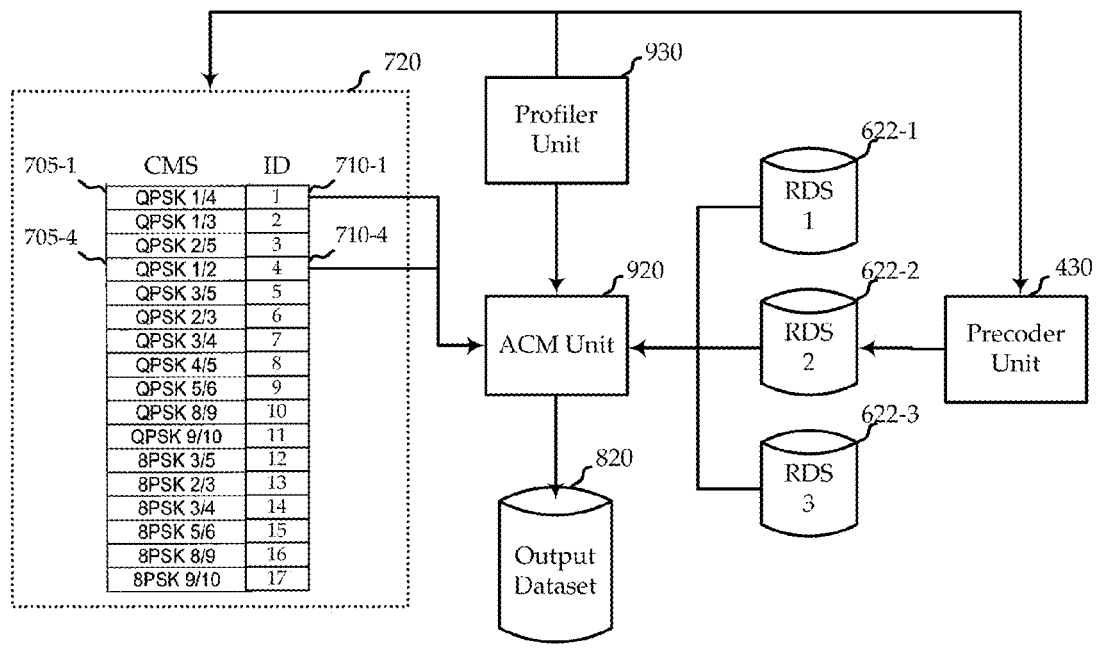

FIG. 10A and FIG. 10B provide an exemplary embodiment illustrating adapting coding and modulation schemes to link conditions according to various embodiments of the invention. In FIG. 10A, three sets of representation data (622-1, 622-2, and 622-3) pass from a pre-coder unit 430 to an ACM unit 920. Based on information provided by the profiler unit 930, identifiers 710 have been assigned to coding and modulation schemes 705 in an identifier data store 720.

As illustrated, the first set of representation data 622-1 is associated with identifier "1" 710-1, which is further identified with a QPSK ¼ coding and modulation scheme 705-1. The second set of representation data 622-2 is associated with identifier "2" 710-2, which is further identified with a second coding and modulation scheme 705-2. The second coding and modulation scheme 705-2 represents the same order modulation scheme (i.e., QPSK) as the first coding and modulation scheme 705-1, but with higher information density (i.e., ⅗ provides fewer error correction bits per information bit than ¼). The third set of representation data 622-3 is associated with identifier "3" 710-3, which is further identified with a third coding and modulation scheme 705-3. The third coding and modulation scheme 705-3 represents a higher order modulation scheme than the second coding and modulation scheme 705-2 (i.e., 8PSK instead of QPSK), but with the same information density (i.e., ⅗). Thus, the first set of representation data 622-1 may be transmitted with the highest reliability, relative to the other sets of representation data (622-2 and 622-3).

FIG. 10B illustrates the same embodiment of the invention, illustratively adapted to worsening link conditions. Still, three sets of representation data (622-1, 622-2, and 622-3) pass from a pre-coder unit 430 to an ACM unit 920. Here, however, the profiler unit 930 has detected worsening link conditions (e.g., heavy rain). In response, identifiers 710 have been reassigned to more reliable coding and modulation schemes 705 in the identifier data store 720.

As illustrated, the first set of representation data 622-1 is still associated with identifier "1" 710-1, which is still further identified with a QPSK ¼ coding and modulation scheme 705-1. No change is made to these assignments, as the QPSK ¼ coding and modulation scheme is the most reliable option provided in the identifier data store 720. However, the second set of representation data 622-2 associated with identifier "2" 710-2 is now further associated with a new coding and modulation scheme 705-4 (QPSK ½). The new coding and modulation scheme 705-4 represents the same order modulation scheme (i.e., QPSK) as the second coding and modulation scheme 705-2 used in FIG. 10A, but with lower information density (i.e., ½ instead of 3/5). Further, the third set of representation data 622-3 is re-associated with identifier "2" 710-2, further associating the third set of representation data 622-3 with the same new coding and modulation scheme 705-4 as is associated with the second set of representation data 622-2. Now, the first set of representation data 622-1 may still be transmitted with the highest reliability, but the other sets of representation data (622-2 and 622-3) will also be more reliably transmitted.

Figure 11:
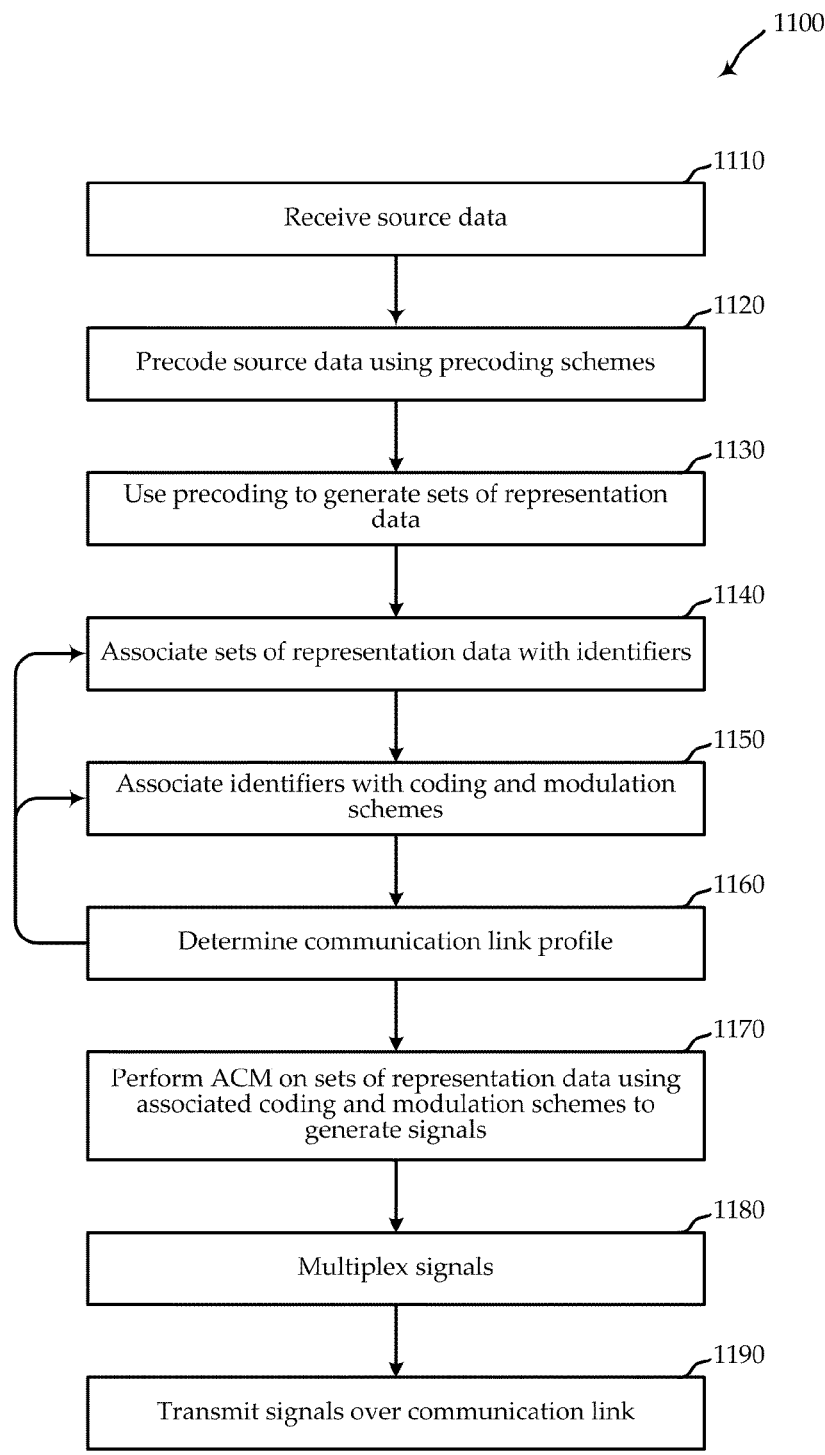
FIG. 11 provides a flow diagram describing methods of transmitting hierarchical data in a layered communication system according to various embodiments of the invention.

The features of the various embodiments of FIGS. 3-10 may be implemented in a number of ways according to the invention. Further, the components and functionalities in those figures may be used to perform a number of different methods according to the invention. FIG. 11 provides a flow diagram describing methods of transmitting hierarchical data in a layered communication system according to various embodiments of the invention.

The method 1100 may begin by receiving a set of source data at block 1110. The set of source data may be any type of data, for example audio-visual data. The set of source data may be pre-coded at block 1120, using various pre-coding schemes. The pre-coding at block 1120 may generate sets of representation data at block 1130.

At block 1140, the sets of representation data generated at block 1130 may be associated with identifiers. In some embodiments, each identifier is associated with a coding and modulation scheme at block 1150. As such, each set of representation data may be associated to a coding and modulation scheme.

In some embodiments, a communication link profile is determined at block 1160. The communication link profile may relate to link conditions, receiver capabilities, subscriber entitlement, audience metrics, or any other useful characteristic of the communication environment in which the method 1100 is being implemented. In certain embodiments, assignments in either or both of blocks 1140 and 1150 may be dynamically adjusted to adapt to information from the communication link profile determined at block 1160.

At block 1170, ACM is performed on the sets of representation data using their associated coding and modulation schemes to generate one or more signals. In some embodiments, the signals may be multiplexed at block 1180 to generate a single signal for transmission. The signal or signals may then be transmitted over a communication link at block 1190.

Figure 12:
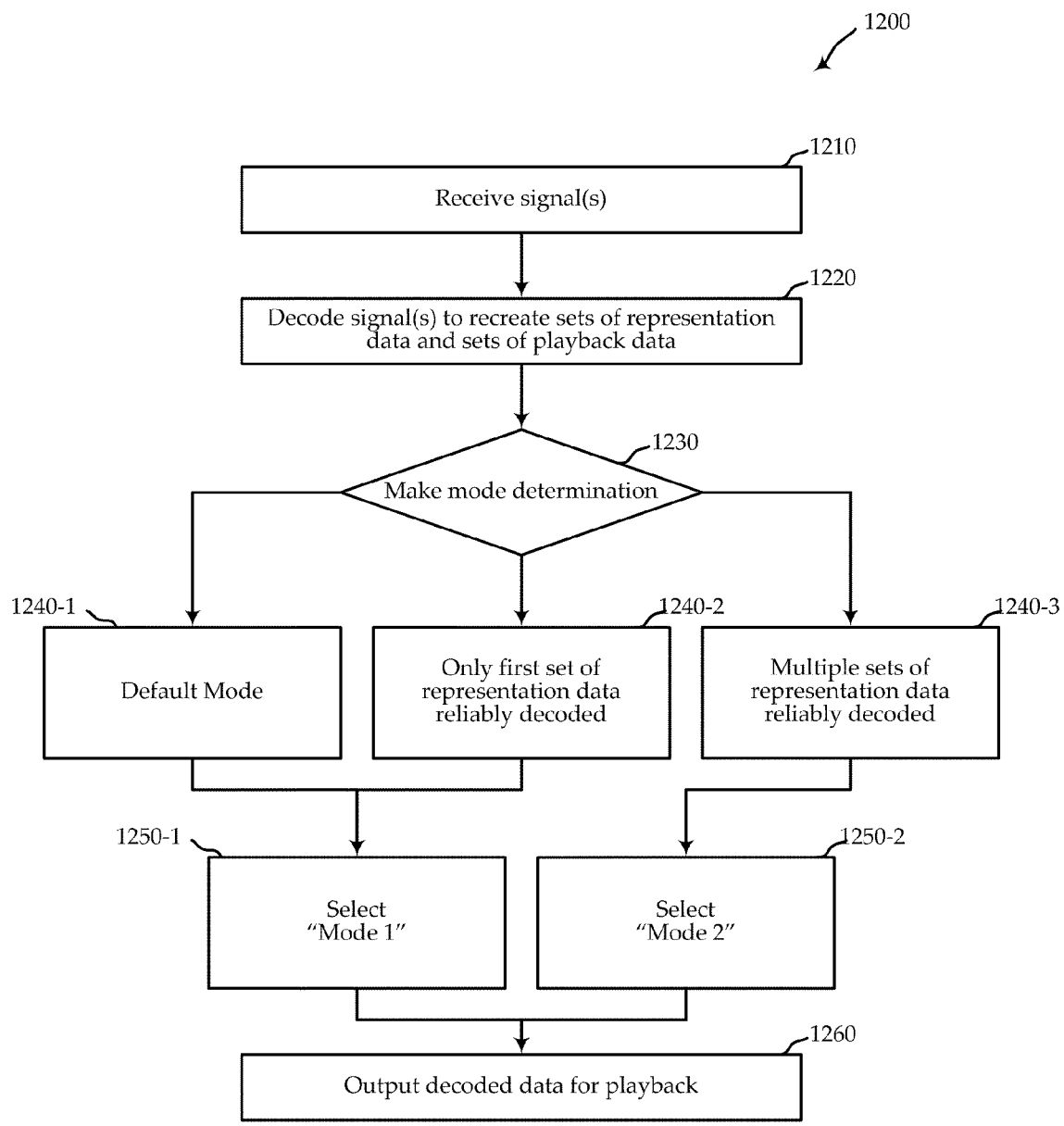
FIG. 12 provides a flow diagram describing methods of receiving hierarchical data in a layered communication system according to various embodiments of the invention.

FIG. 12 provides a flow diagram describing methods of receiving hierarchical data in a layered communication system according to various embodiments of the invention. The method 1200 may begin by receiving one or more signals at block 1210. The signals may contain coded and/or modulated sets of representation data from a set of source data. At block 1220, the signals may be decoded to recreate the sets of representation data, and to use the sets of representation data to playback a representation of the set of source data.

In some embodiments, multiple modes may be available for decoding the signals. At block 1230, a mode determination may be made. This mode determination may be based on any useful parameter, like signal quality of the received signals. In a first embodiment, a default mode is used at block 1240-1, resulting in a selection of "Mode 1" at block 1250-1. In a second embodiment, at block 1240-2, the received signal contains only a first set of representation data, or other sets of representation data cannot be reliably decoded (e.g., they are received with high bit error rates). In this second embodiment, "Mode 1" is also selected at block 1250-1. In a third embodiment, multiple sets of representation data are received at block 1240-3, allowing decoding for a high level playback of the set of source data. In this third embodiment, a second mode, "Mode 2," is selected at block 1250-2. At block 1260, the data decoded in the various modes at blocks 1240 may be output for playback.

Figure 13:
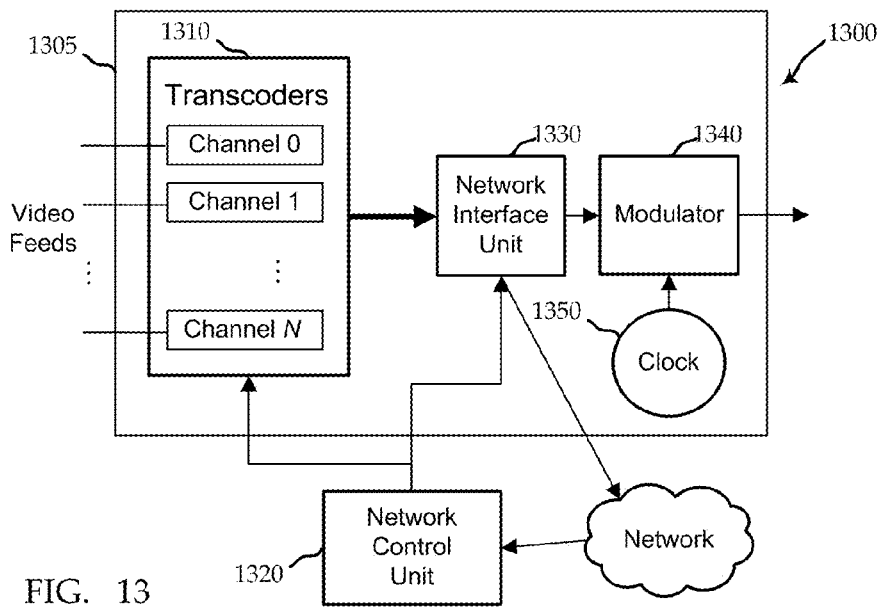
FIG. 13 provides a simplified block diagram of a network access unit according to various embodiments of the invention.

FIG. 13 provides a simplified block diagram of a network access unit 1305 according to various embodiments of the invention. The network access unit 1305 is incorporated in a system 1300 (e.g., a broadcast system) for transmission of video data to one or more data terminals (e.g., like data terminals 330 of FIG. 3). In some embodiments, the system 1300 includes the network access unit 1305, a network control unit 1320, and access to a network (e.g., like network 320 of FIG. 3), such as the Internet. In some embodiments, the network access unit 1305 is a terminal aware network access unit (e.g., like terminal aware network access unit 315 of FIG. 3).

In some embodiments, the network access unit 1305 includes one or more transcoders 1310 (i.e., transcoders for channel 0, 1, . . . , N), a network interface unit 1330 (e.g., a satellite network interface unit for communication in the satellite communication system of FIG. 3), a modulator 1340

(e.g., a DVB-S2 modulator), and a clock 1350. The clock 1350 can be internal to the network access unit 1305, external to the network access unit 1305, and/or shared with other network access units. The network access unit 1305 and the network control unit 1320 can be associated with a single transponder, or a portion of a transponder, for a particular broadcast region. The broadcast region could be as small as a city or as large as the continental US (CONUS), for example.

Generally, a channel does not correspond to a specific frequency. A channel is a resource that can be allocated to a broadcaster. A channel can be subdivided in time into multiple programs. For example, multiple video program input sources can be spliced together in time into a single output channel.

The network control unit 1320 can integrate configuration commands from network operators and status information from various sources to control the transcoders 1310, the network interface unit 1330, and the modulator 1340, e.g., in real time. The transcoders 1310 can receive a number of video feeds and encode them as data streams (e.g., data streams in the format of the Scalable Video Coding (SVC) extension to the H.264/AVC standard) using parameters that are configured through the network control unit 1320. Possible parameters include parameters that control the bit rate of each program, the proportion of the bit rate allocated to each layer of each program, the satellite bandwidth (e.g., as a function of the modcode(s)) the program will utilize, and the availability of the base and enhancement layers of the program. The network interface unit 1330 can multiplex multiple programs as channel streams and format the streams for transmission (e.g., broadcast) via the modulator 1340.

The transcoders 1310 can accept video feeds on various interfaces (e.g., an Actuator Sensor Interface and/or Ethernet) encoded in various formats (e.g., MPEG-2, MPEG-4, H.264, etc.). The transcoders 1310 decode the video and then encode it as H.264/SVC programs, e.g., in real time. In some embodiments, the transcoders 1310 encode the data using a different data partitioning scheme or a scalable pre-coding scheme. In some embodiments, after the transcoders 1310 encode the data, the encoded data is stored for later transmission.

The SVC encoder portion of a transcoder 1310 can be configured per channel. A channel can be subdivided in time into multiple programs, which are further divided into sequences. A sequence is a period of time in which the configuration of the SVC encoder for the channel (i.e., the program during that sequence) is constant. The encoder configuration can change without disrupting the channel and can change, for example, by operator intervention, according to a schedule based on service level agreements, and/or according to an automatic scheme, e.g., a scheme that optimizes the channel based on some network status criteria. In some embodiments, the encoder configuration is implemented according to a master schedule, which is broadcast periodically by the network control unit 1320 to the transcoders 1310 and the network interface unit 1330.

In some embodiments, the encoder configuration parameters determine the bit rate of the program, and thus the quality of the base and enhancement layers of the program. The network control unit 1320 can associate the encoder configuration parameters with the modcode(s) used to broadcast the program to optimize the program for increased availability or increased broadcast efficiency. For example, an operator could increase the availability of the more popular programs and increase efficiency for the programs with the smallest audience.

The transcoders 1310 can be implemented as a combination of high-speed central processing units (CPUs) and field-programmable gate arrays (FPGAs). In some embodiments, a single transcoder hardware node can handle one or more channels.

The transcoders 1310 send encoded data to the network interface unit 1330, e.g., via Ethernet. The network control unit 1320 creates a logical association between the network interface unit 1330 and a transponder 1310 or a contiguous portion of a transponder 1310. The network control unit 1320 configures the network interface unit 1330 to associate a program with modcode(s) used to broadcast the program.

The network interface unit 1330 multiplexes multiple channels from one or more transcoders 1310 and formats the channels into packets for broadcast via the modulator 1340 and/or for routing over the network (e.g., the Internet). In some embodiments, the network interface unit 1330 also multiplexes broadband data (not shown) destined for the data terminals. In this case, the broadband data are routed through the network control unit 1320 to the network interface unit 1330, and further routed to the data terminals via the modulator 1340. The network interface unit 1330 can use the master schedule to generate a set of modcode configurations. Modulator control messages are generated from the modcode configurations, inserted into the output data packet stream of the network interface unit 1330, and sent (e.g., via Ethernet) to the modulator 1340, so that the channels (i.e., the programs associated with the channels during that sequence) are sent using the appropriate modcode(s).

In some embodiments, multiple instances of a network interface unit 1330 can run on a single piece of hardware. In some embodiments, the network interface unit 1330 can be implemented as a commercial, off-the-shelf server.

The network control unit 1320 can implement a broadcast network by combining multiple transcoder banks and network interface units with configuration instructions from operators and status information collected by a variety of sources. The status information can be real time and can include weather radar (e.g., Next-Generation Radar) data or link condition data from a variety of sources, which the network control unit 1320 can use to generate link condition models for one or more data terminals. The status information and the link condition models can be used to adapt the broadcast to optimize the system for increased capacity or reliability.

The network control unit 1320 can create the association between a satellite transponder and a set of network interface units, transcoders, and channels by configuring the bandwidth and output frequency of the modulator and by configuring the routing of packets from the transcoders and network interface units. In some embodiments, the network control unit 1320 also controls the flow of video data and broadband data traffic (not shown) through the transcoders and network interface units by periodically broadcasting a master schedule (e.g., via the Ethernet) and by buffering broadband data packets and forwarding them to the appropriate network interface unit. For broadband data, the network control unit 1320 controls how much bandwidth is available for each broadband data stream. In some embodiments, the network control unit 1320 can be implemented as a commercial, off-the-shelf server with substantial processing and storage capabilities.

Figure 14:
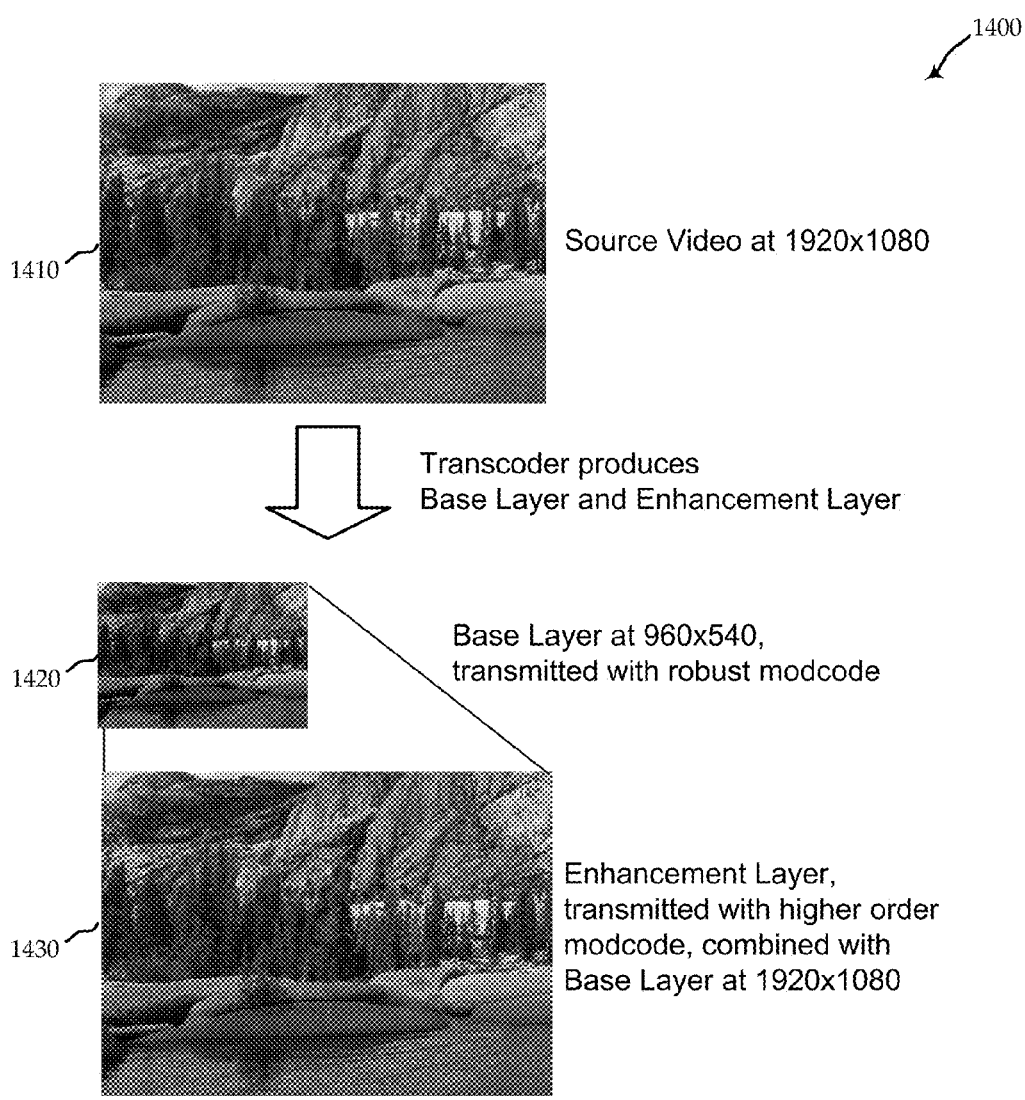
FIG. 14 provides an illustration of source video divided into hierarchical layers according to various embodiments of the invention.

FIG. 14 provides an illustration 1400 of source video 1410 of a program divided into hierarchical layers according to various embodiments of the invention. In the example of illustration 1400, source video 1410 of the program at a frame resolution of 1920×1080 pixels is received by a transcoder (e.g., transcoder 1310 of FIG. 13) and encoded as data streams (e.g., H.264/SVC data streams or data streams generated from a different data partitioning scheme or a scalable pre-coding scheme), producing a base layer 1420 and an enhancement layer.

The base layer 1420 has half the dimensions of the source video 1410, i.e., a frame resolution of 960×540 pixels. The base layer 1420 is transmitted (e.g., broadcast) with a robust modcode (i.e., a low order modcode) to ensure availability of the base layer 1420.

The combination 1430 of the enhancement layer and the base layer 1420 brings the received video to the full resolution of the source video 1410, i.e., a frame resolution of 1920× 1080 pixels. The enhancement layer is transmitted (e.g., broadcast) with a more efficient modcode, i.e., a higher order modcode than the robust modcode used for the base layer 1420. Depending on the system configuration, the division of the source data into hierarchical layers transmitted with different modcodes can result in bandwidth saving on the channel of, for example, 30-50%.

During a rain fade, one or more data terminals may lose reception of the enhancement layer, which is transmitted with the more efficient, less robust modcode. As a result, the quality of the image of the program will be temporarily reduced in these affected data terminals. However, in some cases, the users of these affected data terminals may not realize that the image of the program is temporarily impaired. Thus, there is a trade-off between bandwidth savings and loss in program image quality and availability.

Figure 15A:
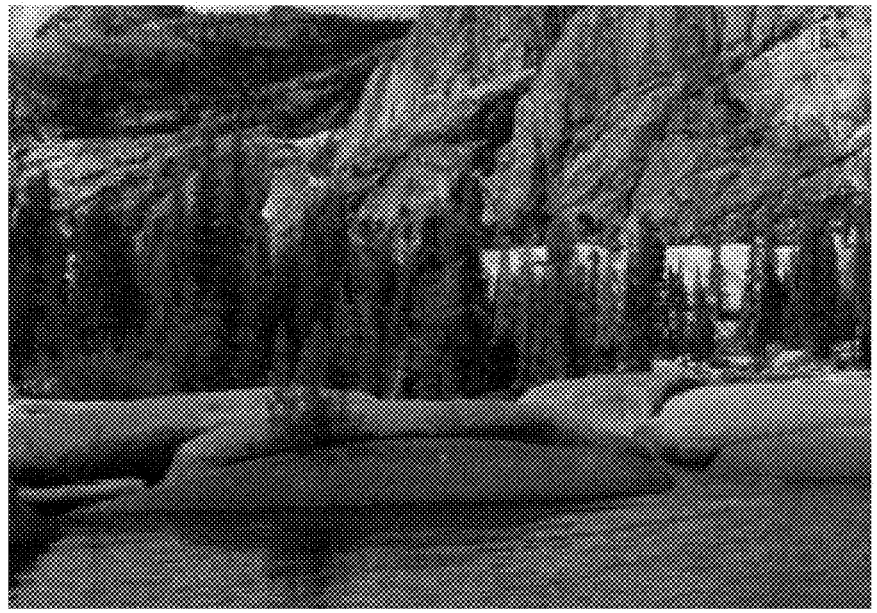
FIGS. 15A-15B provide illustrations of hierarchical layers at various bit rates according to various embodiments of the invention.
Figure 15B:
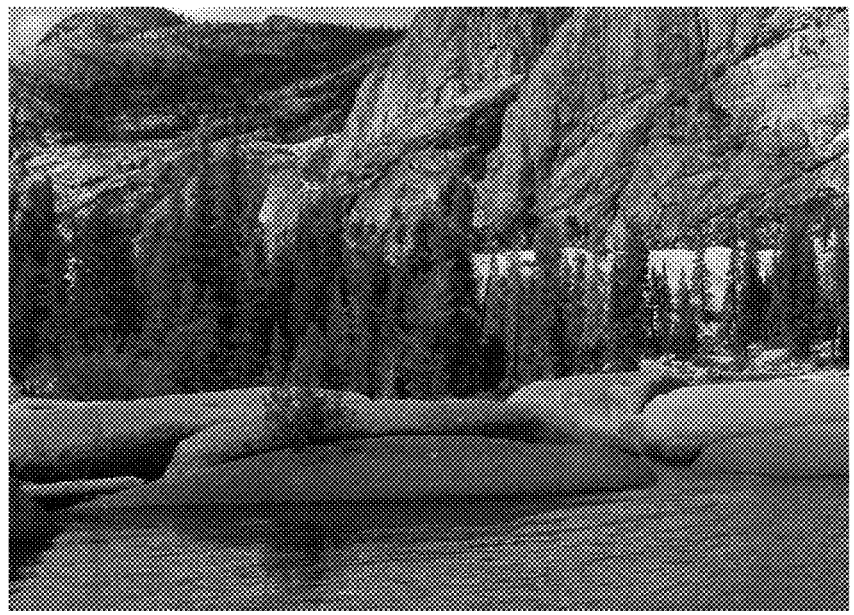

FIGS. 15A-15B provide illustrations of hierarchical layers at various bit rates according to various embodiments of the invention. Various percentages of the bit rate of a program can be allocated to the base and enhancement layers to achieve different objectives, e.g., reducing the bandwidth used to transmit the program or increasing the availability of one or more layers of the program. The bit rate of each program and the proportion of the bit rate allocated to each layer of the program are possible parameters that can be configured (e.g., by the network control unit 1320 of FIG. 13) for the transcoder (e.g., for an SVC encoder portion of a transcoder 1310 of FIG. 13).

FIGS. 15A-15B illustrate one configuration for reducing the bandwidth used to transmit a video program. FIG. 15A shows the interpolated base layer 1425 of the video program when 15% of the 600 kbps source video bit rate (i.e., 90 kbps) is allocated to the base layer. Interpolation of the base layer to a higher resolution is optional. With 15% of the source video bit rate allocated to the base layer, the remaining 85% of the source video bit rate (i.e., 510 kbps) is then allocated to the enhancement layer. FIG. 15B shows the combination 1500 of the base layer at 15% bit rate and the enhancement layer at 85% bit rate.

The base layer can be transmitted with a robust modcode (i.e., a low order modcode) that provides high availability. The enhancement layer can be transmitted with a less robust modcode (i.e., a higher order modcode) that provides slightly lower availability of the enhancement layer. This configuration can reduce the bandwidth used to transmit the program (e.g., by 30-50%) relative to sending both layers with a robust modcode or sending a single layer version of the program with a robust modcode.

A less aggressive configuration might allocate 50% of the bit rate to the base layer and 50% of the bit rate to the enhancement layer. Using this configuration, the bandwidth used to transmit the program might be reduced by only 15%, for example. However, it is less likely that viewers of the program would perceive the loss of image fidelity during a rain fade. Thus, the ability to vary the bit rate allocation between the base layer and the enhancement layer allows efficient utilization of bandwidth and tailoring of video program delivery over a wide range of fade conditions.

Figure 16:
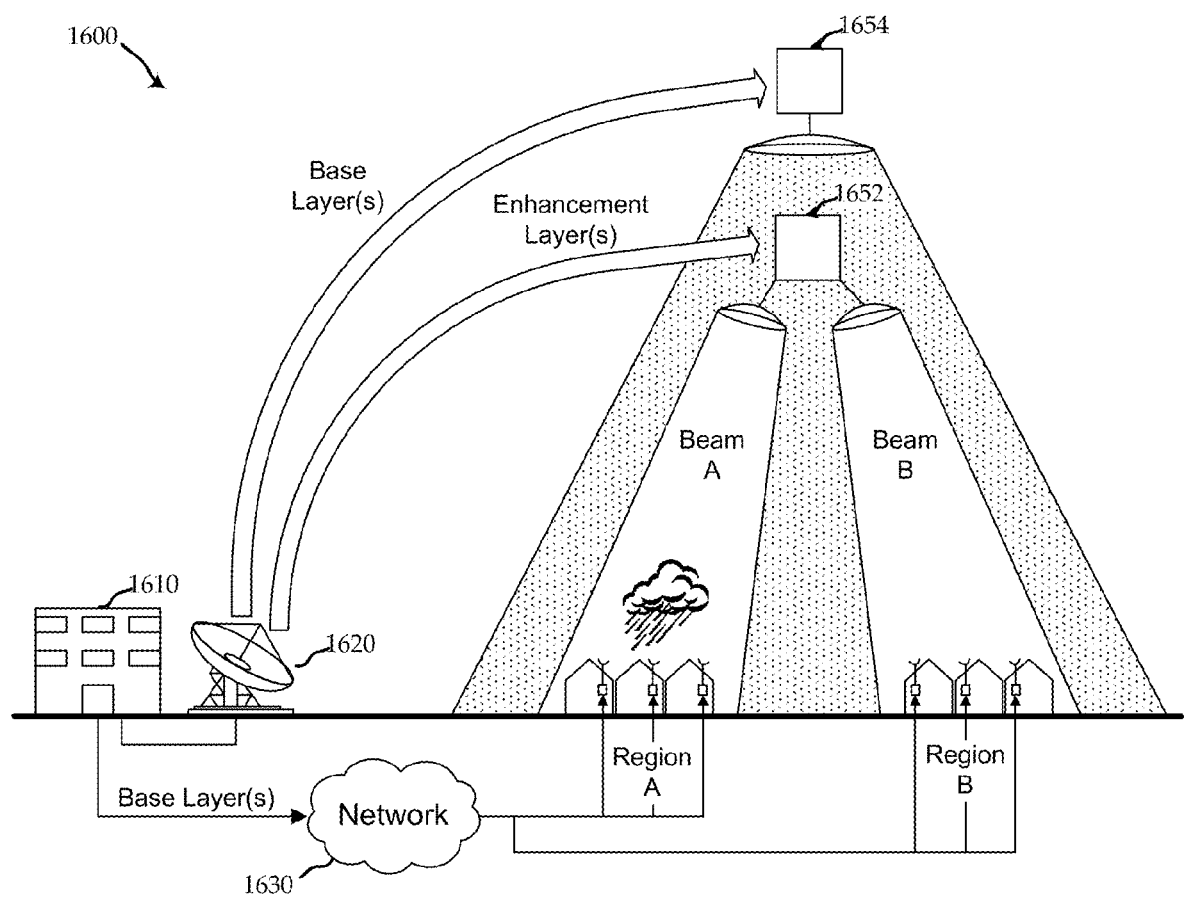
FIG. 16 shows a simplified block diagram of a portion of a communication system that provides multiple possible transmission paths for transmitting hierarchical layers according to various embodiments of the invention.

FIG. 16 shows a simplified block diagram of a portion of a communication system 1600 that provides multiple possible transmission paths for transmitting hierarchical layers according to various embodiments of the invention. The communication system 1600 includes a hub 1610, an antenna 1620 (e.g., the antenna 310 of FIG. 3), a network 1630, multiple data terminals (not shown) located in homes, a first band satellite 1652, and a second band satellite 1654.

The communication system 1600 provides multiple possible transmission paths for transmitting hierarchical layers of video programs. Data terminals (e.g., data terminals 330 of FIG. 3) located in homes can receive hierarchical layers on multiple satellite paths and/or through a broadband data transmission path. For example, each data terminal can decode multiple programs simultaneously received on one or more satellite interfaces and/or through an Ethernet connection to the network 1630. Regardless of the transmission path or the packet format, each packet received at the data terminal includes fields that allow the data terminal to identify the respective program and layer to which the received packet belongs, and to decode it at the proper time. In some embodiments, the data terminal can include a return link through one or more of the satellites 1652 and 1654, via the network 1630 through an Ethernet connection, and/or through a cellular network interface (not shown).

The hub 1610 can send hierarchical layers of programs to the antenna 1620, e.g., via a network access unit (not shown), and to the network 1630, e.g., via a broadband connection. A network access unit can use the antenna 1620 to transmit the hierarchical layers to the satellites 1652 and 1654. The first band satellite 1652 and the second band satellite 1654 operate on two different frequency bands. In some embodiments, the first band is the $K_a$ frequency band (i.e., 26.5-40 GHz), and the second band is the $K_u$ frequency band (i.e., 12-18 GHz). A $K_u$ band satellite can broadcast to a wide region, such as the continental United States (CONUS). A $K_a$ band satellite uses antennas that are focused on smaller regions that are, for example, 50-100 miles in diameter.

In FIG. 16, the first band satellite 1652 broadcasts to two regions, Region A and Region B, using two beams, Beam A and Beam B, respectively. The programs transmitted to the two regions may be the same or different. The second band satellite 1654 broadcasts to a much wider region, as indicated by the shaded beam of FIG. 16.

Satellites are inherently broadcast or multicast systems since their signals are received by all data terminals in a beam. However, the signal can be subdivided in frequency and time, such that a portion of the bandwidth is dedicated to a single data terminal or a group of data terminals.

The packets transmitted over a satellite link can be encapsulated in any of a number of formats. Examples include MPEG format, where each program is labeled with a program identifier; Media Access Control (MAC) layer packet format, where each packet includes a destination address; and Internet Protocol (IP) packet format, where each program is delivered directly to a data terminal with a unique IP address, a multicast address, or a broadcast address.

One or more hierarchical layers of a program can also be transmitted from the hub 1610 to the data terminals through a broadband connection with the network 1630. With this transmission path, data packets are encapsulated in IP packets with an address that allows the network 1630 to correctly route the IP packets to the respective data terminals.

In FIG. 16, the base layer of a program is transmitted to the data terminals via the second band satellite 1654 and the broadband connection of the network 1630. The enhancement layer of the program is transmitted to the data terminals via the first band satellite 1652. Data terminals in Region A are experiencing rain fade conditions that may affect reception of the base layer and/or the enhancement layer broadcast via the satellites 1652 and 1654. In this case, the data terminals in Region A can still receive the base layer of the program transmitted via the broadband connection of the network 1630.

Figure 17:
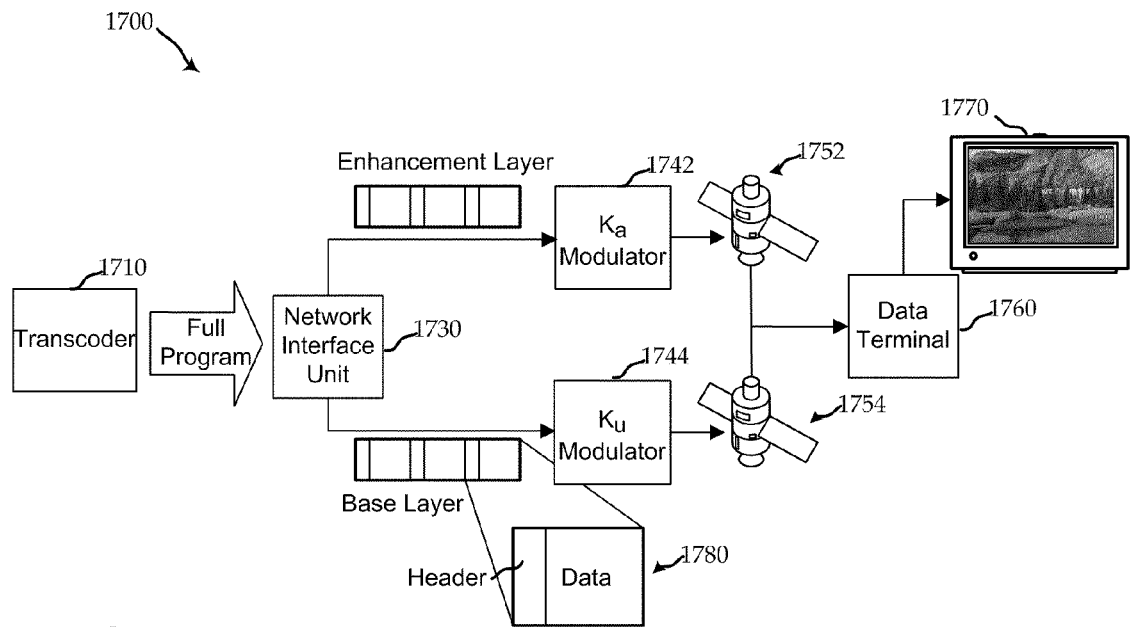
FIG. 17 provides a functional block diagram of a system for transmitting hierarchical layers on multiple transmission paths according to various embodiments of the invention.

FIG. 17 provides a functional block diagram of a system 1700 for transmitting hierarchical layers on multiple transmission paths according to various embodiments of the invention. The system 1700 includes a transcoder 1710 (e.g., transcoder 1310 of FIG. 13), a network interface unit 1730 (e.g., network interface unit 1330 of FIG. 13), a $K_a$ modulator 1742, a $K_u$ modulator 1744, a $K_a$ band satellite 1752, a $K_u$ band satellite 1754, a data terminal 1760, and a video display device 1770.

In the system 1700, the transcoder 1710 receives encoded (e.g., MPEG-4 encoded) video data, decodes the video data, encodes it as a full H.264/SVC program, and sends the full program to the network interface unit 1730. In some embodiments, the full program is divided into hierarchical layers using a different data partitioning scheme or a scalable precoding scheme. The enhancement layer of the program is sent from the network interface unit 1730 to the $K_a$ modulator 1742 to code and modulate with the respective modcode before transmission using the $K_a$ band satellite 1752. Similarly, the base layer of the program is sent from the network interface unit 1730 to the $K_u$ modulator 1744 to code and modulate with the respective modcode before transmission using the $K_u$ band satellite 1754. As illustrated in FIG. 17, the base layer and the enhancement layer of a program include packets 1780 with data and a header, e.g., which includes a program identifier and/or an address for routing the packet.

Transmission by the $K_a$ band satellite 1752 or the $K_u$ band satellite 1754 can be via broadcast, multicast, or unicast. Satellites are inherently broadcast or multicast systems. However, the satellite beam can be subdivided in frequency and in time, to allow packet delivery in a unicast or multicast fashion. To deliver packets via unicast, a unique data terminal (e.g., data terminal 1760) is directed to tune to specific frequencies and to process packets in specific time slots. Furthermore, a data terminal can filter packets using a destination address. To deliver packets via multicast, the network interface unit 1730 can direct groups of data terminals to tune to specific frequencies and to process packets in specific time slots. The data terminals can filter packets using a multicast address scheme.

The data terminal 1760 is capable of receiving the hierarchical layer transmissions from the two satellites 1752 and 1754. In the system 1700 of FIG. 17, the base layer transmission on the $K_u$ band is less susceptible to rain fade than the enhancement layer transmission on the $K_a$ band. As an example, for a $K_u$ band of 11 GHz, the attenuation by rain at a rate of 10 mm/hr is 0.2 dB/km; for a $K_a$ band of 20 GHz, the attenuation by rain falling at the same rate is 0.9 dB/km.

Although FIG. 17 illustrates the example where the enhancement layer is transmitted on the $K_a$ band and the base layer is transmitted on the $K_u$ band, other configurations are possible. The system 1700 is capable of transmitting the hierarchical layers of a program in any of the following ways: a single layer on the $K_u$ band; both layers on the $K_u$ band, each layer using a separate modcode; a first layer on the $K_u$ band, a second layer on the $K_a$ band, each layer using a separate modcode; both layers on the $K_a$ band, each layer using a separate modcode, and a single layer on the $K_a$ band. The various configurations allow the delivery of video programs to be tailored over a wide range of fade conditions and to make the best possible use of the available $K_u$ and $K_a$ frequency bandwidth.

In addition to the flexibility of allocating a program's layers across the $K_u$ and $K_a$ frequency bands, the system 1700 is further capable of varying the allocation of bit rate percentages of a program to the base and enhancement layers to achieve different objectives, e.g., reducing the bandwidth used to transmit the program or increasing the availability of one or more layers of the program.

Determining the particular transmission path for a hierarchical layer and/or determining the bit rate percentage for the hierarchical layer can be based at least in part on configuration commands from network operators and/or status information (e.g., return link conditions of data terminals) received from various sources. A network control unit (not shown) can integrate configuration commands and status information to control the transcoder 1710, the network interface unit 1730, the $K_a$ modulator 1742, and/or the $K_u$ modulator 1744, e.g., in real time. The network control unit can calculate the bit rates and modcodes for layers of a program, resolve the calculated bit rates and modcodes to a set of configuration messages, and send these configuration messages, e.g., as a master schedule, to components of the system 1700.

As an example, from a received master schedule, the transcoder 1710 can identify encoder configuration parameters (e.g., a quantization parameter for each layer of a program that determines the fidelity of the layer to the original video source), determine the bit rate percentage of each layer from the encoder parameters, and partition the program into the hierarchical layers with the respective bit rate percentages. Likewise, the network interface unit 1730 can use the master schedule to generate a set of modcode configurations as modulator control messages inserted into the output packet streams of the base layer and the enhancement layer sent to the $K_u$ modulator 1744 and the $K_a$ modulator 1742, respectively. As described above, the configuration changes per sequence, for example, in response to updated link conditions, with an updated master schedule broadcast by the network control unit.

Some example transmission path and bit rate configurations follow for achieving different objectives. The resulting availability and capacity increase of the examples are based on several nominal conditions as follows. The example system consists of a $K_u$ band transponder that is 36 MHz wide and broadcasting at 11 GHz and a $K_a$ band transponder that is also 36 MHz wide and broadcasting at 20 GHz. The operating Es/N0 for clear skies of the $K_u$ and $K_a$ band beams are 13 dB. For an availability of 99.9%, a link margin of 2.0 dB is needed for the $K_u$ band at 11 GHz, while a link margin of 7.7 dB is needed for the $K_a$ band at 20 GHz. For an availability of 99%, a link margin of 0.5 dB is needed for the $K_u$ band at 11 GHz, while a link margin of 2.0 dB is needed for the $K_a$ band at 20 GHz.

The availability of a program, or a layer of a program, can be determined statistically and used by a broadcaster when real-time link conditions are not provided by return links from data terminals. Availability statistics can be compiled, for example, by monitoring satellite signals at specific frequencies at specific locations for long durations. For optimizing system configurations, it is preferable to use real-time link conditions rather than availability statistics. Radar data (e.g., Next-Generation Radar) provide a system with an intermediate level of knowledge about link conditions.

Generally, in a conventional video broadcast system, programs are broadcast using a single modcode that is selected using a statistical analysis of fade conditions for the beam. In the example system, a link margin of 2.0 dB would provide 99.9% availability for a full program broadcast on the $K_u$ band, and a link margin of 7.7 dB would provide 99.9% availability for a full program broadcast on the $K_a$ band. To achieve the 99.9% availability for the $K_u$ band, a DVB-S2 modcode of 8-PSK ⅚ (i.e., 8-PSK modulation and ⅚ rate coding) is needed. To achieve the 99.9% availability for the $K_a$ band, a DVB-S2 modcode of QPSK ⅘ (i.e., QPSK modulation and ⅘ rate coding) is needed.

When high-definition programs are encoded at 10,000 kbps using H.264 format and broadcast using a single layer, the example $K_a$ band transponder can broadcast five programs, while the example $K_u$ band transponder can broadcast eight programs. Thus, a total of thirteen full programs can be broadcast individually as single layers on the $K_u$ and $K_a$ bands. In the following examples, "kilo" or "k" equals 1000 units, and the overhead imposed by encapsulation is ignored.

In a first example, the broadcast capacity of the system 1700 is increased relative to the conventional video broadcast system immediately described above. In this example, a 10,000 kbps video program at a resolution of 1920×1080 pixels and at a frame rate of 30 Hz is partitioned into a base layer and an enhancement layer. The base layer of the video is configured by a network operator to include 50% of the data for the full program (i.e., 50% bit rate percentage) at a resolution of 960×540 pixels and at a frame rate of 30 Hz. The enhancement layer includes the other 50% of the program data (i.e., the remaining 50% bit rate percentage).

Continuing the first example, when the base layers of multiple programs are broadcast using this configuration on the $K_u$ band transponder, there is capacity for seventeen base layers at 99.9% availability. When the enhancement layers for the seventeen programs are broadcast on the $K_a$ band transponder, the 8PSK ⅚ modcode can be used to provide 99% availability. Thus, by reducing the availability of the full program by 0.9%, the capacity of the system 1700 is increased by four channels (i.e., from thirteen to seventeen full programs).

In a second example, the broadcast capacity of the system 1700 is also increased relative to the conventional video broadcast system described above. This example also uses 10,000 kbps video programs at a resolution of 1920×1080 pixels and at a frame rate of 30 Hz. Here, the base layers are configured to have a 40% bit rate percentage, and the enhancement layers are configured to have the remaining 60% bit rate percentage. With this configuration, there is capacity for fourteen enhancement layers on the $K_a$ band at 99% availability. The base layers of the fourteen programs occupy 56,000 kilobits on the $K_u$ band transponder at 99.9% availability, which leaves 33,000 kilobits of $K_u$ band transponder capacity available for transmitting other data, e.g., broadband data.

The system 1700 provides broadcasters the option of improving the availability of a program during a severe rain fade without severely impairing the capacity of the system. In a third example, availability of a video program is increased relative to the conventional video broadcast system described above. This example also uses 10,000 kbps video programs at a resolution of 1920×1080 pixels and at a frame rate of 30 Hz. Here, the base layer of a program is configured to have a 15% bit rate percentage, and the enhancement layer is configured to have the remaining 85% bit rate percentage. The base layer can be broadcast on the $K_u$ band at a modcode of QPSK ¼ to overcome severe storms that occur, for example, only 0.001% of the time. With this configuration, the system 1700 has the capacity for ten full programs at 99.999% availability. Thus, in this example, availability of the full program is improved (i.e., from 99.9% to 99.999% availability) in severe weather at the cost of decreasing by three channels (i.e., from thirteen to ten full programs), relative to the conventional video broadcast system.

Figure 18:
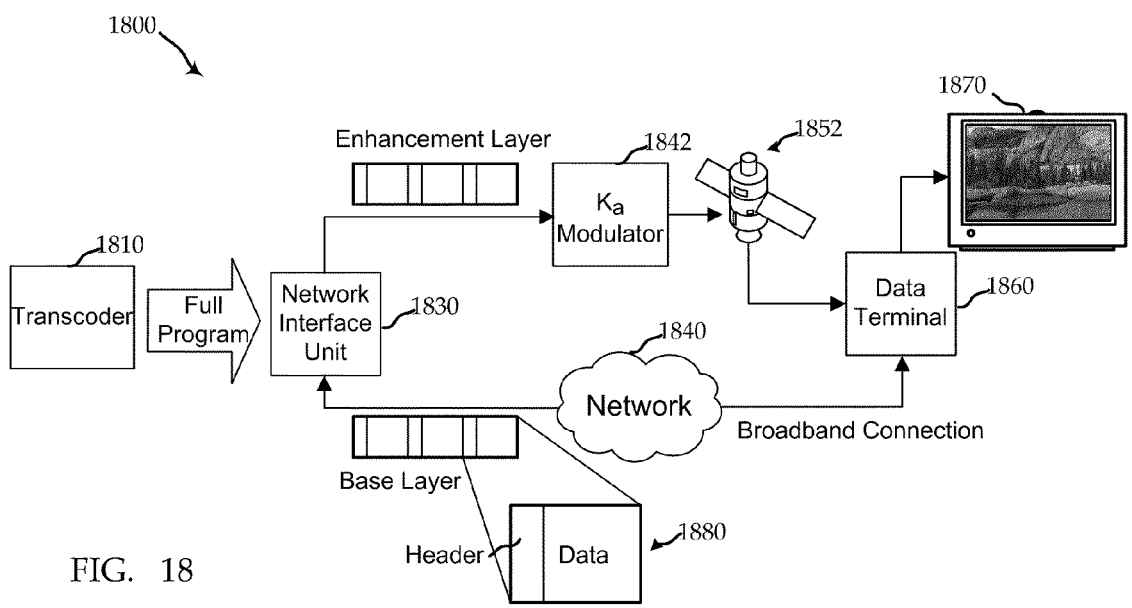
FIG. 18 provides another functional block diagram of a system for transmitting hierarchical layers on multiple transmission paths according to various embodiments of the invention.

FIG. 18 provides another functional block diagram of a system 1800 for transmitting hierarchical layers on multiple transmission paths according to various embodiments of the invention. The system 1800 includes a transcoder 1810 (e.g., transcoder 1310 of FIG. 13), a network interface unit 1830 (e.g., network interface unit 1330 of FIG. 13), a $K_a$ modulator 1842, a network 1840 (e.g., network 1630 of FIG. 16), a $K_a$ band satellite 1852, a data terminal 1860, and a video display device 1870.

In the system 1800, the transcoder 1810 decodes the video-encoded data, encodes it as a full H.264/SVC program, and sends the full program to the network interface unit 1830. In some embodiments, the full program is divided into hierarchical layers using a different data partitioning scheme or a scalable pre-coding scheme. The enhancement layer of the program is sent from the network interface unit 1830 to the $K_a$ modulator 1842 to code and modulate with the respective modcode before transmission using the $K_a$ band satellite 1852. The base layer of the program is sent from the network interface unit 1830 through the network 1840 on a broadband connection to the data terminal 1860. As illustrated in FIG. 18, the base layer and the enhancement layer of a program include packets 1880 with data and a header, e.g., which includes a program identifier and/or an address for routing the packet.

In the system 1800, a data terminal (e.g., data terminal 1860) registers with the network interface unit 1830, e.g., by establishing a Transmission Control Protocol/Internet Protocol (TCP/IP) connection to the network interface unit 1830. The network interface unit 1830 receives control messages from the data terminal (e.g., program requests and/or satellite link condition updates) and sends one or more base layers to the data terminal through the network 1840 (e.g., the Internet using a broadband connection). The data terminal synchronizes the packets that are received over the $K_a$ band satellite 1852 and through the network 1840 using the header fields in the enhancement and base layer packets 1880.

In this example configuration, the $K_a$ band transponder is 36 MHz wide and broadcasts at 20 GHz, and the data terminal 1860 has a broadband connection through an internet service provider (ISP). The broadband connection allows a user of the data terminal 1860 to establish a connection to video servers at a broadcast system hub (e.g., hub 1610 of FIG. 16), to servers located at points in the network 1840 (e.g., ISP offices), and/or to other data terminals.

In clear sky conditions, video programs can be broadcast over the satellite link on the $K_a$ band, for example, using a single layer and received by data terminals in the satellite beam using the highest supported modcode. In rain fade conditions, the system 1800 can adjust the hierarchical layering of programs and deliver the hierarchical layers to data terminals via the broadband connection and/or the satellite link on the $K_a$ band.

As an example, when a rain fade is localized (e.g., as in Beam A of FIG. 16), the rain fade might only affect a few data terminals. In this case, the system 1800 can continue to broadcast the programs over the satellite link using modcodes that are appropriate to the data terminals experiencing clear sky conditions and, additionally, deliver programs to rain faded data terminals with the broadband connection. If the broadband connection has sufficient, reliable bandwidth, the system 1800 can deliver the full program via the broadband connection. However, if the broadband connection has low throughput, the system 1800 can deliver the base layer to the rain faded data terminals at a lower bit rate relative to a full program.

Alternatively, the system 1800 can send the base layer through the broadband link and can broadcast the enhancement layer over the satellite link on the $K_a$ band. This configuration increases the overall capacity of the system 1800 to carry programs by using a higher order modcode (e.g., with a lower link margin for reduced availability) to broadcast the enhancement layers while relying on the broadband connection for reliable delivery of the base layer. For example, if the enhancement layer of a 10,000 kbps video program is configured with a modcode of 8PSK ⅚ and 85% bit rate percentage, ten programs can be broadcast at 99% availability per $K_a$ band transponder and broadband combination. This doubles the number of programs compared to the five programs achievable when the full programs are broadcast on the $K_a$ band with a modcode of QPSK ⅘ for 99.9% availability.

Figure 19:
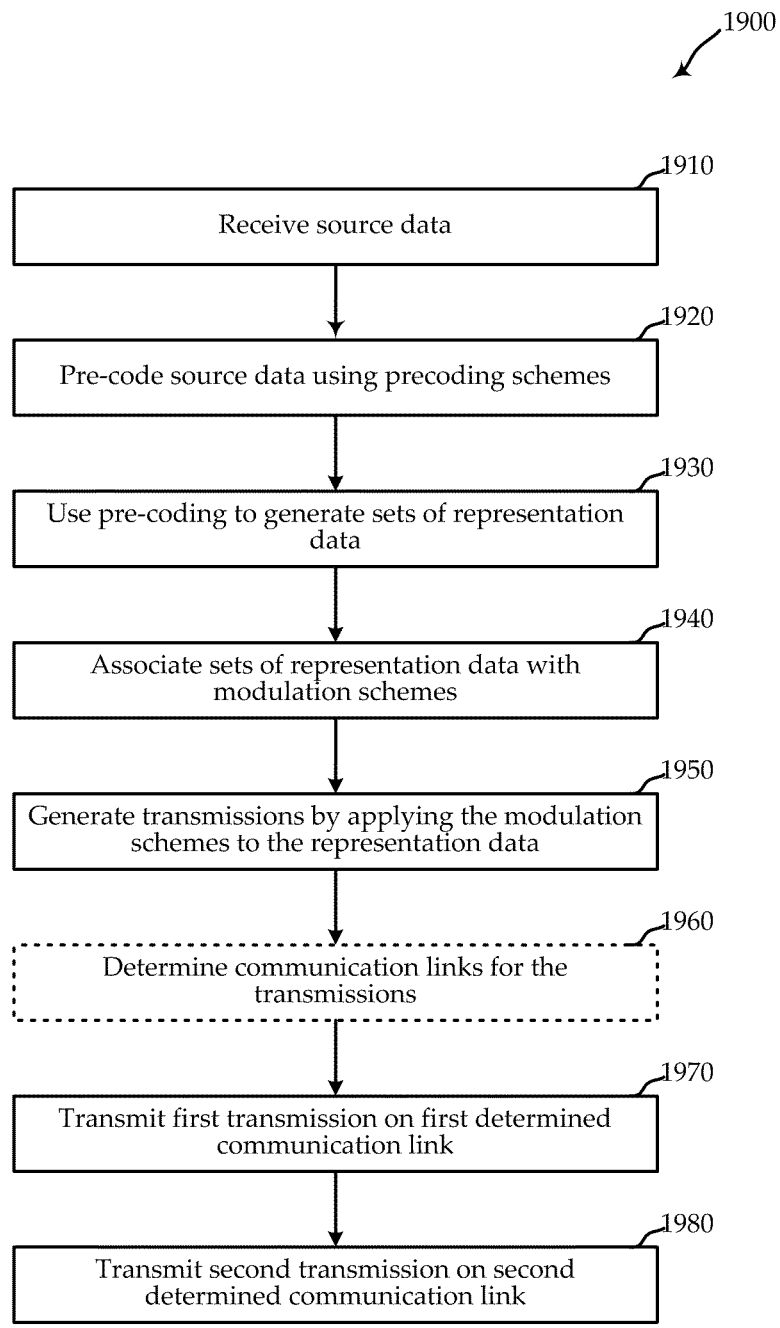
FIG. 19 provides a flow diagram describing methods for hierarchical communication of a set of source data, according to various embodiments of the invention.

The features of the various embodiments of FIGS. 13-18 may be implemented in a number of ways according to the invention. Further, the components and functionalities in those figures may be used to perform a number of different methods according to the invention. FIG. 19 provides a flow diagram describing methods for hierarchical communication of a set of source data, according to various embodiments of the invention.

The method 1900 may begin by receiving a set of source data at block 1910. The set of source data may be any type of data, for example audio-visual data, representing content to be communicated to a data terminal.

The set of source data may be pre-coded at block 1920, using various pre-coding schemes. The pre-coding at block 1920 may generate sets of representation data at block 1930. In particular, at least some of the source data is pre-coded using a first pre-coding scheme to generate a first set of representation data. The first set of representation data is decodable independently to provide a set of first-level playback data representing the source data. At least some of the source data is pre-coded using a second pre-coding scheme to generate a second set of representation data. The second set of representation data is decodable in combination with the first set of representation data to provide a set of second-level playback data representing the source data.

In some embodiments, the pre-coding of block 1920 includes pre-coding at least some of the source data using at least one of a scalable pre-coding scheme or a data partitioning scheme. If a data partitioning scheme is used, each of the first pre-coding scheme and the second pre-coding scheme can include a data partitioning scheme using SVC.

At block 1940, the sets of representation data generated at block 1930 are associated with modulation schemes. The first set of representation data is associated with a first coding and modulation scheme. The second set of representation data is associated with a second coding and modulation scheme, which is of a higher order than the order of the first coding and modulation scheme. In some embodiments, each set of representation data is associated with an identifier that is further associated with a particular coding and modulation scheme.

At block 1950, ACM is performed on the sets of representation data using their associated coding and modulation schemes to generate transmissions. In particular, a first transmission is generated by applying the first coding and modulation scheme to the first set of representation data. A second transmission is generated by applying the second coding and modulation scheme to the second set of representation data.

In some embodiments, at block 1960, communication links for the transmissions are determined. In some embodiments, the determined communication links differ. Each of a first communication link and a second communication link can be determined as a satellite link, a broadband Internet link, or a cellular data network link. In one example, the first communication link and the second communication link are determined to be satellite links on two separate frequency bands. The first communication link can be determined as a satellite link on a $K_u$ band, and the second communication link can be determined to be a satellite link on a $K_a$ band, for example. Alternatively, the first communication link is determined to be a broadband Internet link, while the second communication link is determined to be a satellite link.

At block 1970, the first transmission is transmitted to the data terminal on the first communication link. At block 1980, the second transmission is transmitted to the data terminal on the second communication link. A transmission to the data terminal can be via broadcast, multicast, or unicast, depending on the respective communication link.

In some embodiments, the determining of the communication link at block 1960 is based on one or more configurable objectives, such as maximizing the availability of the one or more programs of the source data, minimizing the cost (i.e., the bandwidth utilized) to deliver the one or more programs, or network congestion (e.g., the demand for programs relative to the network resources allocated or available to transmit the programs). In some embodiments, the determining can be automatic per program, per subscriber, per group of subscribers, or based on a policy configured by a network operator.

Figure 20:
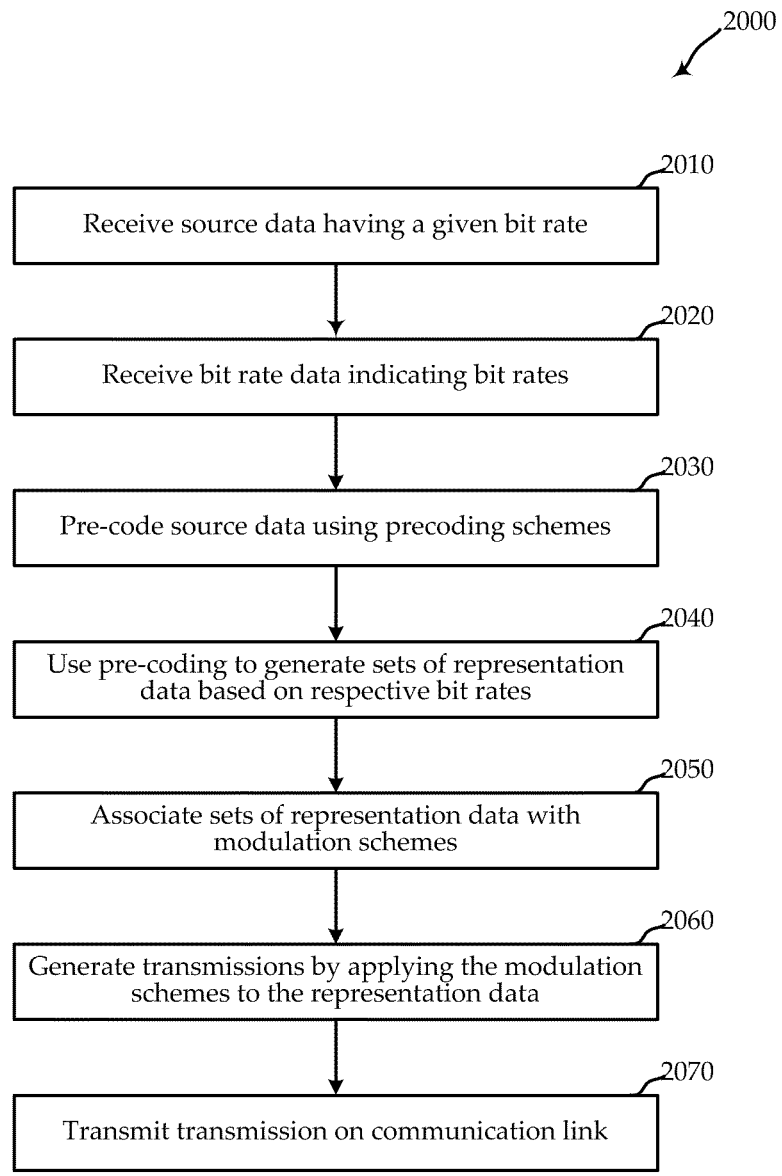
FIG. 20 provides a flow diagram describing methods for hierarchical communication of a set of source data, according to various embodiments of the invention.

FIG. 20 provides a flow diagram describing methods for hierarchical communication of a set of source data, according to various embodiments of the invention. The method 2000 may begin by receiving a set of source data at block 2010. The set of source data may be any type of data, for example audio-visual data, representing content to be communicated to a data terminal. The source data received has a given bit rate.

At block 2020, bit rate data indicating a first bit rate and a second bit rate are received. A sum of the first bit rate and the second bit rate equals the given bit rate of the source data. In some embodiments, the bit rate data is received as encoder configuration parameters included in a master schedule sent by a network control unit.

The set of source data may be pre-coded at block 2030, using various pre-coding schemes. The pre-coding at block 2030 may generate sets of representation data based on the respective bit rates at block 2040. In particular, at least some of the source data is pre-coded using a first pre-coding scheme to generate a first set of representation data, decodable independently to provide a set of first-level playback data representing the source data. The first set of representation data is generated in part based on the first bit rate. At least some of the source data is pre-coded using a second pre-coding scheme to generate a second set of representation data, decodable in combination with the first set of representation data to provide a set of second-level playback data representing the source data. The second set of representation data is generated in part based on the second bit rate. In some embodiments, the pre-coding of block 2030 and the generating of block 2040 are performed together in a combined step.

In some embodiments, the pre-coding of block 2030 includes pre-coding at least some of the source data using at least one of a scalable pre-coding scheme or a data partitioning scheme. If a data partitioning scheme is used, each of the first pre-coding scheme and the second pre-coding scheme can include a data partitioning scheme using SVC.

At block 2050, the sets of representation data generated at block 2040 are associated with modulation schemes. The first set of representation data is associated with a first coding and modulation scheme. The second set of representation data is associated with a second coding and modulation scheme, which is of a higher order than the order of the first coding and modulation scheme. In some embodiments, each set of representation data is associated with an identifier that is further associated with a particular coding and modulation scheme.

At block 2060, ACM is performed on the sets of representation data using their associated coding and modulation schemes to generate transmissions. In particular, a first transmission is generated by applying the first coding and modulation scheme to the first set of representation data. A second transmission is generated by applying the second coding and modulation scheme to the second set of representation data.

At block 2070, the first transmission and the second transmission are transmitted to the data terminal. Transmission to the data terminal can be via broadcast, multicast, or unicast, depending on the communication link. In some embodiments, the first transmission and the second transmission are transmitted on the same communication link or on different communication links, where each communication link can be a satellite link, a broadband Internet link, or a cellular data network link.

The bit rates for the respective sets of representation data can be configured to achieve different objectives, such as reducing the bandwidth needed to transmit a program or increasing the availability of one or more layers of the program. An updated master schedule broadcast to update encoder configuration parameters (e.g., based on changing link conditions or network congestion) can also include updated modcode configurations to achieve a particular objective. That is, when the allocation of bit rate percentages changes for hierarchical layers of a program, the associated coding and modulation schemes for the hierarchical layers can also change accordingly.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are exemplary in nature and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory" or "memory unit" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, wireless channels, a sim card, other smart cards, and various other mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. In addition, a number of steps may be undertaken before, during, or after the above elements are considered. Accordingly, the above description should not be taken as limiting the scope of the invention.

What is claimed is:

1. A method for hierarchical communication of a set of source data, the method comprising:
   receiving source data representing content to be communicated to a data terminal;
   pre-coding at least some of the source data using a first pre-coding scheme to generate a first set of representation data, decodable independently to provide a set of first-level playback data representing the source data;
   pre-coding at least some of the source data using a second pre-coding scheme to generate a second set of representation data, decodable in combination with the first set of representation data to provide a set of second-level playback data representing the source data;
   associating the first set of representation data with a first channel coding and modulation scheme;
   associating the second set of representation data with a second channel coding and modulation scheme, wherein the second channel coding and modulation scheme is of a higher order than the first channel coding and modulation scheme;
   generating a first transmission by applying the first channel coding and modulation scheme to the first set of representation data;
   generating a second transmission by applying the second channel coding and modulation scheme to the second set of representation data;
   transmitting the first transmission to the data terminal on a first communication link; and
   transmitting the second transmission to the data terminal on a second communication link, wherein the second communication link differs from the first communication link.

2. The method of claim 1, wherein each of the first pre-coding scheme and the second pre-coding scheme comprises a data partitioning scheme using an H.26x video coding standard with spatial scalability.

3. The method of claim 1, further comprising determining each of the first communication link and the second communication link to be one of a satellite link, a broadband Internet link, and a cellular data network link.

4. The method of claim 3, wherein the first communication link and the second communication link are determined to be satellite links on two separate frequency bands.

5. The method of claim 4, wherein:
the first communication link is determined to be a satellite link on a $K_u$ band; and
the second communication link is determined to be a satellite link on a $K_a$ band.

6. The method of claim 3, wherein:
the first communication link is determined to be a broadband Internet link; and
the second communication link is determined to be a satellite link.

7. A method for hierarchical communication of a set of source data, the method comprising:
receiving source data representing content to be communicated to a data terminal, the source data having a given bit rate;
receiving bit rate data indicating a first bit rate and a second bit rate, a sum of the first bit rate and the second bit rate equaling the given bit rate of the source data;
pre-coding at least some of the source data using a first pre-coding scheme to generate a first set of representation data, decodable independently to provide a set of first-level playback data representing the source data, the first set of representation data generated in part based on the first bit rate;
pre-coding at least some of the source data using a second pre-coding scheme to generate a second set of representation data, decodable in combination with the first set of representation data to provide a set of second-level playback data representing the source data, the second set of representation data generated in part based on the second bit rate;
associating the first set of representation data with a first channel coding and modulation scheme;
associating the second set of representation data with a second channel coding and modulation scheme, wherein the second channel coding and modulation scheme is of a higher order than the first channel coding and modulation scheme;
generating a first transmission by applying the first channel coding and modulation scheme to the first set of representation data;
generating a second transmission by applying the second channel coding and modulation scheme to the second set of representation data; and
transmitting the first transmission and the second transmission to the data terminal.

8. A communications network configured for hierarchical communication of a set of source data, the network comprising:
a data terminal configured to receive transmissions over a first communication link and a second communication link, wherein the second communication link differs from the first communication link;
a gateway in communication with the data terminal and comprising:
a source data receiver module configured to receive source data representing content to be communicated to the data terminal;
a pre-coder module configured to pre-code at least some of the source data using a first pre-coding scheme to generate a first set of representation data decodable independently to provide a set of first-level playback data representing the source data, and pre-code at least some of the source data using a second pre-coding scheme to generate a second set of representation data decodable in combination with the first set of representation data to provide a set of second-level playback data representing the source data; and
an ACM module configured to associate the first set of representation data with a first channel coding and modulation scheme, and associate the second set of representation data with a second channel coding and modulation scheme, wherein the second channel coding and modulation scheme is of a higher order than the first channel coding and modulation scheme; and
a transceiver module configured to generate a first transmission by applying the first channel coding and modulation scheme to the first set of representation data, generate a second transmission by applying the second channel coding and modulation scheme to the second set of representation data, transmitting the first transmission to the data terminal on the first communication link, and transmitting the second transmission to the data terminal on the second communication link.

9. The network of claim 8, wherein each of the first pre-coding scheme and the second pre-coding scheme comprises a data partitioning scheme using an H.26x video coding standard with spatial scalability.

10. The network of claim 8, wherein the gateway further comprises:
a network control module configured to determine each of the first communication link and the second communication link to be one of a satellite link, a broadband Internet link, and a cellular data network link.

11. The network of claim 10, wherein the first communication link and the second communication link are determined to be satellite links on two separate frequency bands.

12. The network of claim 11, wherein:
the first communication link is determined to be a satellite link on a $K_u$ band; and
the second communication link is determined to be a satellite link on a $K_a$ band.

13. The network of claim 10, wherein:
the first communication link is determined to be a broadband Internet link; and
the second communication link is determined to be a satellite link.

14. A communications network configured for hierarchical communication of a set of source data, the network comprising:
a data terminal configured to receive transmissions over a communication link;
a gateway in communication with the data terminal and comprising:
a source data receiver module configured to receive source data representing content to be communicated to the data terminal, the source data having a given bit rate;
a pre-coder module configured to receive bit rate data indicating a first bit rate and a second bit rate, a sum of the first bit rate and the second bit rate equaling the given bit rate of the source data, pre-code at least some of the source data using a first pre-coding scheme to generate a first set of representation data decodable independently to provide a set of first-coding level coding playback data representing the source data, the first set of representation data generated in part based on the first bit rate, and pre-code at least some of the source data using a second pre-coding scheme to generate a second set of representation data decodable in combination with the first set of representation data to provide a set of second-level playback data representing the source data, the second set of representation data generated in part based on the second bit rate; and an ACM module configured to associate the first set of representation data with a first channel coding and modulation scheme, and associate the second set of representation data with a second channel coding and modulation scheme, wherein the second channel coding and modulation scheme is of a higher order than the first channel coding and modulation scheme; and a transceiver module configured to generate a first transmission by applying the first channel coding and modulation scheme to the first set of representation data, generate a second transmission by applying the second channel coding and modulation scheme to the second set of representation data, and transmitting the first transmission and the second transmission to the data terminal.

15. A network access unit of a communications network configured to communicate with a data terminal configured to receive transmissions over a first communication link and a second communication link, wherein the second communication link differs from the first communication link, the network access unit comprising:

a source data receiver module configured to receive source data representing content to be communicated to the data terminal;

a pre-coder module configured to pre-code at least some of the source data using a first pre-coding scheme to generate a first set of representation data decodable independently to provide a set of first-level playback data representing the source data, and pre-code at least some of the source data using a second pre-coding scheme to generate a second set of representation data decodable in combination with the first set of representation data to provide a set of second-level playback data representing the source data; and an ACM module configured to associate the first set of representation data with a first channel coding and modulation scheme, and associate the second set of representation data with a second channel coding and modulation scheme, wherein the second channel coding and modulation scheme is of a higher order than the first channel coding and modulation scheme; and a transceiver module configured to generate a first transmission by applying the first channel coding and modulation scheme to the first set of representation data, generate a second transmission by applying the second channel coding and modulation scheme to the second set of representation data, transmitting the first transmission to the data terminal on the first communication link, and transmitting the second transmission to the data terminal on the second communication link.

16. The network access unit of claim 15, wherein each of the first pre-coding scheme and the second pre-coding scheme comprises a data partitioning scheme using an H.26x video coding standard with spatial scalability.

17. The network access unit of claim 15, further comprising:

a network control module configured to determine each of the first communication link and the second communication link to be one of a satellite link, a broadband Internet link, and a cellular data network link.

18. The network access unit of claim 17, wherein the first communication link and the second communication link are determined to be satellite links on two separate frequency bands.

19. The network access unit of claim 18, wherein:
the first communication link is determined to be a satellite link on a $K_u$ band; and
the second communication link is determined to be a satellite link on a $K_a$ band.

20. The network access unit of claim 17, wherein:
the first communication link is determined to be a broadband Internet link; and
the second communication link is determined to be a satellite link.

21. A network access unit of a communications network configured to communicate with a data terminal configured to receive transmissions over a communication link, the network access unit comprising:

a source data receiver module configured to receive source data representing content to be communicated to the data terminal, the source data having a given bit rate;

a pre-coder module configured to receive bit rate data indicating a first bit rate and a second bit rate, a sum of the first bit rate and the second bit rate equaling the given bit rate of the source data, pre-code at least some of the source data using a first pre-coding scheme to generate a first set of representation data decodable independently to provide a set of first- level playback data representing the source data, the first set of representation data generated in part based on the first bit rate, and pre-code at least some of the source data using a second pre-coding scheme to generate a second set of representation data decodable in combination with the first set of representation data to provide a set of second-level playback data representing the source data, the second set of representation data generated in part based on the second bit rate; and an ACM module configured to associate the first set of representation data with a first channel coding and modulation scheme, and associate the second set of representation data with a second channel coding and modulation scheme, wherein the second channel coding and modulation scheme is of a higher order than the first channel coding and modulation scheme; and a transceiver module configured to generate a first transmission by applying the first channel coding and modulation scheme to the first set of representation data, generate a second transmission by applying the second channel coding and modulation scheme to the second set of representation data, and transmitting the first transmission and the second transmission to the data terminal.

* * * * *